United States Patent
Straub et al.

(10) Patent No.: US 9,858,174 B2
(45) Date of Patent: Jan. 2, 2018

(54) UPDATABLE NATIVE MOBILE APPLICATION FOR TESTING NEW FEATURES

(71) Applicant: Oracle International Corporation, Redwood Shores, CA (US)

(72) Inventors: Christian David Straub, Palo Alto, CA (US); Yuliya Serper, Bellevue, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/865,927

(22) Filed: Sep. 25, 2015

(65) Prior Publication Data
US 2016/0092348 A1 Mar. 31, 2016

Related U.S. Application Data

(60) Provisional application No. 62/056,033, filed on Sep. 26, 2014.

(51) Int. Cl.
*G06F 9/44* (2006.01)
*G06F 11/36* (2006.01)
*G06F 9/445* (2006.01)
*H04L 29/08* (2006.01)

(52) U.S. Cl.
CPC .......... *G06F 11/3684* (2013.01); *G06F 8/61* (2013.01); *G06F 8/65* (2013.01); *H04L 67/34* (2013.01); *G06F 8/20* (2013.01); *G06F 8/30* (2013.01); *G06F 9/44505* (2013.01)

(58) Field of Classification Search
CPC ..... G06F 8/10; G06F 8/20; G06F 8/30; G06F 8/65; G06F 8/67; G06F 8/68; G06F 11/3664; G06F 11/3684; G06F 11/3688
See application file for complete search history.

(56) References Cited

U.S. PATENT DOCUMENTS

| 5,550,971 A | 8/1996 | Brunner et al. |
| 6,097,382 A | 8/2000 | Rosen et al. |
| 6,631,497 B1 | 10/2003 | Jamshidi et al. |
| 6,631,519 B1 | 10/2003 | Nicholson et al. |
| 7,062,502 B1 | 6/2006 | Kesler |
| 7,111,307 B1 | 9/2006 | Wang |

(Continued)

FOREIGN PATENT DOCUMENTS

WO 2016049626 3/2016

OTHER PUBLICATIONS

El-Kassas et al., "Taxonomy of Cross-Platform Mobile Applications Development Approaches", Elsevier, Oct. 2015, pp. 163-190; <http://www.sciencedirect.com/science/article/pii/S2090447915001276>.*

(Continued)

*Primary Examiner* — Thuy Dao
*Assistant Examiner* — Ben C Wang
(74) *Attorney, Agent, or Firm* — Kilpatrick Townsend & Stockton LLP

(57) ABSTRACT

For cloud development tools building native mobile applications, it is often useful to test out parts of an application on a physical device. Systems and methods are provide for providing an native application that allows portions of itself to uptake newly developed features allowing rapid testing of these features.

17 Claims, 39 Drawing Sheets

(56) References Cited

U.S. PATENT DOCUMENTS

| | | | |
|---|---|---|---|
| 7,116,310 | B1 | 10/2006 | Evans et al. |
| 7,203,678 | B1 | 4/2007 | Petropoulos et al. |
| 7,337,434 | B2 | 2/2008 | Nichols et al. |
| 7,464,297 | B2 | 12/2008 | Potter, IV et al. |
| 7,577,909 | B2 | 8/2009 | Harriger et al. |
| 7,650,594 | B2 | 1/2010 | Nattinger |
| 7,707,553 | B2 | 4/2010 | Roques et al. |
| 7,730,427 | B2 | 6/2010 | Peters |
| 7,735,068 | B2 | 6/2010 | Siddarammappa et al. |
| 7,757,207 | B2 | 7/2010 | Yan et al. |
| 7,849,447 | B1 | 12/2010 | Karis et al. |
| 7,861,121 | B2 | 12/2010 | Wang |
| 7,926,027 | B2 | 4/2011 | Chen et al. |
| 8,032,634 | B1 | 10/2011 | Eppstein et al. |
| 8,166,387 | B2 | 4/2012 | Morrison et al. |
| 8,452,567 | B1 | 5/2013 | Sullivan et al. |
| 8,578,282 | B2 | 11/2013 | Boillot |
| 8,676,723 | B2 | 3/2014 | Jung |
| 8,745,641 | B1 | 6/2014 | Coker |
| 8,990,765 | B2 | 3/2015 | Kulkarni et al. |
| 9,047,166 | B2 * | 6/2015 | Nishio ............. G06F 8/30 |
| 9,047,404 | B1 * | 6/2015 | Jibaly ............. G06F 11/362 |
| 9,047,414 | B1 | 6/2015 | Matyjek |
| 9,077,770 | B2 | 7/2015 | Redpath |
| 9,105,046 | B1 * | 8/2015 | Dias ............. G06Q 30/0251 |
| 9,223,684 | B2 | 12/2015 | Gittelman et al. |
| 9,258,668 | B2 * | 2/2016 | Mall ............. H04L 41/082 |
| 9,258,669 | B2 * | 2/2016 | Nyisztor ............. H04L 41/082 |
| 9,448,790 | B2 | 9/2016 | Collison et al. |
| 2004/0250257 | A1 | 12/2004 | Koutyrine et al. |
| 2005/0172261 | A1 | 8/2005 | Yuknewicz et al. |
| 2006/0291398 | A1 | 12/2006 | Potter, IV et al. |
| 2007/0240127 | A1 | 10/2007 | Roques et al. |
| 2008/0276224 | A1 | 11/2008 | Gyure et al. |
| 2009/0006538 | A1 | 1/2009 | Risney, Jr. et al. |
| 2009/0077477 | A1 | 3/2009 | Khan et al. |
| 2010/0017812 | A1 * | 1/2010 | Nigam ............. G06F 8/20 719/328 |
| 2010/0070230 | A1 | 3/2010 | Kumar et al. |
| 2010/0281475 | A1 * | 11/2010 | Jain ............. G06F 8/68 717/172 |
| 2011/0123973 | A1 | 5/2011 | Singh |
| 2011/0125448 | A1 | 5/2011 | Jung |
| 2011/0246964 | A1 | 10/2011 | Cox, III et al. |
| 2011/0265077 | A1 | 10/2011 | Collison et al. |
| 2011/0302516 | A1 * | 12/2011 | White ............. G06F 3/0481 715/771 |
| 2011/0314159 | A1 | 12/2011 | Murphy et al. |
| 2012/0102451 | A1 | 4/2012 | Kulkarni et al. |
| 2012/0317172 | A1 | 12/2012 | Redpath |
| 2012/0317233 | A1 | 12/2012 | Redpath |
| 2012/0323553 | A1 | 12/2012 | Aslam et al. |
| 2013/0019242 | A1 | 1/2013 | Chen et al. |
| 2013/0254262 | A1 * | 9/2013 | Udall ............. H04L 67/42 709/203 |
| 2014/0053126 | A1 | 2/2014 | Watson et al. |
| 2014/0109072 | A1 * | 4/2014 | Lang ............. G06F 8/52 717/168 |
| 2014/0173454 | A1 | 6/2014 | Sanchez |
| 2014/0282398 | A1 | 9/2014 | Podolyak et al. |
| 2014/0282399 | A1 | 9/2014 | Gorelik et al. |
| 2014/0298293 | A1 * | 10/2014 | Nishio ............. G06F 8/30 717/121 |
| 2015/0039732 | A1 * | 2/2015 | Mall ............. H04L 41/082 709/221 |
| 2015/0040104 | A1 * | 2/2015 | Mall ............. H04L 41/082 717/121 |
| 2015/0040201 | A1 * | 2/2015 | Nyisztor ............. H04L 41/082 726/7 |
| 2015/0128063 | A1 * | 5/2015 | Jones ............. G06F 17/30 715/741 |
| 2015/0128106 | A1 | 5/2015 | Halley et al. |
| 2015/0154415 | A1 | 6/2015 | Wu et al. |
| 2015/0229638 | A1 * | 8/2015 | Loo ............. H04L 63/029 726/9 |
| 2015/0319252 | A1 * | 11/2015 | Momchilov ............. H04L 67/42 709/223 |
| 2016/0048848 | A1 * | 2/2016 | Diggs ............. G06Q 30/0201 705/7.33 |
| 2016/0085666 | A1 | 3/2016 | Jordan |
| 2016/0092176 | A1 * | 3/2016 | Straub ............. G06F 8/34 717/107 |
| 2016/0092179 | A1 * | 3/2016 | Straub ............. G06F 8/71 717/107 |
| 2016/0092180 | A1 | 3/2016 | Straub |
| 2016/0092339 | A1 * | 3/2016 | Straub ............. G06F 9/44521 717/124 |
| 2016/0092425 | A1 | 3/2016 | Shah et al. |
| 2016/0154629 | A1 * | 6/2016 | Noens ............. G06F 8/30 717/107 |
| 2016/0378439 | A1 * | 12/2016 | Straub ............. G06F 8/34 717/107 |
| 2017/0046134 | A1 * | 2/2017 | Straub ............. G06F 8/36 |
| 2017/0046254 | A1 | 2/2017 | Buege |
| 2017/0048215 | A1 * | 2/2017 | Straub ............. G06F 8/30 |
| 2017/0063833 | A1 * | 3/2017 | Colle ............. H04L 63/083 |
| 2017/0083293 | A1 * | 3/2017 | Jao ............. G06F 8/34 |

OTHER PUBLICATIONS

Gaouar et al., "Model Driven Approaches to Cross Platform Mobile Development", ACM, IPAC'15, Nov. 2015, pp. 1-5; <http://dl.acm.org/citation.cfm?id=2816882&CFID=802186845&CFTOKEN=79626257>.*

Boushehrinejadmoradi, "Testing Cross-Platform Mobile App Development Frameworks", IEEE, Jan. 2016, pp. 441-451; <http://ieeexplore.ieee.org/stamp/stamp.jsp?tp=&arnumber=7372032>.*

International Application No. PCT/US2015/052637, International Search Report and Written Opinion dated Dec. 16, 2015, 13 pages.

U.S. Appl. No. 14/865,904, Non-Final Office Action dated May 5, 2016, 14 pages.

U.S. Appl. No. 14/865,904, "Final Office Action", dated Nov. 4, 2016, 22 pages.

PCT/US2015/052637, "Written Opinion", dated Sep. 14, 2016, 5 pages.

U.S. Appl. No. 14/865,842, Non-Final Office Action dated Mar. 24, 2017, 17 pages.

U.S. Appl. No. 14/865,877, Non-Final Office Action dated Mar. 23, 2017, 18 pages.

U.S. Appl. No. 14/865,904, Non-Final Office Action dated Apr. 3, 2017, 23 pages.

International Application No. PCT/US2015/052637, International Preliminary Report on Patentability dated Dec. 16, 2016, 10 pages.

U.S. Appl. No. 14/865,877, Notice of Allowance dated Aug. 30, 2017, 16 pages.

* cited by examiner

UPDATABLE NATIVE MOBILE APPLICATION FOR TESTING NEW FEATURES

CROSS-REFERENCES TO RELATED APPLICATIONS

This Application claims priority to and the benefit of U.S. Provisional Patent Application No. 62/056,033, filed Sep. 26, 2014 and entitled "UPDATABLE NATIVE MOBILE APPLICATION FOR TESTING NEW FEATURES," the entire disclosure of which including any Appendices is here incorporated by reference for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all (copyright or mask work) rights whatsoever.

FIELD OF THE INVENTION

Embodiments are directed generally to an application development system, and in particular, to a mobile application development system providing an updatable native mobile application for testing new features of server-generated applications.

BACKGROUND OF THE INVENTION

An application refers to a software program, which on execution performs specific desired tasks. In general, several applications are executed in a run-time environment containing one or more of operating systems, virtual machines (e.g., supporting Java™ programming language), device drivers, etc., as is well known in the relevant arts.

Developers often use Application Development Frameworks (ADFs) (which are by themselves applications) for implementing/developing desired applications. An ADF provides a set of pre-defined code/data modules that can be directly/indirectly used in the development of an application. An ADF may also provide tools such as an IDE (integrated development environment), code generators, debuggers, etc. which facilitates a developer in coding/implementing the desired logic of the application in a faster/simpler manner.

In general, an ADF simplifies development of applications by providing re-usable components and integrated development environments, which application developers can use to define user interfaces and application logic by, for example, selecting components to perform desired tasks and defining the appearance, behavior, and interactions of the selected components. Some ADFs are based on a model-view-controller design pattern that promotes loose coupling and easier application development and maintenance. Oracle Application Development Framework is one example of an ADF that utilizes this design pattern.

Oracle ADF includes libraries of standards-based Java Server Faces (JSF) components with built-in HTML5 and Ajax functionality. With these components, web deployed user interfaces can be developed with a level of functionality and interactivity previously reserved for thick-client applications. The components offer data interaction, data visualization, and encapsulated browser side operations in a set of easy to use components that makes rich client application development easier than ever. Oracle ADF further provides a data-binding framework that simplifies binding UI to business services through a simple drag and drop operations in the IDE. This is done while still keeping the independence of the business service from consuming interfaces. With the framework, the UI developer is insulated from the underlying implementation of the business service layer. This makes the process of building the UI truly decoupled from the implementation of the business service layer, better positioning the application for implementation in a service-oriented architecture.

Accordingly, what is desired is to solve problems relating to databinding for mobile applications, some of which may be discussed herein. Additionally, what is desired is to reduce drawbacks relating to for mobile applications, some of which may be discussed herein.

BRIEF SUMMARY OF THE INVENTION

The following portion of this disclosure presents a simplified summary of one or more innovations, embodiments, and/or examples found within this disclosure for at least the purpose of providing a basic understanding of the subject matter. This summary does not attempt to provide an extensive overview of any particular embodiment or example. Additionally, this summary is not intended to identify key/critical elements of an embodiment or example or to delineate the scope of the subject matter of this disclosure. Accordingly, one purpose of this summary may be to present some innovations, embodiments, and/or examples found within this disclosure in a simplified form as a prelude to a more detailed description presented later.

A further understanding of the nature of and equivalents to the subject matter of this disclosure (as well as any inherent or express advantages and improvements provided) should be realized in addition to the above section by reference to the remaining portions of this disclosure, any accompanying drawings, and the claims.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed inventions, any of the presently described embodiments and/or examples, or the presently understood best mode of any innovations presented within this disclosure.

DETAILED DESCRIPTION OF THE INVENTION

Figure 1:
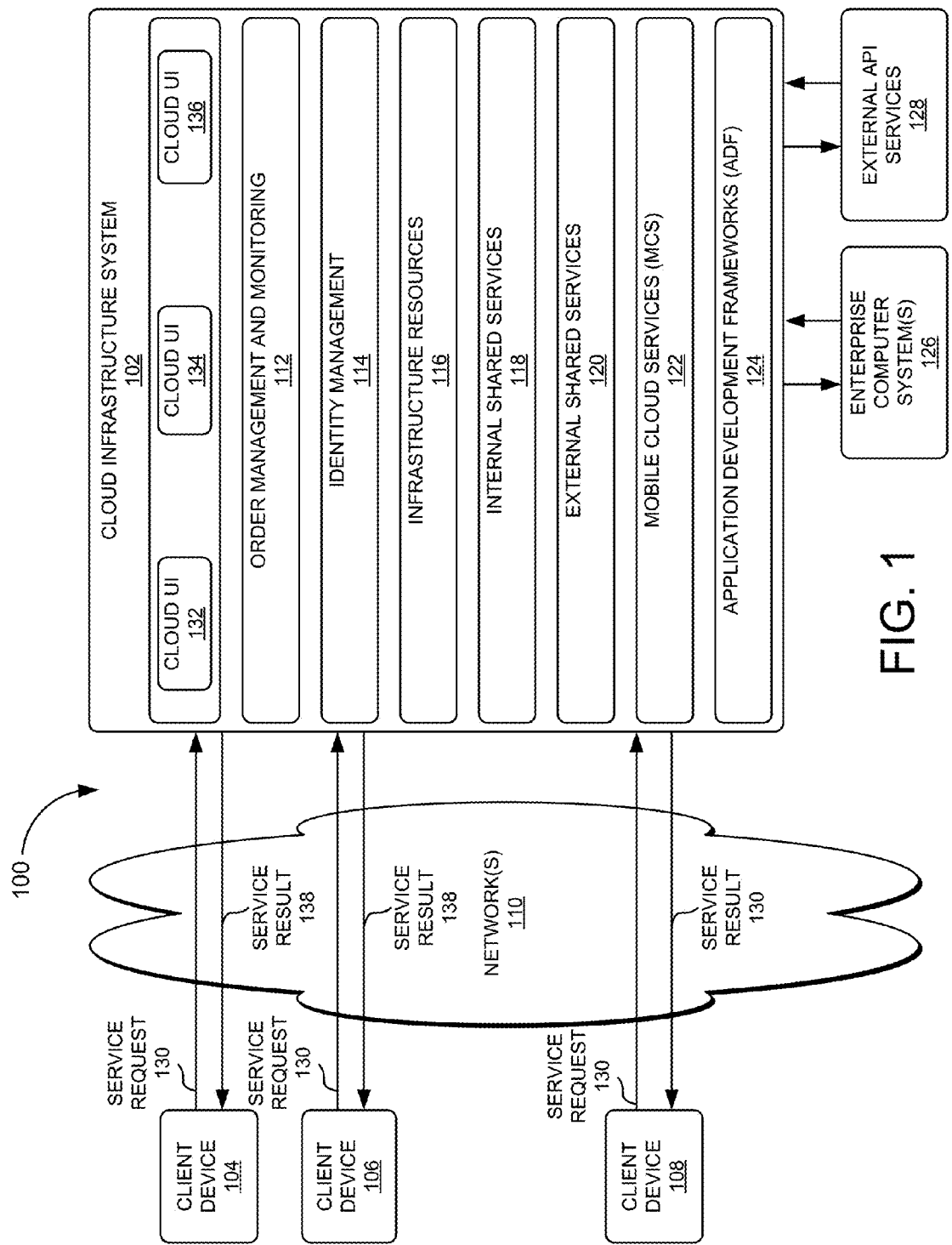
FIG. 1 is a block diagram of a system for developing applications that use mobile cloud services, in accordance with an embodiment of the present invention.

In the following description, for the purposes of explanation, specific details are set forth in order to provide a thorough understanding of embodiments of the invention. However, it will be apparent that various embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments. The figures and description are not intended to be restrictive. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" or "computer-readable medium" includes, but is not limited to, portable or non-portable storage devices, optical storage devices, wireless channels, and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable or computer-readable medium. One or more processors may perform the necessary tasks.

Systems depicted in some of the figures may be provided in various configurations. In some embodiments, the systems may be configured as a distributed system where one or more components of the system are distributed across one or more networks in a cloud computing system. In further embodiments, the systems may be configured as a single system where one or more components of the system incorporated into a single structure or package.

Introduction

An application refers to a software program, which on execution performs specific desired tasks. In general, several applications are executed in a run-time environment containing one or more operating systems ("OSs"), virtual machines (e.g., supporting Java™ programming language), device drivers, etc. Developers often use Application Development Frameworks ("ADFs") (which are by themselves applications) for implementing/developing desired applications. An ADF provides a set of pre-defined code/data modules that can be directly/indirectly used in the development of an application. An ADF may also provide tools such as an integrated development environment ("IDE"), code generators, debuggers, etc. In general, an ADF simplifies application development by providing re-usable components which can be used by application developers to define user interfaces ("UIs") and application logic by, for example, selecting components to perform desired tasks and defining the appearance, behavior, and interactions of the selected components. Some ADFs, such as "Oracle ADF" from Oracle Corp., are based on a model-view-controller ("MVC") design pattern that promotes loose coupling and easier application development and maintenance.

Generally, many companies have expressed the need to allow their employees to access secure enterprise applications with mobile devices from off-site locations, so that on-the-go employees can access information that is stored on enterprise computer systems. With such capabilities, salespeople may work from the road, service technicians may look up parts while at a customer site, employees may work from home, etc. Some companies would also like to allow end customers to access data located in enterprise computer systems. Such access may differentiate a company from competitors by improving the customer experience and lowering costs. For example, by implementing such access, a store may allow customers to remotely search store inventory for an item and shop whenever convenient, thereby improving customer experience and lowering the need for salespeople, operators, and other staff.

Different enterprise application vendors have traditionally fulfilled this need by offering specialized portals in combination with either company owned secure mobile devices or custom mobile applications. However, with the current explosion in the variety of available personal mobile devices, these traditional solutions quickly become obsolete since vendors simply cannot keep up with all the latest OSs and hardware that become available.

Further, an application may need to connect and synchronize with different enterprise computer systems depending on the application type and/or the type of data used by the application. These enterprise computer systems may be supported by different backend computer systems which may also vary based on application type and data type. However, different backend enterprise systems may use different communication protocols and mechanisms to communicate data to devices, thereby causing mobile computing devices that run a variety of applications to encounter challenges for communicating with different backend computer systems that support an enterprise computer system.

Yet further, security may become a concern in allowing access to internal computer systems of an enterprise. The differences in communication protocols supported between the mobile computing devices and the enterprise computer systems may further complicate security access management for communications between mobile computing devices and enterprise computer systems. For example, different mechanisms may be implemented to ensure authentication of an application to access a particular enterprise computer system that has a proprietary security protocol. Some known systems have attempted to address this issues by connecting off-the-shelf consumer mobile devices with backend enterprise systems of companies. These devices may be configured with applications or OSs that connect to an enterprise network through special portals dedicated to communication with enterprise backend computer systems. However, manufacturers of mobile devices, application developers, and enterprises may benefit from more flexible and robust techniques for developing applications and connecting mobile devices to enterprise backend computer systems.

In contrast to the known systems, embodiments of the present invention provide a declarative browser based client application development tool for rapid business user friendly mobile application composition in a "cloud" service. In one embodiment, the cloud service is "Mobile Cloud Service" ("MCS") from Oracle Corp. Embodiments allow for building mobile applications using pre-defined templates that use the cloud service for backend services, so that a service definition can be presented to a developer during application development to allow for rapid connection between UI design and backend services.

MCS

In embodiments that use MCS, MCS facilitates communication between a mobile computing device and enterprise computer systems via a cloud computer system. MCS uses a third party cloud based interface between mobile devices and an enterprise network of a company. The cloud based interface centralizes secure adaptors for various enterprise computer systems, and translates different protocols to a standardized Representational State Transfer ("REST") architecture. Companies can use embodiments of the present invention to create their own custom mobile applications using available tools on MCS, and such applications can be downloaded in native form onto mobile user devices. Once an application is installed, it can access the cloud based interface of MCS to reach various enterprise computer systems through the secure adaptors provided by MCS.

For application development in embodiments that use MCS, MCS provides backend services under the Mobile Backend as a Service ("MBaaS," also referred to as "BaaS") model. MBaaS allows Web and mobile application developers to link their applications to backend cloud storage and APIs exposed by backend applications while also providing user management, push notifications, integration with social networking services, etc. By using backend services provided in MCS under the MBaaS model, embodiments provide a declarative Web-based UI configured for mobile application development by non-technical users with no familiarity with coding.

In one embodiment, a wizard is launched when a user starts developing a new application, and the user is asked to give a name and description for the new application. Then, the user is asked to design the first page of the application by selecting from a set of pre-defined templates (e.g., tabs, bottom tabs, pagination, etc.) that can pre-seed the UI for the first page. The UI is then completed by specifying details in the template, while a preview is automatically updated to show the changes. Upon completing the UI design, the user can use a palette to browse a catalog of available services and data sources that are available to the mobile application through MCS (e.g., a service catalog). For each item of the catalog that is added to the UI, the user is presented with a list of attributes, and using one or more gestures (e.g., drag and drop, etc.) the user can bind the attributes to UI elements. The user can repeat the process of feature definition and data-binding to create a mobile application. Other UI components such as maps, graphs, etc., can also be added to the UI. When the application is ready for testing, the user may publish the application so that corresponding binaries are created (building native executables for iOS, Android, or any other mobile device OS), and a Quick Response ("QR") code is subsequently generated and provided to the user. If the user scans the QR code by a mobile device, the application is installed over the air onto the mobile device.

Embodiments use pre-built components in an ADF. The components offer data interaction, data visualization, and encapsulated browser side operations, and simplify rich client application development. ADF may also implement a plugin such as Apache Cordova plugin to access device features such as a camera, Global Positioning System ("GPS"), contacts, etc.

In one embodiment, when an ADF receives a request to build an application for a mobile device, it determines portions of one or more already developed applications that have been precompiled using a toolkit, and modifies declarative information associated with those existing applications. This embodiment then builds the requested application based on the modified declarative information and one or more binary artifacts of the existing applications by packaging the binary artifacts representing the requested application for a desired operating system ("OS," such as iOS, Android, etc.). The ADF then compiles the requested application to generate one or more binary artifacts and a set of definition files. In end-user development, an artifact is an application or a complex data object that is created by an end-user without the need to know a programming language.

Mobile Security

Some embodiments use security services provided by a mobile security suite such as "Oracle Mobile Security Suite" ("OMSS") from Oracle Corp. OMSS is a mobile device and mobile application security solution that provides an employee-centric, comprehensive Enterprise Mobility Management ("EMM") solution and a consumer-centric mobile and social service. EMM provides mobile device management ("MDM"), mobile application management ("MAM"), mobile content management ("MCM"), and mobile identity policies by seamlessly tying to existing user identities and leveraging advanced features of the enterprise backend identity management infrastructure for mobile access. Security policies, adhering to corporate needs, can be defined to enforce a complete device lock down (typically for corporate owned devices) and/or to separate personal applications from secure "containerized" corporate applications and data (for bring your own device ("BYOD") cases). A mobile and social service provides a software development kit ("SDK") allowing corporate developers to secure custom enterprise applications for iOS and Android devices, bridging the gap between mobile devices, social networks, and enterprise backend identity management infrastructure.

OMSS delivers a secure container to a mobile device for application and content security to separate, protect, and wipe corporate applications and data. All communication between the mobile device and enterprise intranet resources goes through an authenticated transport layer security ("TLS")/secure socket layer ("SSL") tunnel ("AppTunnel") that can only be used by vetted (or "containerized") applications of the mobile device. The AppTunnel is terminated at a Mobile Security Access Server located at the corporate demilitarized zone ("DMZ"). This server offers secure Intranet access to mobile devices and terminates only the AppTunnel from the secure container, thereby lessening the risk of rogue applications and the need for device level VPN.

Leveraging what is provided by an ADF, embodiments provide browser based application development, which does not require coding and which easily maps to business services. Embodiments also allow for previewing an application inline (e.g., as the application is being developed), as well as editing, testing, and publishing an application from a browser. Accordingly, instead of an IDE such as "Jdeveloper" from Oracle Corp. that is configured for use by professional developers, embodiments are configured for use by business users (e.g., non-technical users).

Service Catalog

To support embodiments of the present invention that use MCS, MCS provides access to an API catalog such as "Oracle API Catalog" ("OAC") from Oracle Corp. OAC provides visibility to available APIs in an organization so those APIs may be reused for application development. OAC includes a simple metamodel for an API asset, automation to populate OAC with APIs, and the ability for users to search OAC for APIs and understand the details of the APIs to assess their fit in their applications. OAC includes a harvester that creates API assets in OAC. In some embodiments, harvesting is performed at build time of projects. The harvester introspects deployed services and creates API assets representing services discovered in the project such as service oriented architecture ("SOA") Services and Service Bus proxies, Web Services Description Language ("WSDL") based Web services, and Web Application Description Language ("WADL") based REST services. The created assets are collected in OAC.

After the API assets are created by the harvester, curators edit the API assets using a simple editor to provide additional metadata to facilitate the discovery and understanding of the APIs. Curators can change the name, add a description, tag keywords, or add document references to the API assets in OAC. This metadata simplifies discovery and understanding of each API asset by a user. After the API metadata is edited, curators publish the API by making it visible to users in OAC. Published assets are available in the OAC console and via the Oracle JDeveloper Oracle Enterprise Repository plug-in. Users can search OAC to discover APIs and review the metadata provided by the curator to learn more about an API.

Each OAC user is assigned a role which determines which OAC features and content are available for each user. There are predefined roles in OAC including developer, curator, and admin. Users with the developer role have the ability to search OAC for published APIs, examine the API metadata to better understand the API, declare interest in the API, and submit ratings and reviews for an API. In addition to the capabilities available to the developer role, users with the curator role can run the harvester to create new API assets in OAC, edit the APIs to update their metadata, and publish them. In addition to the capabilities available to curators and developers, users with the admin role have access to an Admin page in OAC to administer the infrastructure of OAC by editing system settings, creating new users, creating new departments, managing sessions, and using the import/export tool. Admins can also configure security features included with OAC.

In some embodiments, an application may be developed and deployed to a mobile device as either a native application or a hosted application. For native application deployment, a complete application is installed on the device. For hosted application development, a user needs to download a hosting application from an "app store," where such hosting application "hosts" the hosted applications that will be installed as "features" onto the hosting application. This embodiment may allow for updating a running hosting application from a server, such that declarative metadata can be sent to the device and overlaid on top of the existing application to update the application to run against this new metadata.

FIG. 1 is a block diagram of a system environment 100 for developing applications by using pre-defined templates that allow for use of MCS 122 as backend services. A service definition can be presented to a user during application development allowing rapid connection between UI design and backend services.

In the illustrated embodiment, system environment 100 includes cloud infrastructure system 102 that provides cloud services to one or more client computing devices 104, 106, and 108. Client computing devices 104, 106, and 108 may be used by users to interact with cloud infrastructure system 102. Client computing devices 104, 106, and 108 may be configured to operate a client application such as a Web browser, a proprietary client application (e.g., Oracle Forms), or some other application, which may be used by a user of the client computing device to interact with cloud infrastructure system 102 to use services provided by cloud infrastructure system 102.

Cloud infrastructure system 102 may have other components than those depicted. Further, the embodiment shown in FIG. 1 is only one example of a cloud infrastructure system that may incorporate an embodiment of the invention. In some other embodiments, cloud infrastructure system 102 may have more or fewer components than shown in FIG. 1, may combine two or more components, or may have a different configuration or arrangement of components.

Client computing devices 104, 106, and 108 may be portable handheld devices (e.g., an iPhone®, cellular telephone, an iPad®, computing tablet, a personal digital assistant ("PDA")) or wearable devices (e.g., a Google Glass® head mounted display), running software such as Microsoft Windows Mobile®, and/or a variety of mobile OSs such as iOS, Windows Phone, Android, BlackBerry 10, Palm OS, and the like, and being Internet, e-mail, short message service ("SMS"), Blackberry®, or other communication protocol enabled. Client computing devices 104, 106, and 108 can be general purpose personal computers including, by way of example, personal computers and/or laptop computers running various versions of Microsoft Windows®, Apple Macintosh®, and/or Linux OSs. Client computing devices 104, 106, and 108 can be workstation computers running any of a variety of commercially-available UNIX® or UNIX-like OSs, including without limitation the variety of GNU/Linux OSs, such as for example, Google Chrome OS. Alternatively, or in addition, client computing devices 104, 106, and 108 may be any other electronic device, such as a thin-client computer, an Internet-enabled gaming system (e.g., a Microsoft Xbox gaming console with or without a Kinect® gesture input device), and/or a personal messaging device, capable of communicating over network(s) 110.

Although exemplary system environment 100 is shown with three client computing devices, any number of client computing devices may be supported. Other devices such as devices with sensors, etc., may interact with cloud infrastructure system 102.

Network(s) 110 may facilitate communications and exchange of data between clients 104, 106, and 108 and cloud infrastructure system 102. Network(s) 110 may be any type of network familiar to those skilled in the art that can support data communications using any of a variety of commercially-available protocols, including without limitation transmission control protocol/Internet protocol ("TCP/IP"), systems network architecture ("SNA"), Internet packet exchange ("IPX"), AppleTalk, etc. Merely by way of example, network(s) 110 can be a local area network ("LAN"), such as one based on Ethernet, Token-Ring and/or the like. Network(s) 110 can be a wide-area network and the Internet. It can include a virtual network, including without limitation a virtual private network ("VPN"), an intranet, an extranet, a public switched telephone network ("PSTN"), an infra-red network, a wireless network (e.g., a network operating under any of the Institute of Electrical and Electronics ("IEEE") 802.11 suite of protocols, Bluetooth®, and/or any other wireless protocol); and/or any combination of these and/or other networks.

Cloud infrastructure system 102 may comprise one or more computers and/or servers. These computer systems or servers may be composed of one or more general purpose computers, specialized server computers (including, by way of example, personal computer ("PC") servers, UNIX® servers, mid-range servers, mainframe computers, rack-mounted servers, etc.), server farms, server clusters, or any other appropriate arrangement and/or combination. In various embodiments, one or more computer systems or servers associated with cloud infrastructure system 102 may be adapted to run one or more services or software applications described in the foregoing disclosure. For example, one or more computer systems or servers associated with cloud infrastructure system 102 may correspond to a server for performing processing described herein according to an embodiment of the present disclosure.

One or more computer systems or servers associated with cloud infrastructure system 102 may run an OS including any of those discussed above, as well as any commercially available server OS. One or more computer systems or servers associated with cloud infrastructure system 102 may also run any of a variety of additional server applications and/or mid-tier applications, including hypertext transport protocol ("HTTP") servers, file transfer protocol ("FTP") servers, common gateway interface ("CGI") servers, JAVA® servers, database servers, and the like.

In certain embodiments, services provided by cloud infrastructure system 102 may include a host of services that are made available to users of cloud infrastructure system 102 on demand, such as online data storage and backup solutions, Web-based e-mail services, hosted office suites and document collaboration services, database processing, managed technical support services, and the like. Services provided by cloud infrastructure system 102 can dynamically scale to meet the needs of its users. A specific instantiation of a service provided by cloud infrastructure system 102 is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service instance instantiated by cloud infrastructure 102 may include protected computer network access to storage, a hosted database, a hosted Web server, a software application, or other service provided by a cloud vendor to a user, or as otherwise known in the art. For example, a service instance instantiated by cloud infrastructure 102 can include password-protected access to remote storage on the cloud through the Internet. As another example, a service instance instantiated by cloud infrastructure 102 can include a Web service-based hosted relational database and a script-language middleware engine for private use by a networked developer. As another example, a service instance instantiated by cloud infrastructure 102 can include access to an email software application hosted on a cloud vendor's Web site.

In certain embodiments, cloud infrastructure system 102 may include a suite of applications, middleware, development service, and database service offerings that are delivered to a customer in a self-service, subscription-based, elastically scalable, reliable, highly available, and secure manner. An example of such a cloud infrastructure system as embodied in cloud infrastructure service 102 is "Oracle Public Cloud" from Oracle Corp.

Cloud infrastructure system 102 may provide the cloud services via different deployment models. For example, services may be provided under a public cloud model in which cloud infrastructure system 102 is owned by an organization selling cloud services (e.g., owned by Oracle Corp.) and the services are made available to the general public or different industry enterprises. As another example, services may be provided under a private cloud model in which cloud infrastructure system 102 is operated solely for a single organization and may provide services for one or more entities within the organization. The cloud services may also be provided under a community cloud model in which cloud infrastructure system 102 and the services provided by cloud infrastructure system 102 are shared by several organizations in a related community. The cloud services may also be provided under a hybrid cloud model, which is a combination of two or more different models.

In some embodiments, the services provided by cloud infrastructure system 102 may include one or more services provided under software as a service ("SaaS") category, platform as a service ("PaaS") category, infrastructure as a service ("IaaS") category, MBaaS category, or other categories of services including hybrid services. In some embodiments, the services provided by cloud infrastructure system 102 may include, without limitation, application services, platform services, infrastructure services, backend services, etc. In some examples, application services may be provided by cloud infrastructure system 102 via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 102 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 102 without the need for customers to purchase separate licenses and support. Examples of platform services include, without limitation, "Oracle Java Cloud Service" ("JCS") from Oracle Corp., "Oracle Database Cloud Service" ("DBCS") from Oracle Corp., and others.

By utilizing the services provided by the PaaS platform, customers can employ programming languages and tools supported by cloud infrastructure system 102 and also control the deployed services. In some embodiments, platform services provided by cloud infrastructure system 102 may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in cloud infrastructure system 102. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 102 may provide comprehensive management of cloud services (e.g., SaaS, PaaS, IaaS, and MBaaS services) in the cloud infrastructure system. In one embodiment, cloud management functionality may include capabilities for provisioning, managing and tracking a customer's subscription received by cloud infrastructure system 102, and the like. In various embodiments, cloud infrastructure system 102 may be adapted to automatically provision, manage and track a customer's subscription to services offered by cloud infrastructure system 102. A customer, via a subscription order, may order one or more services provided by cloud infrastructure system 102. Cloud infrastructure system 102 then performs processing to provide the services in the customer's subscription order.

In one embodiment, cloud management functionality may be provided by one or more modules, such as order management and monitoring module 114. These modules may include or be provided using one or more computers and/or servers, which may be general purpose computers, specialized server computers, server farms, server clusters, or any other appropriate arrangement and/or combination.

In exemplary operation, a customer using client computing devices 104, 106 or 108, may interact with cloud infrastructure system 102 by requesting one or more services provided by cloud infrastructure system 102. The customer may issue service request 134 cloud infrastructure system 102 using a variety of means. Service request 134 may include placing an order for a subscription for one or more services offered by cloud infrastructure system 102, accessing one or more services offered by cloud infrastructure system 102, or the like. In certain embodiments, the customer may access a cloud UI 132, 134, 138 and place a subscription order via these UIs. The order information received by cloud infrastructure system 102 in response to the customer placing an order may include information identifying the customer and one or more services offered by the cloud infrastructure system 102 to which the customer intends to subscribe. After an order has been placed by the customer, the order information is received via cloud UIs, 132, 134, and/or 138.

In this example, order management and monitoring module 112 sends information received from a customer to an order database to have the order placed by the customer stored. The order database can be one of several databases operated by cloud infrastructure system 102 and operated in conjunction with other system elements. Order management and monitoring module 112 may forward information that includes all or part of the order information stored in the order database to an order management module. In some instances, the order management module may be configured to perform billing and accounting functions related to the order, such as verifying the order, and upon verification, booking the order.

In certain embodiments, cloud infrastructure system 100 may include identity management module 114. Identity management module 114 may be configured to provide identity services, such as access management and authorization services in cloud infrastructure system 102. In some embodiments, identity management module 114 may control information about customers who wish to utilize the services provided by cloud infrastructure system 102. Such information can include information that authenticates the identities of such customers and information that describes which actions those customers are authorized to perform relative to various system resources (e.g., files, directories, applications, communication ports, memory segments, etc.) Identity management module 114 may also include the management of descriptive information about each customer and about how and by whom that descriptive information can be accessed and modified.

In certain embodiments, cloud infrastructure system 102 may also include infrastructure resources 116 for providing the resources used to provide various services to customers of cloud infrastructure system 102. In one embodiment, infrastructure resources 116 may include pre-integrated and optimized combinations of hardware, such as servers, storage, and networking resources to execute the services provided by the PaaS platform and the SaaS platform.

In some embodiments, resources in cloud infrastructure system 102 may be shared by multiple users and dynamically re-allocated per demand. Additionally, resources may be allocated to users in different time zones. For example, cloud infrastructure system 102 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 118 may be provided that are shared by different components or modules of cloud infrastructure system 102 and by the services provided by cloud infrastructure system 102. These internal shared services 118 may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, a number of external shared services 120 may be provided that are shared by different components or modules of cloud infrastructure system 102 and by the services provided by cloud infrastructure system 102. These external shared services 120 may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In various embodiments, external shared services 120 may include one or more components that provide access, data transformation, automation, or the like to enterprise computer system(s) 126. Access to enterprise computer system(s) 126 may be shared by different components or modules of cloud infrastructure system 102 and by the services provided by cloud infrastructure system 102. In some embodiments, access to enterprise computer system(s) 126 may be shared by service instances provided by cloud infrastructure system 102 that are restricted to one or more subscribers.

In further embodiments, external shared services 120 may include external application programming interface ("API") services 128 that are shared by different components or modules of cloud infrastructure system 102 and by the services provided by cloud infrastructure system 102. These external API services 128 may include, without limitation, APIs provided by other third party services or entities.

Various different mobile cloud services may be provided by MCS 122 in cloud infrastructure system 102. MCS 122 facilitates communication between a mobile computing device and enterprise computer systems (e.g., enterprise computer systems 124 and 126) according to some embodiments of the present invention. MCS 122 may include one or more memory storage devices ("local storage") used to store enterprise data and authentication information. Enterprise data may be received from enterprise computer systems 126 or from client computing devices 104, 106, or 108 or may include enterprise data converted by cloud infrastructure system 102, or combinations thereof. Authentication information may be received from identity management system 116 and/or generated by cloud infrastructure system 102. In some embodiments, authentication information may include information indicating security authentication of a user with regard to a request for a service.

Enterprise computer systems, such as enterprise computer systems 126 may be physically located beyond a firewall of cloud infrastructure system 102 at a different geographic location (e.g., remote geographic location) than cloud infrastructure system 102. In some embodiments, enterprise computer systems 126 may include one or more different computers or servers. In some embodiments, enterprise computer systems 126 may be part of a single computer system.

In certain embodiments, enterprise computer systems 126 may communicate with cloud infrastructure system 102 using one or more different protocols. Each of enterprise computer systems 126 may communicate with cloud infrastructure system 102 using a different communication protocols. Enterprise computer systems 126 may support the same or different security protocols. In some embodiments, MCS 122 may include an agent system to handle communication with enterprise computer systems 126.

A protocol may include a communication protocol, such as SPeeDY ("SPDY"). A protocol may include an application protocol such as an HTTP-based protocol. In some embodiments, enterprise computer systems 126 may communicate with cloud infrastructure system 102 using a communication protocol such as REST or Simple Object Access Protocol ("SOAP"). For example, REST protocol may support a formats including uniform resource identifier ("URI") or uniform resource locator ("URL"). Enterprise Data formatted for communication using REST protocol may be easily converted to data formats such as JavaScript Object Notation ("JSON"), comma-separated values ("CSV"), and really simple syndication ("RSS"). Enterprise computer systems 126 and cloud infrastructure system 102 may communicate using other protocols such as remote procedure calls ("RPC") (e.g., extended markup language ("XML") RPC).

In some embodiments, MCS 122 may include an adaptor interface configured to support communication with one or more services provided by cloud infrastructure service 102, some of which may support different protocols or techniques for communications. In some embodiments, MCS 122 may include an adaptor interface configured to support communication with enterprise computer systems 126, some of which may support different protocols or techniques for communications. MCS 122 may include one or more adaptors each of which may be configured to communicate according to a communication protocol, a type of enterprise computer system, a type of application, a type of service, or combinations thereof. A communication protocol supported by an adaptor may be specific to a service or one or more of enterprise computer systems 126.

In certain embodiments, client computing devices 104, 106, and 108 may each implement an application that can provide specific UIs to communicate with MCS 122. A specific UI may be configured to communicate using a specific communication protocol. In some embodiments, specific UIs may include callable interfaces, functions, routines, methods, and/or operations that may be invoked to communicate with MCS 122. Specific UIs may accept as input parameters for communicating with a service provided by cloud infrastructure service 102 or with enterprise computer systems 126 for enterprise data and/or to request a service. In some embodiments, communication through MCS 122 may be converted for communication using a custom communication protocol. In some embodiments, specific UIs may correspond to a custom client in an application.

MCS 122 may include one or more callable interfaces, e.g., an API. Callable interfaces associated with MCS 122 may enable an application on a mobile computing device to communicate requests to MCS 122. Callable interfaces associated with MCS 122 may support a common or standard interface, which may allow requests including their parameters to be received from apps according to a standardized protocol, architectural style, and/or format (e.g., a REST protocol). Callable interfaces associated with MCS 122 may be configurable by a user of any one of computing devices 104, 106, or 108. Callable interfaces associated with MCS 122 may receive requests for services according to a communication protocol. Device application developers can connect to MCS 122 for their custom applications. In some embodiments, a callable interface associated with MCS 122 may be configured by the same person that develops an app, such that the person can implement a custom application to communicate with MCS 122.

Callable interfaces associated with MCS 122 may further enable enterprise computer systems 126 to communicate with MCS 122 according to a standardized protocol or format. Similar to application developers, those who manage enterprise computer systems can implement code (e.g., an agent system) that is configured to communicate with MCS 122 via one or more callable interfaces. Callable interfaces associated with MCS 122 may be implemented based on a type of a computing device, a type of enterprise computer systems, an app, an agent system, a service, a protocol, or other criterion. In some embodiments, callable interfaces associated with MCS 122 may support requests for services including authentication, compression, encryption, pagination with cursors, client-based throttling, non-repudiation, logging, and metrics collection. In some embodiments, callable interfaces associated with MCS 122 may be implemented for custom business-related services, such as authentication, policy enforcement, caching of responses, throttling of calls to MCS 122, translation between asynchronous and synchronous patterns, logging of calls to underlying services, or combinations thereof. In some embodiments, callable interfaces associated with MCS 122 may enable users to load custom code for implementation by cloud infrastructure system 102. The custom code may implement one or more callable interfaces associated with MCS 122 for cloud infrastructure system 102, which can enable users to access custom services or other enterprise computer systems.

Protocol translators associated with MCS 122 may process a message to determine a communication protocol for a message and/or to convert a message to a communication protocol for a destination. Protocol translators associated with MCS 122 may convert a request received from client computing devices 104, 106, or 108. The request may be converted from a format of a communication protocol supported by client computing devices 104, 106, or 108 to a format of a communication protocol supported by a service provided by cloud infrastructure service 102 or enterprise computer systems 126. Protocol translators associated with MCS 122 may convert a response received from a service provided by cloud infrastructure service 102 or enterprise computer systems 126. A response may be converted from a format of a communication protocol supported by a service provided by cloud infrastructure service 102 or enterprise computer systems 126 to a format of a communication protocol supported by client computing devices 104, 106, or 108.

Security services associated with MCS 122 may manage security authentication for requests received from any of client computing devices 104, 106, or 108. Security services associated with MCS 122 may protect the integrity of customer processes and enterprise data. To prevent system or data from being compromised, security authentication may occur when a request is received from client computing devices 104, 106, or 108. Security authentication may be performed before a request is dispatched for processing by cloud infrastructure system 102. The security authentication determined for a user may enable a user associated with a mobile computing device to have authorization to request services via MCS 122. The security authentication may reduce efforts for a user to authenticate for different requests and/or services requested via MCS 122. Security services associated with MCS 122 may be implemented as one or more functional blocks or modules configured to perform various operations authenticating security of a request.

Authentication services associated with MCS 122 may manage security authentication for requests received from client computing devices 104, 106, or 108. Authentication services associated with MCS 122 may determine security authentication for a user associated with a computing device that sends a request to MCS 122. Security authentication may be determined based on a time period, which may be tied to operation of an application (e.g., launching an application), a request, a computing device, an enterprise computer system, other criterion related to a request, or combinations thereof. Security authentication may be verified and granted for any one of the following, such as an individual request, one or more enterprise computer systems, a particular service, a type of service, a user, a computing device, other criterion for determining security authentication, or combinations thereof. In some embodiments, cloud infrastructure system 102 may store authentication information of users received from enterprise computer systems or authentication systems supporting enterprise computer systems. Cloud infrastructure system 102 may determine authentication by performing a lookup function to determine whether an identity of a user associated with a request has authority to make such a request. The stored authentication information may include information such as the type of requests, functions, enterprise computer systems, enterprise data, or the like that a user may be authorized to access. In some embodiments, infrastructure system 102 may initiate communication with a requesting computing device to determine authentication.

In some embodiments, security authentication may be determined based on a role associated with a user requesting a service. The role may be associated with a user requesting access to MCS 122. In some embodiments, a user may request services as a subscriber or tenant of MCS 122 who may be granted access to resources and/or services provided by MCS 122. Authentication may correspond to a user's subscription to MCS 122, such that a user may be authorized to request services via MCS 122 as a subscriber. In some embodiments, the subscription may be limited to a particular set of resources provided by MCS 122. Security authentication may be based on the resources and/or services accessible to the user of MCS 122. In some embodiments, a request may be provisioned a template during execution called a "runtime environment." The runtime environment may be associated with resources that are allocated for a request, a user, or a device.

In some embodiments, authentication services associated with MCS 122 may request an identity management system to determine security authentication for the user. The identity management system may be implemented by cloud infrastructure system 102 (e.g., as identity management 114) or by another computer system that is external to cloud infrastructure system 102. Identity management 116 may determine security authentication of the user based on the user's role or subscription for accessing MCS 122. The role or subscription may be assigned privileges and/or entitlements with respect to an enterprise computer system, a service provided by an enterprise computer system, a function or feature of an enterprise computer system, other criterion for controlling access to an enterprise computer system, or combinations thereof.

ADF

Various different ADFs 124 may be provided in cloud infrastructure system 102. ADFs 124 provide the infrastructure code to implement agile SOA based applications. ADFs 124 further provide a visual and declarative approach to development through one or more development tools (e.g., "Oracle JDeveloper 11g" development tool). One or more frameworks provided by ADFs 124 may implement an MVC design pattern. Such frameworks offer an integrated solution that covers all the layers of the MVC architecture with solutions to such areas as Object/Relational mapping, data persistence, reusable controller layer, rich Web UI framework, data binding to UI, security and customization. Extending beyond the core Web based MVC approach, such frameworks also integrate with the Oracle SOA and WebCenter Portal frameworks simplifying the creation of complete composite applications.

In certain embodiments, ADFs 124 make it easy to develop agile applications that expose data as services by coupling a service interface to built-in business services provided by cloud infrastructure system 102. This separation of business service implementation details is performed in ADFs 124 via metadata. Use of this metadata-driven architecture enables application developers to focus on the business logic and user experience, rather than the details of how services are accessed. In certain embodiments, ADFs 124 store implementation details of services in metadata in a model layer. This enables developers to exchange services without modifying the UI, making the application extremely agile. Additionally, the developer creating the UI does not need to bother with business service access details. Instead, developers can focus on developing the application interface and interaction logic. Creating the user experience can be as simple as dragging-and-dropping the desired business services onto a visual page designer and indicating what type of component should represent that data.

In various embodiments, developers interact with ADFs 124 to create modules forming enterprise applications. The enterprise applications can be executed within the context of cloud infrastructure system 102. In various embodiments, developers interact with ADFs 124 to create modules forming mobile applications. The mobile applications can be executed within the context of cloud infrastructure system 102. Features of the present invention described below may be implemented using any desired combination of programming language and application development framework as will be apparent to one skilled in the relevant arts by reading the disclosure provided herein.

One or more frameworks provided by ADFs 124 may be embodied as Oracle ADF in one example. Accordingly, a framework in ADFs 124 can be based on an MVC design pattern. An MVC application is separated into: 1) a model layer that handles interaction with data-sources and runs the business logic, 2) a view layer that handles the application UI, and 3) a controller that manages the application flow and acts as the interface between the Model and the View layers. Separating applications into these three layers simplifies maintenance and reuse of components across applications. The independence of each layer from the others results in a loosely coupled, SOA.

In various embodiments, ADFs 124 provide tools and resources allowing developers to create an application in the form of multiple layers, each layer containing code modules/files implementing desired logic according to pre-defined specification. Thus, in one embodiment, ADFS 124 enables the application to be developed as four layers: a view layer containing code modules/files that provide the UI of the application, a controller layer containing code modules that control the flow of the application, a model layer containing data/code modules that provide an abstraction layer for the underlying data, and a business services layer containing code modules that provide access to data from various sources and handles business logic.

In certain embodiments, ADFs 124 let developers choose the technology they prefer to use when implementing each of the layers. Enterprise JavaBean ("EJB"), Web Services, JavaBeans, JPA/EclipseLink/TopLink objects, and many others can all be used as Business Services for ADFs 124. View layers can include Web based interfaces implemented with Java Server Faces ("JSF"), Desktop Swing applications and Microsoft Office front ends, as well as interfaces for mobile devices.

In one aspect, the view layer represents the UI of the application being developed. The view layer can include desktop, mobile, and browser-based views, each of which provides all or a portion of the UI and is accessible in a variety of manners corresponding to view type. For example, Web pages may be sent by the application in response to receiving client requests containing corresponding URLs. The Web pages may then be displayed by a browser on a display unit (not shown) associated with a requesting client system, thereby enabling users of the requesting client system to interact with the enterprise application. ADFs 124 support multi-channel access to business services allowing reuse of business services and access from a Web client, a client-server swing desktop-based application, Microsoft Excel spreadsheets, mobile devices such as a smart-phone, or the like.

The code files/modules forming the view layer (such as Web pages) may be implemented using one or more of hypertext markup language ("HTML"), Java server pages ("JSP"), and JSF. Alternatively, the UI may be implemented using Java components such as Swing, and/or XML. As further noted, the UI may leverage a user's experience and familiarity with desktop applications, such as Word and Excel by Microsoft.

As noted above, the relevant user-developed code/data modules are provided in each of the layers. However, each layer typically contains other pre-defined code/data modules provided by ADFs 124. Some of the pre-defined modules may be used during development, for example, as templates for developing the Web pages, for including desired functionality in the developed code etc. Other pre-defined modules (such as a URL rewriting module) may be deployed along with the developed application and may provide additional functionalities (mapping of requested URLs to internal names) to the user during execution of the enterprise application.

A controller layer contains code modules/files that control the flow of the application. Each controller object contains software instructions and/or data implemented according to a desired manner of presenting information in the view layer. The desired manner may include the specific Web pages to be displayed when links in another Web page are clicked/selected by the user, the page to be displayed when errors occur during execution, indicating the specific data to be stored/retrieved, etc.

In one aspect, the controller layer manages the applications flow and handles user input. For example, when a Search button is clicked on a page, the controller determines what action to perform (do a search) and where to navigate to (the results page). There are two controller options for Web-based applications in JDeveloper: the standard JSF controller or the ADF Controller that extends the JSF controller functionality. Whichever controller is used, application flow is typically designed by laying out pages and navigation rules on a diagram. An application's flow can be broken into smaller, reusable task flows; include non-visual components such as method calls and decision points in a flow; and create "page fragment" flows that run inside a region of a single containing page.

The code modules/files forming the controller layer are often implemented as Java servlets receiving the client requests and sending desired Web pages as corresponding responses. Controller objects may also be implemented, for example, as Apache Jakarta Struts controllers or according to the JSF standard.

A model layer contains data/code modules that connect various business services to the objects that use them in the other layers, such as to the controller objects discussed above or directly to desktop applications. Each abstract data object of the model layer provides a corresponding interface that can be used to access any type of business service executing in an underlying business service layer. The data objects may abstract the business service implementation details of a service from a client and/or expose data control methods/attributes to view components, thus providing a separation of the view and data layers.

In one aspect, the model layer consists of two components, data controls and data bindings, which utilize metadata files to define the interface. Data controls abstract the business service implementation details from clients. Data bindings expose data control methods and attributes to UI components, providing a clean separation of the view and model. Due to the metadata architecture of the model layer, developers get the same development experience when binding any type of Business Service layer implementation to the View and Controller layers.

In certain embodiments, ADFs 124 emphasize the use of the declarative programming paradigm throughout the development process to allow users to focus on the logic of application creation without having to get into implementation details. At a high level, the development process for a Fusion Web application usually involves creating an application workspace. Using a wizard, libraries and configuration needed for technologies selected by a developer are automatically added and an application is structured into projects with packages and directories.

By modeling database objects, an online database or offline replica of any database can be created, definitions edited, and schemas updated. Using a unified modeling language ("UML") modeler, use cases can then be created for the application. Application control and navigation can also be designed. Diagrammers can be used to visually determine the flow of application control and navigation. Then, an underlying XML file describing the flow can be automatically created. A resource library can be used to allow a developer to view and use imported libraries by simply dragging and dropping them into the application. From database tables, entity objects can be created using wizards or dialogs. From those entity objects, view objects are created to be used by pages in the application. Validation rules and other types of business logic can be implemented.

In this example, a business services layer manages interaction with a data persistence layer. It provides such services as data persistence, object/relational mapping, transaction management, and business logic execution. The business services layer can be implemented in any of the following options: as simple Java classes, EJB, Web services, JPA objects, and Oracle ADF Business Components. In addition, data can be consumed directly from files (XML, or CSV) as well as REST. Thus, each business service manages interaction with a corresponding data persistence layer, and also provides such services as object/relational mapping, transaction management, business logic execution, etc. The business services layer may be implemented using one or more of simple Java classes, Enterprise Java Beans, Web services, etc.

Business components represent a business service implemented using, for example, "Oracle ADF Business Components" from Oracle Corp., to provide interaction with databases, Web services, legacy systems, application servers, and the like. In one embodiment, business components of the business services layer contain a mixture of application modules, view/query objects, and entity objects, which cooperate to provide the business service implementation. An application module can be a transactional component/code module that UI clients communicate with for working with application/transaction data. The application module may provide an updatable data model and also procedures/functions (commonly referred to as service methods) related to user transactions.

An entity object may represent a corresponding row in a database table and simplifies the manipulation (update, deletion, etc.) of the data stored in the corresponding row. An entity object often encapsulates business logic for the corresponding row to ensure that the desired business rules are consistently enforced. An entity object may also be associated with other entity objects to reflect relationships existing between rows stored in the underlying database.

Figure 2:
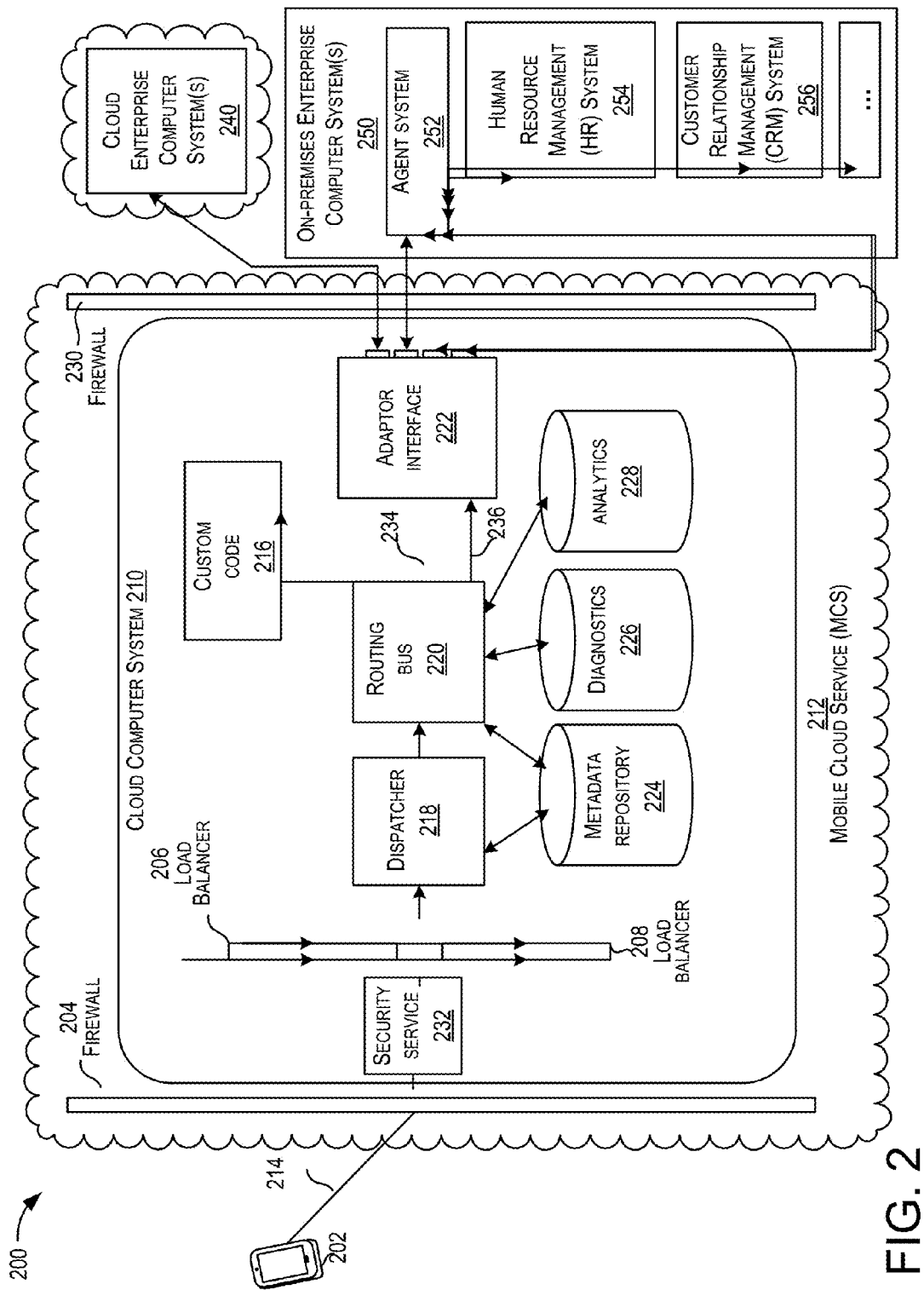
FIG. 2 is a block diagram of a computing environment to facilitate communication between a mobile computing device and enterprise computer systems according to some embodiments of the present invention.

FIG. 2 shows a block diagram of a computing environment 200 for facilitating communication between a mobile computing device and enterprise computer systems according to some embodiments of the present invention. For purposes of illustration, various examples are provided herein to describe techniques for enabling a mobile computing device (e.g., computing device 202) to communicate with one or more enterprise computer systems, such as a cloud enterprise computer system 240 (e.g., "serviceprovider.com") and an on-premises enterprise computer system 250. Such communications may be to exchange or transfer enterprise data, request services provides by an enterprise computer system, communicate messages, or combinations thereof.

Messages may include service invocation messages, result messages, request messages, other messages communicated internally, other messages communicated between a computing device and an enterprise computer system, or combinations thereof. A message may include a message type (e.g., a type value from a set of shared type constants), a correlation id (e.g., an id used to correlate this message with one or more other messages), priority information to support for priority based message queues, timeout, sensitivity indicator to support message data isolation, message source (e.g., a uniform resource identifier of a sender), a message destination (e.g., a uniform resource identifier that uniquely identifies the destination, a request context (e.g., request information from dispatcher), and/or a message payload. The payload may have different attributes depending upon the type of message that is being sent, such as parameter data and result data.

Enterprise data as described herein may include data received from an enterprise computer system, data sent to an enterprise computer system, data processed by an enterprise computer system, or combinations thereof. The enterprise data may be distinguishable from data for consumer applications and/or services. In some embodiments, for example, enterprise data may change based on application or use of the enterprise data, whereas data for consumer applications (e.g., consumer data) may remain static through use. In certain embodiments, enterprise data may include or be associated with rules that indicate criteria for storing, using, and/or managing the enterprise data. For example, enterprise data may be associated with policy information that indicates one or more policies for storing, using, and/or managing the enterprise data. In certain embodiments, policy information may be included in enterprise data. In certain embodiments, enterprise data may include data processed, stored, used, or communicated by an application or a service executing in an enterprise computer system. For example, enterprise data may include business data (e.g., business objects) such as "JavaScript Object Notation" ("JSON") formatted data from enterprise applications, structured data (e.g., key value pairs), unstructured data (e.g., internal data processed or used by an application, data in JSON format, social posts, conversation streams, activity feeds, etc.), binary large objects ("BLOBs"), documents, system folders (e.g., application related folders in a sandbox environment), data using REST techniques (referred to herein as "RESTful data") (e.g., synchronization data made available by REST endpoints), system data, configuration data, synchronization data, or combinations thereof. In some embodiments, enterprise data may include REST-formatted enterprise data. REST-formatted enterprise data may include RESTful data. REST-formatted data may include data formatted according to REST techniques implemented by an enterprise computer system. Configuration or synchronization data may include data used for synchronization of enterprise data, such as versions, history, integration data, etc. Documents in enterprise data may include XML files, visual assets, configuration files, media assets, etc. A BLOB may include a collection of binary data stored as a single entity in a database management system, such as an image, multimedia object, or executable code, or as otherwise known in the art.

An enterprise computer system may include various computing systems that are configured to operate for an entity or an enterprise. For example, an enterprise computer system may include one or more computer systems, such as an enterprise server computer (e.g., a back-end server computer), to handle requests for services. An enterprise computer system may include applications and/or services, which can process and/or operate using enterprise data. For example, enterprise computer system 250 may provide one or more services and/or applications for managing or operating an enterprise. Services may include, without restriction, customer relationship management ("CRM"), human capital management ("HCM"), human resource ("HR") management, supply chain management, enterprise communication, email communication, business services, other enterprise management services or applications, or combinations thereof. Enterprise computer system 250 may include one or more computer systems dedicated to providing one or more services. In some embodiments, each different computer system providing a service may be located on-premise of an enterprise or may be located remotely from an enterprise. In some embodiments, multiple different computer systems supporting different services may be situated in a single geographical location, such as on-premises of an enterprise. In the example shown in FIG. 2, on-premises enterprise computer system 250 may include an HR system 254 and a CRM system 256, both of which may be located on-premises of an enterprise. In some embodiments, enterprise computer system 250 may include or implement an agent system 252 to facilitate or handle communication between cloud computer system 210 and one or more enterprise systems 254, 256. Enterprise computer systems, such as cloud enterprise computer system 240 and on-premises enterprise computer system 250 are described below in further detail.

The computer environment 200 may include MCS 212 implemented to operate as a secure intermediary computing environment that may facilitate communication between the computing device 202 and one or more enterprise computer systems because computing device 202 may not be configured to communicate with such enterprise computer systems. For example, some enterprise computer systems may be supported by legacy or back-end computer systems. Such systems may be configured to operate using different communication and/or security protocols. The protocols supported by such enterprise computer systems may be different from those supported by mobile computing devices. MCS 212 may support communication with different types of mobile computing devices. As such, MCS 212 may implement techniques to facilitate communication between enterprise computer systems and mobile computing devices to enable them to communicate with each other despite their incompatibilities in communication, such as differences between formats or communication protocols. For example, MCS 212 may translate communication protocols between mobile computing devices and enterprise computer systems.

Cloud computer system 210 may support MCS 212. Cloud computer system 210 may be implemented using hardware, software, firmware, or combinations thereof. For example, cloud computer system 210 may include one or more computing devices, such as a server computer. Cloud computer system 210 may include one or more memory storage devices and one or more processors. A memory storage device can be accessible to the processor(s) and can include instructions stored thereon which, when executed by the processor(s), cause the processor(s) to implement one or more operations disclosed herein. In some embodiments, the memory storage devices may operate as local storage (e.g., cache). Cloud computer system 210 may include different kinds of operating systems. A memory storage device may be accessible to the processor(s) and may include instructions stored thereon which, when executed by the processor(s), cause the processor(s) to implement one or more operations, methods, or processes disclosed herein. The memory storage may operate as local storage. Local storage may be implemented using any type of persistent storage device, such as a memory storage device or other computer readable storage medium. In some embodiments, local storage may include or implement one or more databases (e.g., a document database, a relational database, or other type of database), one or more file stores, one or more file systems, or combinations thereof. The local storage may store enterprise data.

In certain embodiments, cloud computer system 210 may include one or more data stores, such as a metadata repository 224, diagnostics store 226, and an analytics store 228. The data stores 224, 226, 228 may be accessible by any component in cloud computer system 210.

Metadata repository 224 may store all the metadata associated with MCS 212. This information may be composed of both run-time and design-time data, each having their own requirements on availability and performance. A tenant or subscriber of MCS 212 may have any number of applications. Each application may be versioned and may have an associated zero or more versioned resource APIs and zero or more versioned services implementations those resource API contracts. These entities are what the run-time uses to map virtual requests (mAPIs) to the concrete service implementation (service). This mapping provides a mobile developer with the luxury of not having to know the actual implementation service when she designs and builds her application. As well as not requiring her to have to republish a new application on every service bug fix. Metadata repository 224 may store one or more callable interfaces, which may be invoked by a computing device (e.g., computing device 202). The callable interfaces may be customizable by a user (e.g., a developer) of an application to facilitate communication with MCS 212. Metadata repository 224 may store metadata corresponding to one or more configurations of a callable interface. Metadata repository 224 may be configured to store metadata for implementing a callable interface. The callable interface may be implemented to translate between a one format, protocol, or architectural style for communication and another format, protocol, or architectural style for communication. Metadata repository 224 may be modifiable by an authenticated user via the external network.

Diagnostics store 226 may store diagnostics information about processing occurring in MCS 212. Diagnostics store 226 may store messages communicated via MCS 212 and log information. Analytics store 228 may store logging and analytics data captured during processing in the system.

On behalf of MCS 212, cloud computer system 210 may utilize its computing resources to enable execution of custom code 216 (e.g., operations, applications, methods, functions, routines, or the like). Computing resources may be allocated for use with respect to a particular user associated as a subscriber or tenant to MCS 212. Resources may be allocated with respect to a user, a device, an application, or other criterion related to a subscriber. MCS 212 may be scaled in or out, depending on the demand of mobile computing devices seeking to communicate with enterprise computer systems. MCS 212 can be configured such that it is elastic to handle surges and temporary periods of higher than normal traffic between mobile computing devices and enterprise computer systems. In some embodiments, MCS 212 may include elements that support scalability such that components may be added or replaced to satisfy demand in communication.

Computing device 202 may communicate (e.g., send a request message) with MCS 212 to request service provided by an enterprise computer system. Computing device 202 (e.g., a mobile computing device) may be implemented using hardware, firmware, software, or combinations thereof. Computing device 202 may communicate with enterprise computer systems 240, 250 via MCS 212. Computing device 202 may include or may be implemented as an endpoint device, a PDA, a tablet computer, a laptop computer, a mobile computing device, a desktop computer, a wearable computer, a pager, etc. Computing device 202 may include one or more memory storage devices and one or more processors. Computing device 202 may include different kinds of operating systems. A memory storage device may be accessible to the processor(s) and may include instructions stored thereon which, when executed by the processor(s), cause the processor(s) to implement one or more operations, methods, or processes disclosed herein. The memory storage may operate as local storage. Local storage may be implemented using any type of persistent storage device, such as a memory storage device or other computer readable storage medium. In some embodiments, local storage may include or implement one or more databases (e.g., a document database, a relational database, or other type of database), one or more file stores, one or more file systems, or combinations thereof. The local storage may store enterprise data.

In various embodiments, computing device 202 may be configured to execute and operate one or more applications such as a web browser, a client application, a proprietary client application, or the like. The applications can include specific applications configured for enterprise data and/or services provided by an enterprise computer system. Client applications may be accessible or operated via one or more network(s). Applications may include a graphical UI ("GUI") for operating the application.

Computing device 202 may communicate with MCS 212 via one or more communication networks using wireless communication. Examples of communication networks may include a mobile network, a wireless network, a cellular network, a LAN, a wide area network ("WAN"), other wireless communication networks, or combinations thereof. In certain embodiments, computing device 202 may establish a communication connection 214 with MCS 212 using a custom communication protocol (e.g., a custom protocol). Connection 214 may be established with MCS 212 through cloud computer system 210. The custom protocol may be an HTTP-based protocol. By utilizing a custom communication protocol, computing device 202 may operate on any computing device platform to communicate with cloud computer system 210.

Computing device 202 may communicate with cloud computer system 210 through one or more callable interfaces, e.g., APIs. A callable interface may be implemented on computing device 202. The callable interface may be implemented for custom applications that enable those applications to communicate with MCS 212. In some embodiments, a callable interface may be developed for MCS 212. The callable interface may enable applications to communicate with MCS 212 without having to adapt to differences in protocols (e.g., communication or development protocols) and/or architectural styles or formats.

MCS 212 may be protected by one or more firewalls 204, 230 to provide a secure environment to process requests and execute custom code 216. Communication between computing device 202 and MCS 212 may be separated by an external communication firewall 204. Firewall 204 may be connected with cloud computer system 210 to facilitate secure access to MCS 212. Firewall 204 may permit communication of messages between cloud computer system 210 and computing devices (e.g., computing device 202). Such messages (e.g., HTTP messages or REST messages) may conform to a communication protocol (e.g., HTTP or REST), which may be supported by a callable interface. In another example, a message between cloud computer system 210 and computing device 202 may conform to a communication protocol such as SPDY. MCS 212 may manage firewall 230 to secure communication between cloud computer system 210 and enterprise computer systems 240, 250. Firewall 230 may permit communication of messages between cloud computer system 210 and computing devices (e.g., computing device 202). Such messages (e.g., SPDY messages, HTTP messages or REST messages) may conform to a communication protocol (e.g., SPDY, HTTP, or REST). Communication between computing device 202 and enterprise computer systems 240, 250 may be two-way via MCS 212.

Because communication with computing device 202 and enterprise computer systems 240, 250 may occur via an unsecure, public network, firewalls 204, 230 provide an added layer of protection for communications to and from MCS 212. Firewalls 204, 230 may enable MCS 212 to distinguish its internal network from an external network connecting computing device 202 and enterprise computer systems 240, 250. In some embodiments, firewalls 204, 230, although shown as two distinct firewalls, may be implemented as a single firewall that encapsulates MCS 212.

Cloud computer system 210 may further operate as an intermediary computing environment by communicating with enterprise computer systems, some of which may have different communication protocols. Such communication protocols may be custom or specific to an application or service in communication with cloud computer system 210. Further, cloud computer system 210 may communicate with an enterprise computer system to provide enterprise services and/or to exchange enterprise data according to a format supported by the enterprise computer system. Cloud computer system 210 may maintain local storage (e.g., local cache) of enterprise data and may use the local storage to manage synchronization of the enterprise data between mobile computing devices and enterprise computer systems 240, 250.

Computing device 202 may communicate (e.g., send a request message) with MCS 212 to request service provided by an enterprise computer system. Requests that are received through firewall 204 may be processed first by security service 232. Security service 232 may manage security authentication for a user associated with a request. Thus, a cloud computer system may provide technical advantages that include providing security mechanisms described herein which may protect the integrity of customer communications and enterprise data. Technical advantages of cloud computer system may include preventing or reducing compromised communications and/or data from being compromised, authentication may occur initially, restricting access to only those who have the required credentials. Technical advantages of cloud computer system may include the services and service invocation flow being structured such that as requests come in they may only be able to access services for which they are authorized. By decoupling authorization from the rest of the system processing, another technical advantage may include the task of authorizing "what can be done by whom" being delegated to a dedicated provisioned security subsystem (e.g., an identity management system) that may be expanded to support whatever additional custom security measures are required by a specific corporate customer. In some embodiments, security authentication may be determined for a request, a session, a user, a device, other criterion related to the user, or combinations thereof. Security authentication may be performed for each request that is received. In some embodiments, security service 232 may determine authentication based on a previous verification of a request. Security authentication may be determined for a user or a device such that requests to different enterprise computer systems 240, 250 may be authenticated based on a single verification of security.

Further technical advantages of the invention may include a cloud computer system enabling a computing device to communicate with various enterprise computer systems, some of which may be implemented differently. For example, a computing device 202, cloud computer system 210, and enterprise computer system 250 may be located at different geographical locations, physically separated from each other. Therefore, computing device 202 can communicate with enterprise computer system 250 regardless of their location. Technical advantages may include a cloud computer system enabling a computing device to communicate requests for services to enterprise computer systems, which may support one or more distinct security protocols. In some cases, an enterprise computer system may be supported by a back-end system that is not easily adaptable to a different security protocol. In some cases, it may be desirable for developers of applications to be able to implement an application to be able to request services without knowledge of such security protocols. It may be equally desirable for a user (e.g., an administrator or an architect) of an enterprise computer system to be able to receive requests without accommodating for different types of applications, security protocols, and standards. Technical advantages may enable such desires to be met by implementation of a cloud computer system, as described herein, which can handle security authentication, such that requests can meet the security measures of different enterprise computer systems that are being requested.

In some embodiments, security service 232 may determine a security protocol for a requested enterprise computer system and accordingly generate a security token according to such security protocol. The security token may be passed along with a request to an enterprise computer system to enable that enterprise computer system to verify authentication based on the generated security token. Enterprise computer systems may support different security protocols. A security protocol may be a standard by which security is determined. Security may be verified based on a security token that is generated by security service 232. Security service 232 may determine a security protocol for an enterprise computer system identified for a request. In some embodiments, an enterprise computer system 250 may have an agent system 252, which may be configured or implemented according to a custom or specific security protocol supported by MCS 212. As such, MCS 212 may generate a security token according to such custom security protocol.

Cloud computer system 210 may include, implement, and/or communicate with one or more load balancer systems 206, 208. Upon determining security authentication, cloud computer system 210 may request any one of load balancer systems 206, 208 to examine a request that it receives and to detect which service the request is directed to. MCS 212 may be configured with load balancers 206, 208 and updated with resources that get started up, so that when a request comes in, load balancers 206, 208 can balance a requested load across the different resources.

Cloud computer system 210 may include a dispatcher 218 that may handle requests and dispatch them to the appropriate service. A request may be routed to an appropriate service upon dispatch. In some embodiments, a service itself may route an internal request to another internal service in MCS 212 or in an enterprise computer system. In some embodiments, dispatcher 218 may resolve a request to determine its destination based on a location (e.g., an address) of a destination identified in a URI and/or URL of the request. Dispatcher 218 may parse a request and its header to extract one or more of the following information: tenant identifier, service identifier, application name, application version, request resource, operation and parameters, etc. Dispatcher 218 can use the parsed information to perform a lookup in metadata repository 224. Dispatcher 218 may retrieve a corresponding application metadata. Dispatcher 218 may determine the target service based on the requested resource and the mappings in the metadata. While initially a very basic mapping, the metadata can be enhanced to provide for more sophisticated, rules-based dispatching. Dispatcher 218 may perform any dispatcher-specific logging, metrics gathering, etc. Dispatcher 218 may then perform initial authorization according to the application metadata. Dispatcher 218 may format the inbound request and any other necessary information and place the message on routing bus 220 for further processing. Dispatcher 218 may place a request on a queue and await the corresponding response. Dispatcher 218 may process responses received from routing bus 220 and return a response to computing device 202.

In addition to handling the dispatching for external requests, dispatcher 218 may also play a role in dispatching internal requests. Such internal requests can come in the form of composite services or custom code invocations to services. In both cases, the caller could use a logical service name as defined within the application. Dispatcher 218 may use the current execution context to determine the application and use that logical name to determine the appropriate service to invoke.

Cloud computer system 210 may include a routing bus 220 to manage deliver of messages to destinations registered with routing bus 220. Routing bus 220 may operate as a central system for managing communications in cloud service 212. Data communicated through routing bus 220 may be processed to capture and store the data. Routing bus 220 may provide a framework so that additional centralized services (additional authorization, debugging, etc.) can be plugged in easily as necessary. Data captured by routing bus 220 may be stored in diagnostics store 226 and/or analytics store 228.

Routing bus 220 may route messages to one or more destinations. In some embodiments, a message may include a request to execute custom code 216. In such embodiments, routing bus 220 may request 234 custom code 216 to be invoked. In some embodiments, routing bus 220 may pass on a request to a destination enterprise computer system identified by information in a request. Routing bus 220 may request 236 an adaptor interface 222 to perform translations, if necessary, to pass a request to an enterprise computer system, e.g., enterprise computer system 240 or enterprise computer system 250.

In certain embodiments, cloud computer system 210 may include or implement adaptor interface 222 to translate or convert a message to a protocol supported by a receiving enterprise computer system. Adaptor interface 222 may establish separate communication connections with each of enterprise computer systems 240, 250. Cloud computer system 210 may be configured to communicate with enterprise computer systems 240, 250 via one or more networks (not shown). Examples of communication networks may include the Internet, a mobile network, a public network, a wireless network, a cellular network, a LAN, a WAN, other communication networks, or combinations thereof. In certain embodiments, communication connections may be high-speed communication connections facilitated using high-speed communication trunks. Communication with an enterprise computer system 240, 250 may pass through firewall 230 which ensures that communication with an external network is secure to prevent unauthorized access to MCS 212 via such communications.

In some embodiments, cloud computer system 210 may facilitate notifications to a user of computing device 202. Cloud computer system 210 may include an alert management service that supports stateful interaction with a user, for example to deliver an alert based on user preferences through one or more channels, wait for a response, and take action based on the response. Responses to an alert sent on one channel may be received through another channel, which the service needs to be able to handle. The platform may come with built-in state models for popular interaction patterns and be extensible with new state models. Some alert channels may include known communication resources, either one-way or two-way. Examples include SMS, Twitter®, push notifications, and Google Cloud Messaging®.

In some embodiments, cloud computer system 210 may enable computing device to access and/or request one or more services, such as an object store service, database service, access web services, social services, resource services, or combinations thereof.

Cloud computer system 210 may provide an object store service that may provide a storage facility for BLOBs. The basic unit of storage can be text, with read and write operations. A basic query facility for JSON objects may also be offered.

Cloud computer system 210 may provide a database service to allow for connectivity to hosted databases for performing queries or writes. Required parameterization may require the full connection string for the database, the SQL string or stored procedure to execute, any parameters and possibly credentials. The necessary information can be provided at run time or be pre-configured in the application metadata.

Cloud computer system 210 may provide access to web services such as SOAP web services. Cloud computer system 210 may provide access to REST services, such as connectivity to arbitrary REST resources.

Cloud computer system 210 may provide access to social services that may provide basic integration with many of the popular social sites such as Facebook®, Twitter®, etc. These services may allow for third party authentication using the user's credentials from those sites as well as access to their services. Examples include sending a tweet or updating your status.

Cloud computer system 210 may provide an public cloud service to enable a user to simplify and optimize communication. For example, a service developer may use the generic web service of MCS 212 to talk to a resource hosted using cloud computer system's 210 cloud service.

A cloud computer system, such as one described herein, may enable mobile computing devices to communicate with enterprise computer system despite differences in computing resources. A cloud computer system may be equipped with more resources and a faster, more reliable connection to enterprise computer systems to communicate frequently to receive enterprise data. The cloud computer system may manage and coordinate requests for services from enterprise computer systems. By translating requests to a protocol supported by a recipient of a message, the cloud computer system reduces a burden on developers to configure applications for communication with different types of back-end computer systems. Enterprises are able to maintain their back-end systems without having to accommodate advances or changes in communication protocols supported for mobile devices. Different enterprise computer systems may support different security protocols based on a type of requests processed and services provided. By managing security authentication in a centralized manner for access to different enterprise computer systems, enterprise computer systems do not need to adapt to differences in security protocols. By authenticating a user of the cloud computer system, processing requests can become more efficient as authentication may not be performed in every instance.

In some embodiments, an application may be deployed under a mobile application framework ("MAF") that provides built in security to control access to the application and ensure encryption of sensitive data, such as Oracle MAF from Oracle Corp. MAF is a hybrid mobile architecture that uses HTML5 and Cascading Style Sheets ("CSS") (to render the UI in the web view), Java (for the application business logic), and Apache Cordova (to access device features such as GPS activities and e-mail). Because MAF uses these cross-platform technologies, the same application can be built for both Android and iOS devices without having to use any platform-specific tools. After an application is deployed to a device, it behaves as applications created using such platform-specific tools as Objective C or the Android SDK. Further, MAF allows for building the same application for smartphones or for tablets, thereby allowing reuse of business logic in the same application and target various types of devices, screen sizes, and capabilities.

Figure 3:
FIG. 3 illustrates a mobile application springboard in accordance with an embodiment of the present invention.

FIG. 3 illustrates an example mobile application springboard 300 that includes a MAF application called "WorkBetter" that is deployed as a "heavy" application (e.g., a mobile application that sits in a mobile device in the same manner as a normal iPhone app obtained from the App store). A MAF application may include one or more embedded applications added as application features. Such added application features are represented as icons within the main application's springboard or navigation bar. Application features are essentially the building blocks of such mobile application. Each application feature that is integrated into a MAF application performs a specific set of tasks. Application features can be grouped together to complement each other's functionality. For example, an application feature that provides customer contacts may be paired with one for product inventory. Because each application feature has its own class loader and web view, application features are independent of one another, thus a single MAF application can be assembled from application features created by several different development teams. Application features can also be reused in other MAF applications. A MAF application itself can be reused as the base for another application, allowing independent software vendors ("ISVs") to create applications that can be configured by specific customers.

In addition to hybrid mobile applications that run locally on the device, application features may be implemented as any of the following mobile application types, depending on the requirements of a mobile application and available resources:

Mobile web applications hosted on a server. For these applications, although the code can be portable between platforms, access to device features and local storage can be limited, as these applications are governed by the device's browser.

Native applications authored in either Xcode or through the Android SDK and therefore limited in terms of serving both platforms. Reuse of code is likewise limited.

MAF supports authentication and access control for refined security at the feature level in an application where a developer can specify appropriate login server, e.g., a server running "Oracle Identity Management" and/or "Oracle WebLogic" with basic authentication, a server supporting OAuth protocols, etc. At runtime users are presented with login screens and appropriate tokens are accessible for further Web service calls. With MAF, developers can build single UIs that meet the needs of users with different privileges (e.g., show/hide components based on user role or privilege).

MAF enforces communication encryption using SSL/TLS (HTTP secure ("HTTPS")), on-device encryption to keep credentials in an encrypted key store to be use for validation when supporting offline authentication, and SQLite database encryption by using the SQLite encryption extension. Encrypting a SQLite database for an application built with MAF may be performed via a configuration option when the application is developed. In some embodiments, MAF supports offline and online modes of operation for an application so a self-contained application can run on a mobile device in connected and disconnected modes. For data access/storage, such application may leverage a local encrypted SQLite database. The application may be built such that initial access to data is performed from remote servers through Web services, and the data is then stored in the local SQLite database for offline access. The data can be replicated and synchronized to the server when connectivity is available again. MAF also supports local storage of user authentication credential to enable offline authentication/authorization to secured applications.

Figure 3A:
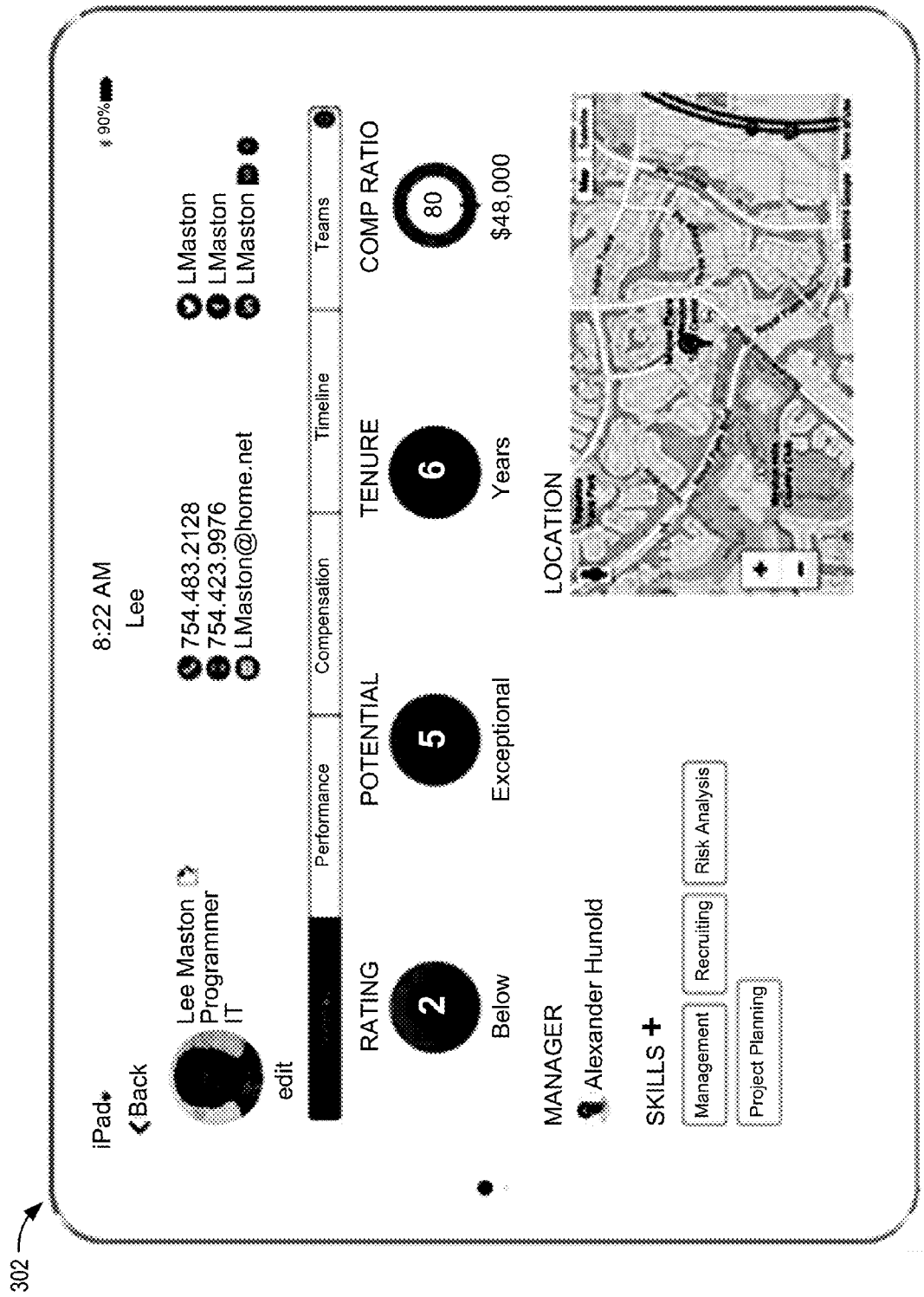
FIGS. 3A and 3B illustrate a mobile application user interface in accordance with an embodiment of the present invention.
Figure 3B:
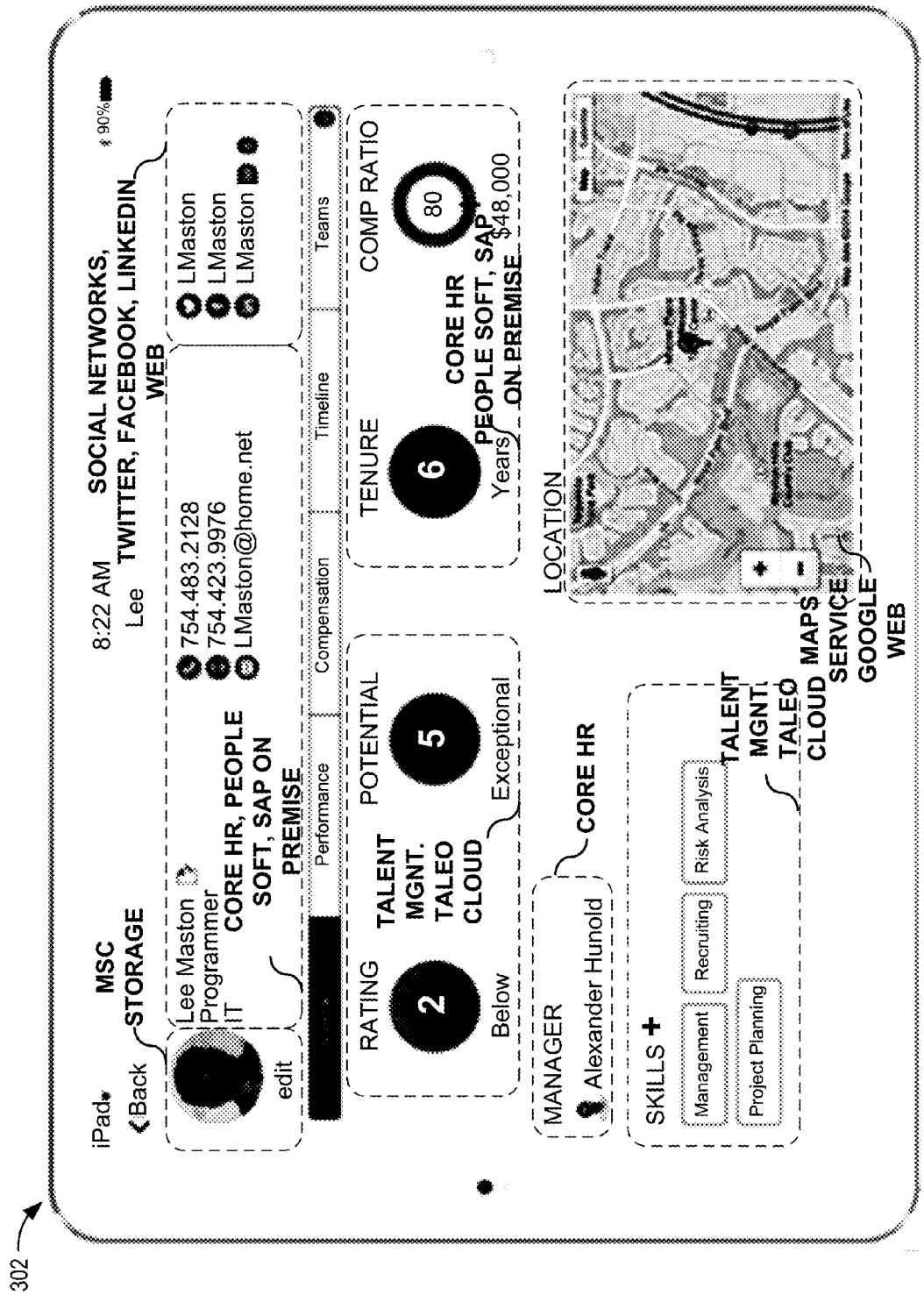

FIGS. 3A and 3B illustrate an HR mobile application UI 302 in accordance with an embodiment of the present invention. UI 302 may be provided upon opening an icon on a springboard such as mobile application springboard 300 of FIG. 3. In FIG. 3A, UI 302 includes various HR related information about an employee, such as picture, title, contact information, social networking information, performance/rating information, compensation information, manager, skills, location, etc. FIG. 3B indicates various sources where the information in UI 302 may be obtained from, such as services located on premise or in the cloud. For example, basic employee information may be obtained from on premise core HR services such as PeopleSoft, Systems, Applications & Products ("SAP"), etc., while location information is obtained from a map service such as Google. Similarly, performance information may be obtained from a talent management cloud service such as TALEO, and social networking information (e.g., Twitter, Facebook, LinkedIn, etc.) may be obtained from the web. In one embodiment, the information from these various sources is channeled through MCS before being sent down to the application on the mobile device.

Figure 4:
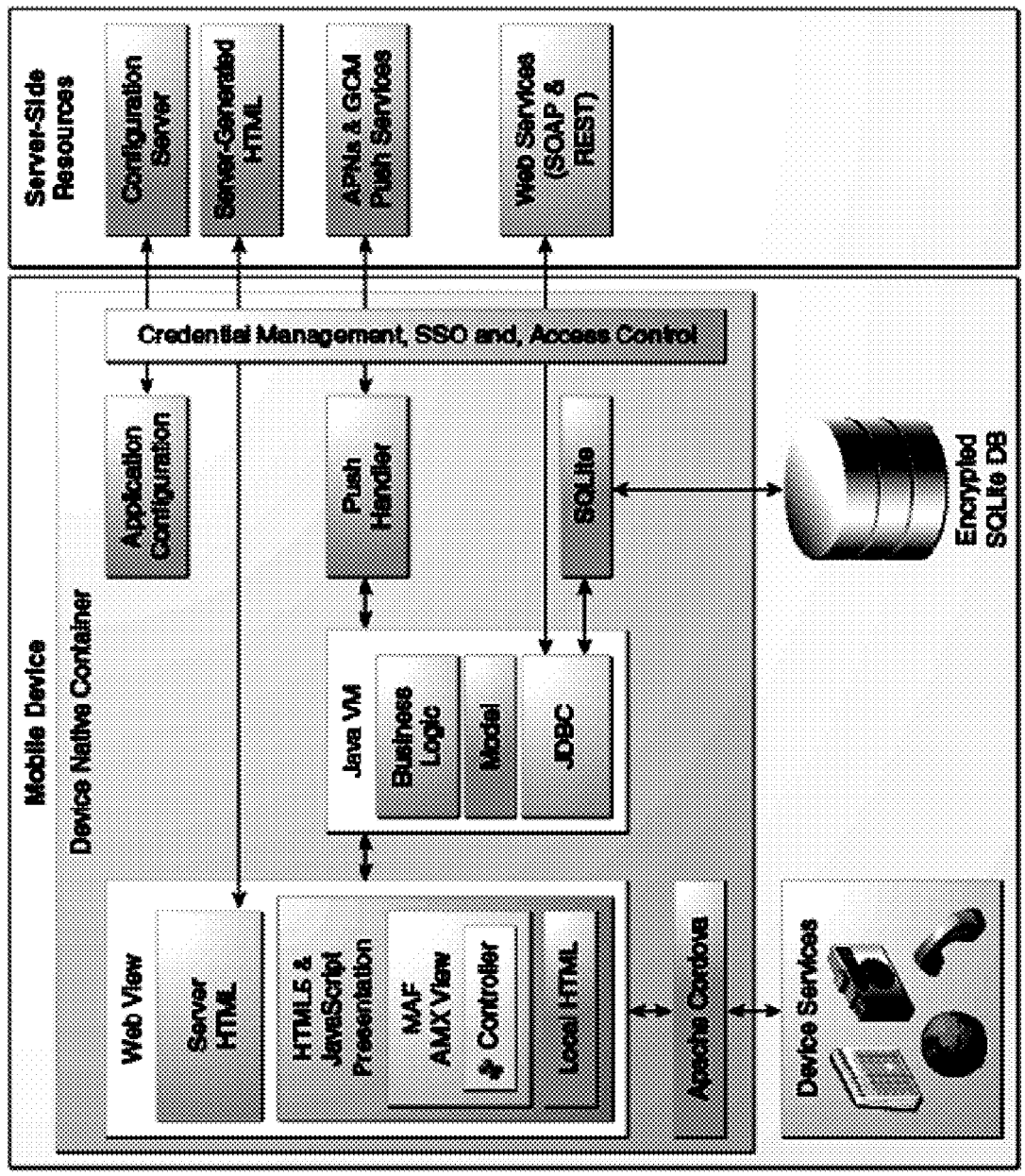
FIG. 4 is a block diagram of a mobile application framework runtime architecture in accordance with embodiments of the present invention.

FIG. 4 is a block diagram of an example MAF runtime architecture 400 including a "thin" native container which is deployed to a device. Runtime architecture 400 represents the MVC development approach which separates the presentation from the model layer and the controller logic. The thin native container allows the MAF application to function as a native application on different platforms (e.g., iOS, Android, etc.) by interacting with the local SQLite database, the Cordova API, and server-side resources. It also enables push notifications.

The device native container includes Web View that uses a mobile device's web engine to display and process web-based content. In a MAF application, Web View delivers the UI by rendering the application markup as HTML 5. The UI may be created for a mobile application feature by implementing any of the following content types: MAF Application Mobile XML ("AMX") Views, Controller, Server HTML, or Local HTML. Application features implemented from various content types can coexist within the same mobile application and can also interact with one another.

Applications whose contents are implemented as MAF AMX views reside on the device and provide the most authentic device-native user experience, similar to an application authored in the language specific to the device's platform. MAF provides a set of code editors that enable a user to declaratively create a UI from components that are tailored to the form factors of mobile devices. These components can be used to create the page layout (e.g., list view) as well as input components (e.g., input fields). When a user develops MAF AMX views, the user can leverage data controls. These components enable the user to declaratively create data-bound UI components and access a Web service and the services of a mobile device (e.g., camera, GPS, or e-mail). At runtime, the JavaScript engine in the Web View renders MAF AMX view definitions into HTML5 and JavaScript.

For applications whose contents are implemented as Controller, the controller governs the flow between pages in the mobile application. The Controller enables a user to break an application's flow into smaller reusable task flows and include non-visual components such as method calls and decision points.

For applications whose contents are implemented as Server HTML, the UI is delivered from server-generated Web pages that can open within the application feature's Web View. Within the context of MAF, this content type is referred to as remote URL. The resources for these browser-based applications do not reside on the device. Instead, the UI, page flow logic, and business logic are delivered from a remote server. When one of these remotely hosted Web applications is allowed to open within the Web View, it can use the Cordova JavaScript APIs to access any designated device-native feature or service, such as the camera or GPS capabilities. When implementing an application using the remote URL content, a user can leverage an existing browser-based application that has been optimized for mobile use, or use one that has been written specifically for a specific type of mobile device. For applications that can run within the browsers on either desktops or tablets, the user can implement the remote URL content using applications created through rich client-based components such as those provided by "Oracle ADF Faces" from Oracle Corp. For applications specifically targeted to mobile phones, the remote URL content can be delivered from Web pages created using MAF. Not only can applications authored with MAF render on a variety of smartphones, but they can gracefully degrade to the reduced capabilities available on feature phones through UIs constructed with Apache Trinidad JSF components and dynamically selected style sheets. Because the content is served remotely, the application is available only as long as the server connection remains active.

For applications whose contents are implemented as Local HTML, HTML pages run on the device as part of the MAF application. Local HTML files can access device-native features services through the Cordova and JavaScript APIs.

The device native container further includes the Apache Cordova. Apache Cordova JavaScript APIs that integrate the device's native features and services into a mobile application. Although a user can access these APIs programmatically from Java code (or using JavaScript when implementing a MAF mobile application as local HTML), the user can add device integration declaratively when creating MAF AMX pages because MAF packages these APIs as data controls.

The device native container further includes a Java Virtual Machine ("JVM"). Java provides a Java runtime environment for a MAF application. This JVM is implemented in device-native code, and is embedded (or compiled) into each instance of the MAF application as part of the native application binary. The JVM is based on the JavaME Connected Device Configuration ("CDC") specification. In runtime architecture 400, JVM includes business logic, model and JDBC. Java enables the business logic in MAF applications. Managed Beans ("MBeans") are Java classes that can be created to extend the capabilities of MAF, such as providing additional business logic for processing data returned from the server. MBeans are executed by the embedded Java support, and conform to the JavaME CDC specifications. Model includes the binding layer that connects the business logic components with the UI. In addition, the binding layer provides the execution logic to invoke SOAP-based web services. JDBC is an API that enables the model layer to access the data in the encrypted SQLite database through Create, Read, Update and Delete ("CRUD") operations.

The device native container further includes Application Configuration which refers to services that allow application configurations to be downloaded and refreshed, such as URL endpoints for a web service or a remote URL connection. Application configuration services download the configuration information from a WebDav-based server-side service.

The device native container further includes Credential Management, Single Sign-on ("SSO"), and Access Control. MAF handles user authentication and credential management through the "Oracle Access Management Mobile and Social" ("OAMMS") IDM SDKs. MAF applications perform offline authentication, meaning that when users log in to the application while connected, MAF maintains the username and password locally on the device, allowing users to continue access to the application even if the connection to the authentication server becomes unavailable. MAF encrypts the locally stored user information as well as the data stored in the local SQLite database. After authenticating against the login server, a user can access all of the application features secured by that connection. MAF also supports the concept of access control by restricting access to application features (or specific functions of application features) by applying user roles and privileges. For remotely served Web content, MAF uses whitelists to ensure that only the intended URIs can open within the application feature's web view (and access the device features).

The device native container further includes Push Handler that enables MAF applications to receive events from the iOS or Android notification servers. The Java layer handles the notification processing.

In runtime architecture 400, resources that interact with the native container include an encrypted SQLite Database and device services. The embedded SQLite database protects locally stored data and is called by the model layer using JDBC. The MAF application generates this lightweight, cross-platform relational database. Because this database is encrypted, it secures data if the device is lost or stolen. Only users who enter the correct user name and password can access the data in the local database. Device Services are services and features that are native to the device and integrated into application features through the Cordova APIs.

In runtime architecture 400, the device native container enables access to server-side resources such as Configuration Server, Server-Generated HTML, Apple Push Notification Service ("APNs"), Google Cloud Messaging ("GCM"), and SOAP Web services. Configuration Server is a WebDav-based server that hosts configuration files used by the application configuration services. Configuration Server is delivered as a reference implementation. Any common Web-Dav services hosted on a J2EE server can be used for this purpose. Server-Generated HTML includes Web content hosted on remote servers used for browser-based application features. APNs and GCM Push Services are the notification providers that send notification events to MAF applications. SOAP Web Services are remotely hosted SOAP-based web services. These services are accessed through the Java layer. Application features authored in MAF AMX access SOAP-based data services through data controls.

Figure 5:
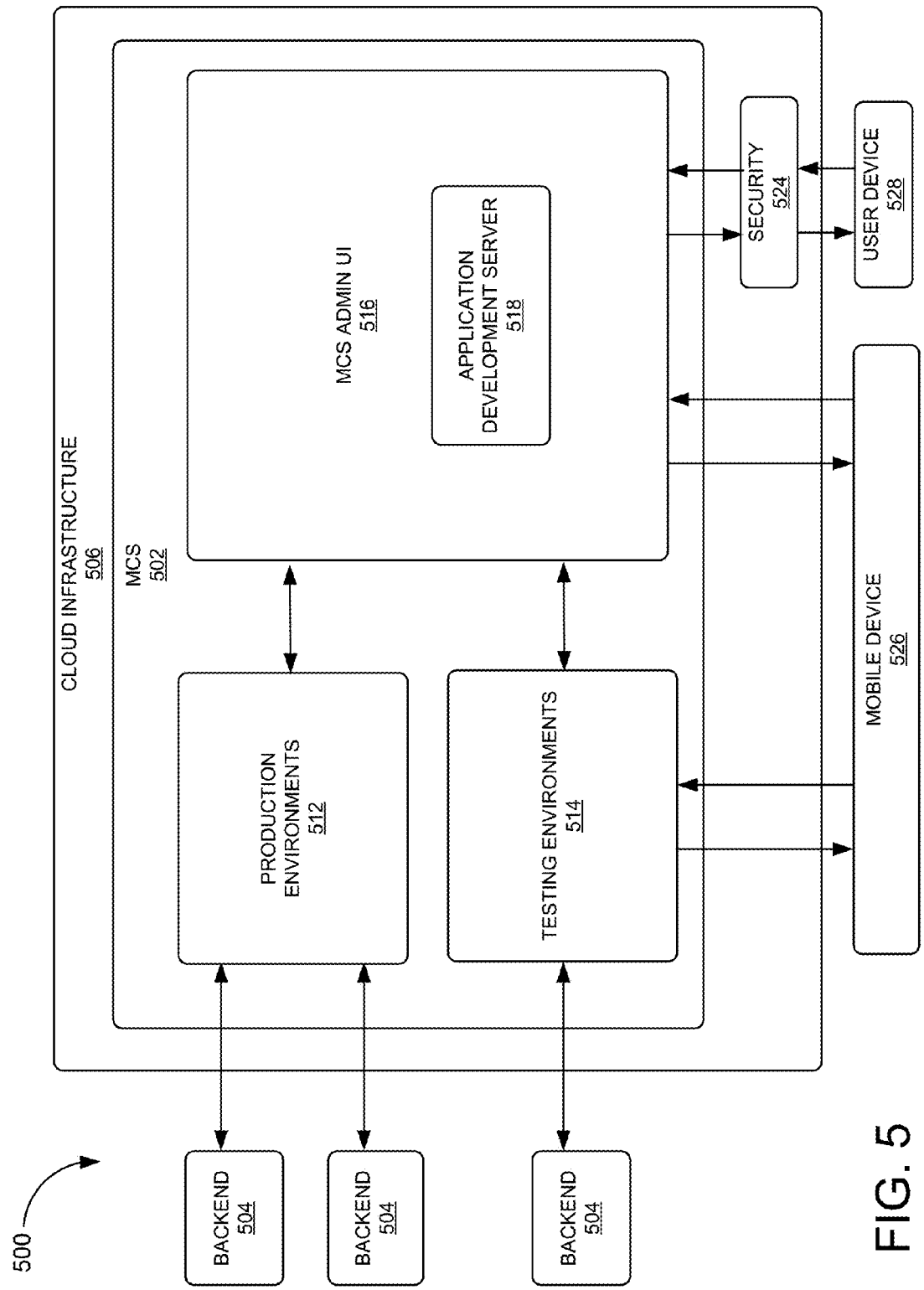
FIG. 5 is a block diagram of a system for developing mobile applications in a mobile cloud infrastructure in accordance with embodiments of the present invention.

FIG. 5 is a block diagram of a system 500 for developing mobile applications in a mobile cloud infrastructure in accordance with embodiments of the present invention. In system 500, a user may use a user device 528 to develop and build applications in a cloud infrastructure 506 via a Web based tool. In one embodiment, the applications may be downloaded on a mobile device 526 over the air, thus obviating the need for an App store. The native applications talk to backends 504 created in MCS 502. In one embodiment, MAF runtime architecture 400 of FIG. 4 may be used to deliver an application to mobile device 526. In one embodiment, a declarative syntax of an application is deployed on mobile device 526 over the air, and the declarative syntax is interpreted on mobile device 526 by MAF runtime architecture 400 of FIG. 4.

Cloud infrastructure 506 includes MCS 502 that provides an admin UI 516 through which application development may be performed. MCS 502 further includes production environments 512 and testing environments 514 in which a mobile application may be developed and tested, respectively. These environments provide production/testing functionality by talking to corresponding backends 504 via connectors. An application is first developed in testing environments 514. Once published, the application moves to production environments 512.

In one embodiment, a mobile application is developed by using user device 528 to communicate with MCS admin UI 516 (also referred to as portal) through a security layer 524. MCS admin UI 516 includes an application development server 518 that can be interfaced via MCS admin UI 516. An application that is developed in MCS admin UI 516 can be run on a browser of user device 528 or on mobile device 526 by communicating with production environments 512 and/or testing environments 514. In one embodiment, when an application is deployed on mobile device 526, mobile device 526 communicates with testing environments 514. However, if the application is updated on mobile device 526, such updates are performed through MCS admin UI 516.

An application that is developed in system 500 may be built as a light application or a heavy application. A heavy application is a full application such as apps that are downloaded from an App store. A light application is an application that is deployed as an added feature to an already deployed full application (i.e., a hosting application) such as an Oracle app. The hosting application acts as a container that holds the light applications. Both heavy and light applications can be further containerized by a security container, as described herein with reference to FIG. 7.

Figure 6:
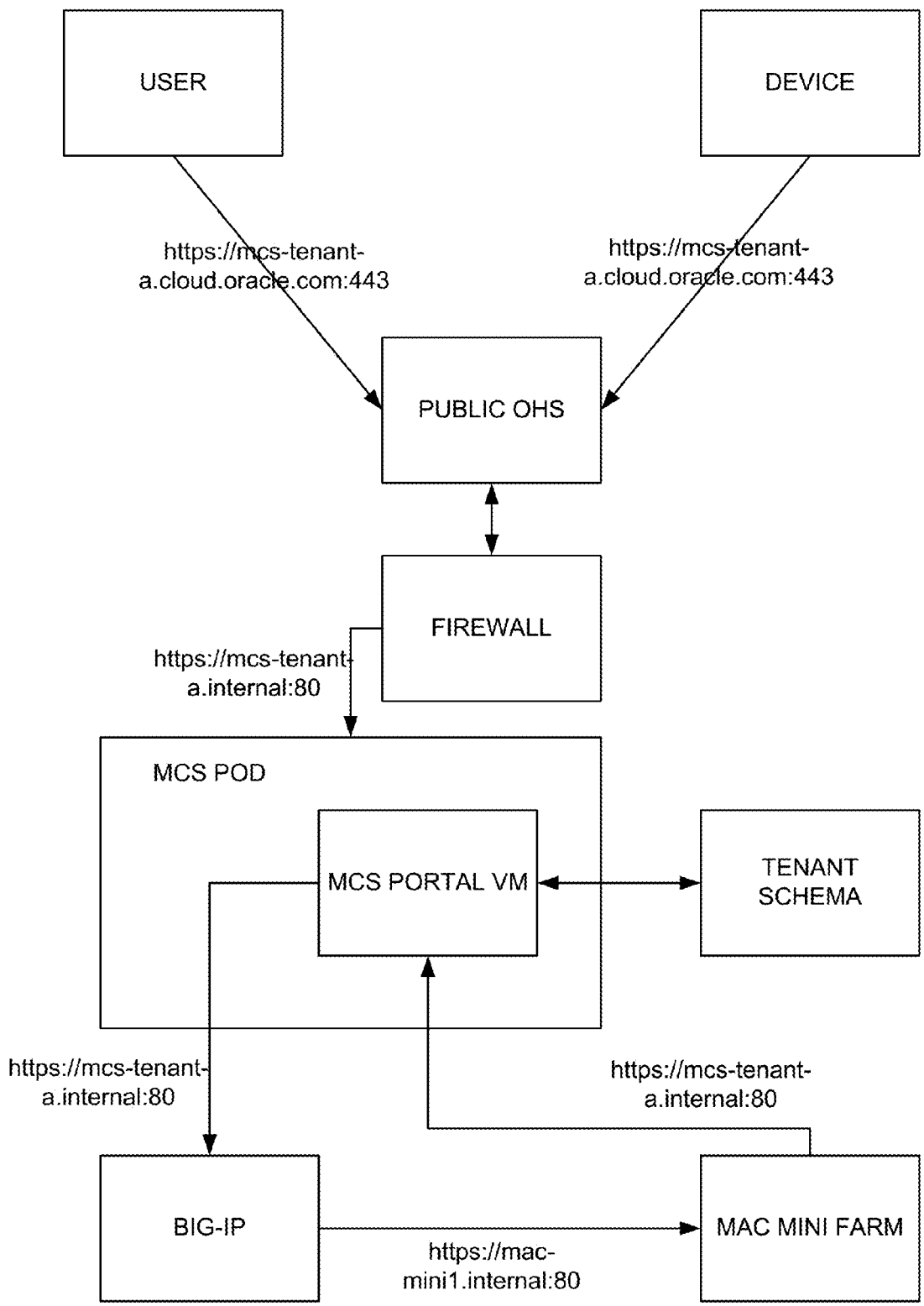
FIG. 6 is a block diagram of network components in a system for building mobile applications in accordance with embodiments of the present invention.

FIG. 6 is a block diagram of network components in a system 600 for building mobile applications in accordance with embodiments of the present invention. In system 600, the user interacts with an MCS website to initiates build requests. The mobile device communicates with the MCS Portal VM to perform an over the air install of native applications. This is in general a two part process including downloading a plist file that describes the application as well as the location to download the .ipa file, and downloading the .ipa file.

The Public OHS/Webgate is a public facing Oracle HTTP Server ("OHS") that directs traffic to the MCS Portal VM behind the firewall. It is also responsible for authenticating the user and passing along the user credentials to MCS Portal VM. Public OHS terminates the SSL connection, and port 443 is used for https.

MCS Portal VM is a standard WebLogic Server ("WLS") application whose data is backed by Schema as a Service, and its corresponding application development client is written on top of the Jet framework. This is a single tenant and security is provided via OWSM. MCS Portal VM runs WLS in the trusted zone. It handles requests by the user and has a connection to the schema service and the build server farm via BIG-IP appliance. It uses open port 80 (or equivalent) for http communication to/from Public OHS and to the BIG-IP appliance, and from the individual servers in the server farm.

Schema Service stores application data, enterprise signing certificate, and provisioning profiles for tenant. It only interacts with the MCS Portal VM.

A load balancer such as BIG-IP Routes farm tasks to servers in a server farm (initially in a round-robin fashion). It uses open port 80 (or equivalent) and provides redundancy. It is connected to/from the MCS Portal VM and forwards requests to servers in the server farm.

The server farm includes a number (e.g., 20) of servers that handle build jobs. It is connected to a filer for storing application binaries (e.g., 5 TB). Connections are handled via a local Tomcat instance running locally on server. Build tools and processes handle by native OSX calls.

Building an Application

In one embodiment, once a user has created an application and wishes to produce a native binary, the user initiates build POST request on UI. Payload includes the application id for the application. Public OHS/Webgate receives the request and terminates the SSL, authenticates and authorizes the user against OAM (assuming user is logged in), places user identity into http headers, and forwards this past the firewall to the MCS Portal VM's WLS.

MCS Portal VM receives the request and authorizes user for privileges against requested application and queries out to Tenant Schema as a Service for application data, tenant enterprise certificate, encrypted cert password, and tenant provisioning profile. Once Schema Service returns the requested items, MCS Portal VM creates a new entry in the BuildJobs table (via Schema Service) to record the attempt, and captures the primary key of this new record. MCS Portal VM also creates a new POST request against the build farm's BIG-IP appliance, passing in the three parameters into the body, as well as a callback URL (which encodes the BuildJob record's primary key) for job completion. An example payload is:
applicationData: (app data)
signingCertificate: (cert) *
signingPassword: (password) *
provisioningProfile: (profile)
callbackUrl: http://mcs-tenant-a.internal:3000/maxbuild/complete?jobId=(BuildJobId)**

Certificate and password are created by user for this embodiment exclusively (i.e., are not shared with other services). Port 3000 is not accessible publicly.

BIG-IP maintains a list of healthy servers in the server farm. This is done via a health check that performs sanity checks every few minutes. It selects a server (e.g., via round robin when jobs are of equal complexity) from the healthy pool, and routes the job request to that server.

In one embodiment, a server in the server farm includes a Tomcat running on the server. It receives request and starts an external process. This runs on an async servlet to prevent I/O blocking request thread pool.

When the process completes, Tomcat creates a POST request to the callback URL in the request payload. The payload for this new request includes:

result: (success if successful, etc)
binaryKey: (jobId)

MCS Portal VM recieves the request and updates the given BuildJobs record's row with the binaryKey from the payload if the event was successful. It also informs the client the job was completed (e.g., via polling on 11g, push or async servlet with 12c planned), and produces a QR code with an encoded link.

Installing an Application

In one embodiment, once the user scans the QR code on a mobile device, an over the air install is initiated. Scanning the QR code opens the URL encoded. Public OHS/Webgate receives the request and terminates the SSL. It authenticates and authorizes the user against OAM (assuming the user is logged in), places user identity into http headers, and forwards this past the firewall to the MCS Portal VM's WLS server.

MCS Portal VM receives the request and authorizes user for privileges against requested application. It determines user-agent of requesting device, identifies the platform (e.g., iOS) and forwards to a corresponding URL. It also directs to Public OHS, which will in turn forward to MCS Portal VM to reauthorize (as performed during the build request described herein). MCS Portal VM receives the request and generates a plist file (e.g., an iOS plist file) that includes application information for a corresponding platform (e.g., iPhone) as well as a link to the binary.

The device then prompts the user if they want to install the application. Assuming yes, the device follows the binary link. It also directs to Public OHS, which will in turn forward to MCS Portal VM to reauthorize (as performed during the build request described herein). MCS Portal VM receives the request and generates a new request to the build server farm (e.g., via: http://max-mini-farm.internal/download/ios/(binaryKey)). BIG-IP selects a server in the server farm (e.g., via round robin) from the healthy pool and routes the job request to that server (e.g., http://mac-mini1.internal/download/ios/(binaryKey)). An application server (e.g., a Tomcat) on that server receives the request, checks if content exists, and streams the binary from the network. BIG-IP returns the streamed response back to MCS Portal VM which receives the response and copies into its request's output stream to the device. Finally, the device receives the binaries and performs the install.

Figure 7:
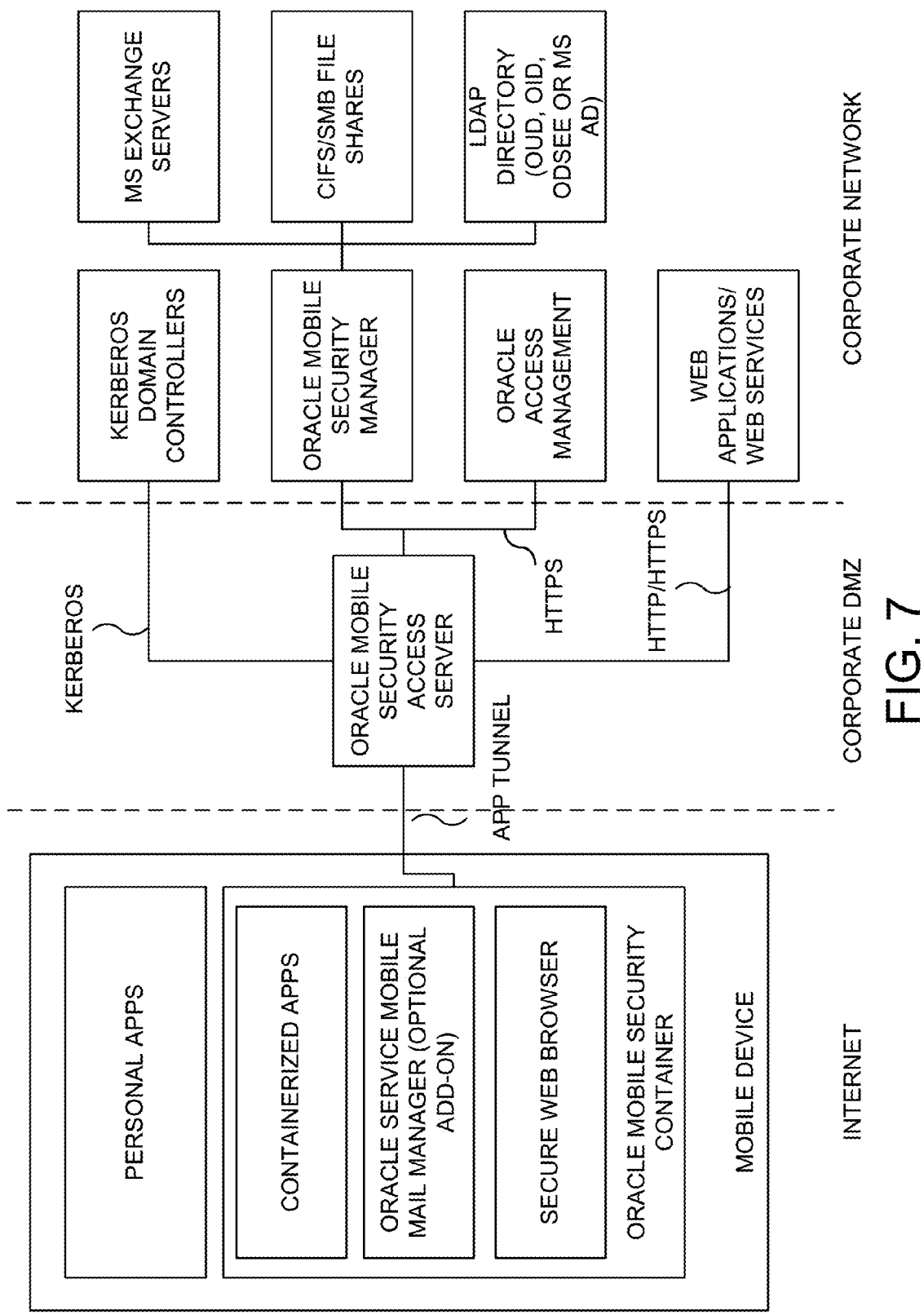
FIG. 7 is a block diagram of mobile security suite components in accordance with embodiments of the present invention.

FIG. 7 is a block diagram of mobile security suite components in an embodiment that uses security services provided by a mobile security suite 700 such as OMSS. OMSS components are distributed across the corporate DMZ and the enterprise intranet (or corporate network), and a security container such as "Oracle Mobile Security Container" from Oracle Corp. is installed on the mobile device. The security container is configured to hold "containerized" applications, e.g., applications that have been securely linked to their specific container. The security container includes a secure browser, file manager, document editor, and an optional secure mobile mail manager. The secure mobile mail manager includes personal information management ("PIM") applications such as a mail client, calendar, contacts, tasks, and notes synchronizing with corporate mail servers via the "Microsoft Exchange ActiveSync" ("EAS") protocol. Many applications such as "Oracle Business Intelligence" ("BI"), "Oracle Fusion Tap," "Oracle Social Network," "Oracle Enterprise Manager Cloud Control," "Oracle WebCenter Spaces," etc., and a broad range of third-party enterprise applications can be containerized with the security container. All data at rest inside containerized applications on a mobile device is encrypted. Encrypted data storage includes database, file store, cache, and user preferences. In one embodiment, data in transit through the AppTunnel is encrypted using TLS/SSL with Federal Information Processing Standard ("FIPS") approved algorithms.

When a Web browser or other client program makes an unauthenticated request to a security access server such as "Oracle Mobile Security Access Server" ("MSAS") from Oracle Corp., the security access server responds with a redirect to the appropriate security container. Security containers use a key hierarchy to protect data. All keys are derived from user credentials that are never stored. The key hierarchy involves multiple keys to support different sensitivity of data. For example, a unique key is used for the user's authentication certificate, which is allowed to be open for a very short period of time. A different key is used for the browser cache, which must remain decrypted for an entire session. The main security container distributes and manages keys for the complete set of apps in the user's secure enterprise workspace.

The secure container has three distinctive benefits over current mobile virtual private network ("VPN") solutions: device trust vs. gateway, secure container password vs. device password, and secure container AppTunnel vs. device-level VPN. OMSS extends a network's Kerberos authentication trust directly to the user's device instead of stopping at a gateway server sitting in the DMZ. OMSS is significantly more efficient and secure than implementing "constrained delegation" offered by VPN providers. A constrained delegation solution is not only less secure but also more cumbersome to set up and maintain.

Further, the tradeoff between usability and security is magnified when dealing with consumer devices and BYOD programs. Corporate IT requires strong passwords to protect corporate data on BYOD devices. Conversely, users want simple passwords—or preferably no device password at all—so they can easily access social networks and other consumer applications. Requiring a device password is frustrating for users, as they are constantly using the device for non-enterprise purposes that do not require enterprise authentication. Embodiments provide the necessary balance between security and usability when dealing with BYOD programs by requiring a password only to access corporate applications.

Yet further, device-level VPNs provide a trusted, secure tunnel between a user's device and the enterprise's network. However, device-level VPN solutions are more appropriate for corporate-owned and secured endpoint devices such as laptops than for consumer mobile devices. Once a mobile-device VPN tunnel is open to the network, any application on a device has access to this secure tunnel. This is a huge security hole and a pathway to danger. With embodiments, however, the connection from the mobile device to the enterprise intranet exists only between the secure container and enterprise servers.

MSAS is typically deployed in the corporate DMZ and multiple server instances can be deployed behind a load balancer for high availability and scalability. MSAS provides tunneled connections between the server and containerized apps. MSAS brokers authentication (strong authentication leverages HTTPS connections to "Oracle Access Manager" ("OAM") or Kerberos connections to Kerberos Domain Controllers), authorizes, audits, and enables SSO for, and proxies requests to, their destination (resources in the corporate intranet). MSAS acts as the terminating endpoint of the tunneled connections initiated by the security container and containerized applications.

"Oracle API Gateway" ("OAG") from Oracle Corp. and "Oracle Web Services Manager" ("OWSM") from Oracle Corp. add security, threat protection, and throttling policies to an organization's REST API infrastructure. SSO is supported through OAuth, OAM tokens, Kerberos, and NT LAN Manager ("NTLM"). SAML is supported through OAM or Kerberos integration with SAML identity providers such as Oracle, CA, or Ping Identity. MSAS is integrated with the OAM platform and supports the retrieval of OAM and OAuth tokens for SSO to backend resources protected by OAM, OAG, and OWSM. MSAS also supports "virtual smart card" authentication by performing PKI authentication to Microsoft Active Directory protected by a PIN. Digital certificates are provisioned inside the security container app and only accessed after successful PIN validation. MSAS integration with OAM allows for context aware, risk based, step-up authentication.

OWSM is a component of SOA Suite and addresses web-services-based SOA security and management. The purpose of a SOA infrastructure is to allow consumers to invoke services exposed by providers. OWSM offers a solution for policy management and security of such service infrastructure. It provides visibility and control of the policies through a centralized administration interface offered by "Oracle Enterprise Manager" from Oracle Corp. OWSM allows companies to (1) centrally define and store declarative policies applied to the multiple web services making up a SOA infrastructure, (2) locally enforce security and management policies through configurable agents, and (3) monitor runtime security events such as failed authentication or authorization. It also provides business agility to respond to security threats and security breaches by allowing policy changes to be enforced in real time without the need to interrupt the running business processes.

"Oracle Mobile Security Manager" ("MSM") is a "WebLogic" managed server running on either Oracle Linux or Red Hat Enterprise Linux. MSM integrates with LDAP servers to provision users, assign and manage policies for Mobile Device Management and for accessing the security container, manage the app catalog, control the remote lock or wipe of the device and secure workspace apps (wiping the container removes all data and configuration for workspace apps), and set access control policies for the security container. Polices are assigned to users by associating policy templates with users and user groups. Available policy controls include Device Restrictions, Authentication (authentication frequency, failed attempt threshold, PIN strength for PKI); Catalog (apps, URLs, file shares); Container/Apps (compromised platform, location services, offline status, inactivity duration, data leak prevention ("DLP")); Time Access (lock if outside time window); Geo Access (lock if outside geo-fence (e.g., city, state, country)); Devices (whitelist specific device models, specify minimum OS level); Browser (disable address bar, disable download); File Browser (allow/disallow, disable download, specify file server URL); PIM (mail server URL); Provisioning (invite template, PKI details). If a user is in multiple groups and has multiple policies, policy combinations are resolved following specific rules.

MSM maintains the EMM policies, which are then associated to one or more user groups in the directory. MSM does not perform any user or group management but leverages these identities and groups directly (no synchronization) from the directory store. MSM uses APNS and CGN over HTTPS to send notifications to devices. MSM also exposes a WebDAV front-end to internal CIFS/SMB-enabled File Systems or "Microsoft SharePoint servers," and enables browsing intranet file shares from the client.

With more and more organizations establishing a presence on social networks, IT departments need support for social identities, which rely on more lightweight security standards than enterprise identities but are better adapted to the requirements of social networks. For example, some websites may require users to provide access tokens obtained from Facebook or Google in order to be authenticated to their services. OAMMS includes a server that interfaces with existing backend identity management infrastructures. The server acts as an intermediary between supported mobile client apps and backend identity services. This decouples the client apps from the backend infrastructure so that backend infrastructure can be modified without having to update mobile client programs. OAMMS includes the following functionality:

Delegated authorization leveraging the OAuth standard

Mobile Services connecting browser-based (HTML5) and native mobile apps to the enterprise identity management infrastructure, typically the "Oracle Access Management platform."

Internet Identity Services providing functionality that lets OAMMS be used as the relying party when interacting with popular, cloud-based identity authentication and authorization services, such as Google, Yahoo, Facebook, Twitter, or LinkedIn. By deploying OAMMS, the user is provided with multiple login options without the need to implement access functionality for each identity provider individually. User Profile Services providing a REST interface for LDAP CRUD operations (customers use the same REST interface to build graphical UIs for apps), user self service functions such as self registration, profile maintenance, password management, and account deletion. User Profile Services are also available as an OAuth resource.

Access Management Integration Services for leveraging Oracle Access Management through a runtime REST interface provided by an agent SDK.

Mobile Composer

Figure 8:
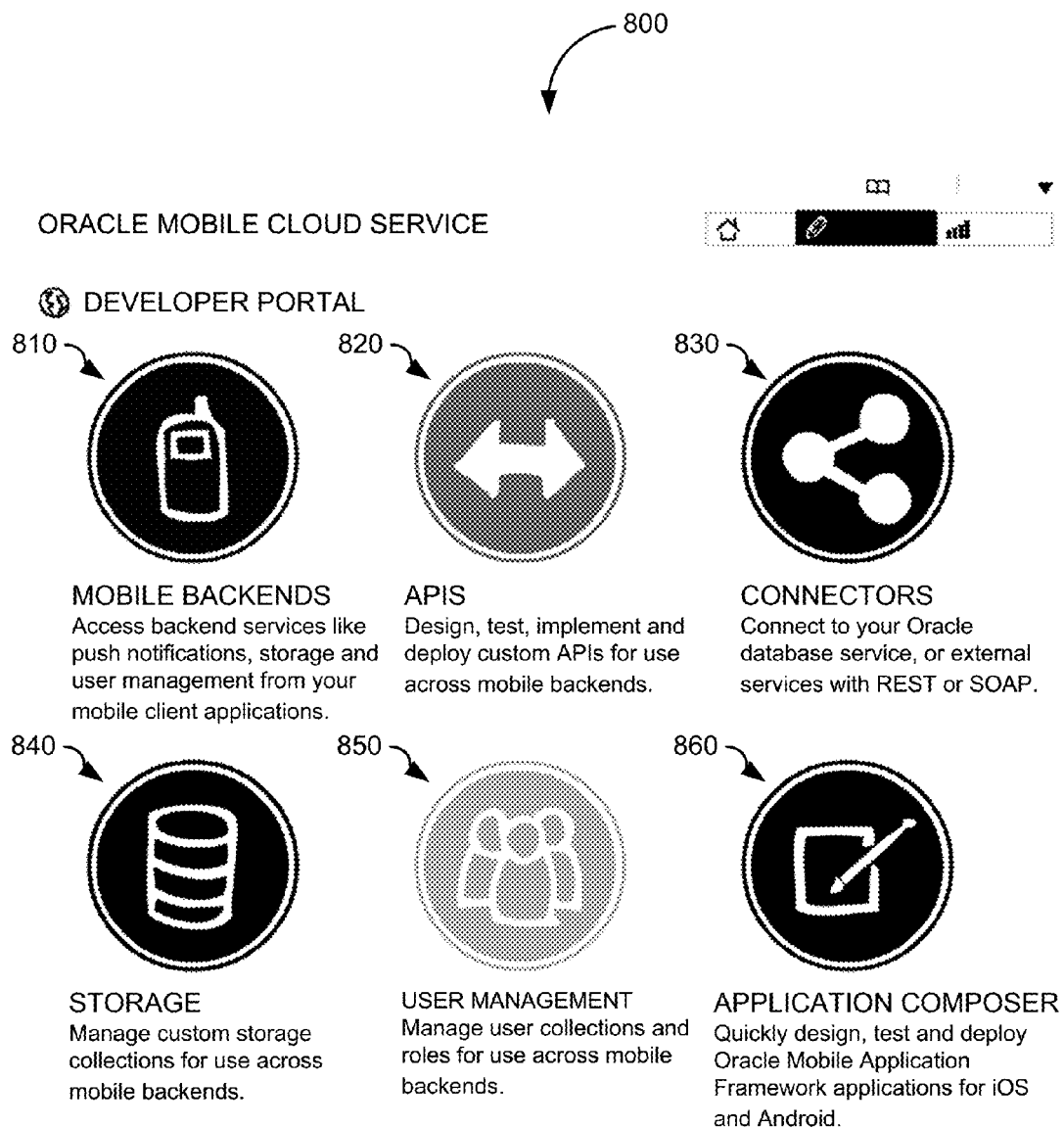
FIG. 8 is an illustration of a mobile application development portal that may be included in an application development framework for creating applications that use mobile cloud services of a cloud infrastructure system of the system environment of FIG. 1 in one embodiment.

FIG. 8 is an illustration of mobile application development portal 800 that may be included in application development framework 124 for creating applications that use mobile cloud services 122 of cloud infrastructure system 102 of system environment 100 of FIG. 1 in one embodiment. FIG. 8 is merely illustrative of an embodiment or implementation of mobile application development portal 800 and should not limit the scope of any invention as recited in the claims. One of ordinary skill in the art may recognize through this disclosure and the teachings presented herein other variations, modifications, and/or alternatives to those embodiments or implementations illustrated in the figures.

In this example, mobile application development portal 800 includes hardware and/or software elements that allow developers to create mobile applications through application development framework 124 with access to underlying components of mobile cloud services 122. Mobile backend services module 810 provides developers with one or more tools, user interfaces, wizards, etc. to design, test, implement, deploy, and manage any number or type of backend services. Some examples of backend services include push notification services, storage services, user management services, or the like. A developer can specify how mobile applications access or utilize these backend services. Once backend services are created, the backend services can be automatically presented to a developer during application creation allowing the developer to select from a set of predetermined backend services for inclusion or use in a mobile application.

Application program interface module 820 provides developers with one or more tools, user interfaces, wizards, etc. to design, test, implement, deploy, and manage application program interfaces (APIs) for use across mobile backend services. A developer can create one or more software intermediaries that make it possible for mobile applications to interact with backend services deployed using mobile backend services module 810. In one example, a developer can create an implementation of representational state transfer (REST) that exposes specific functionality while protecting the rest of a backend service. In another example, a developer can create API that exposes functionality of a backend service according to predetermined criteria, such as user identity, mobile device type, data type, etc. Once APIs are created, the APIs can be automatically presented to a developer during application creation allowing the developer to select from a set of predetermined APIs for inclusion or use in a mobile application.

Connectors module 830 provides developers with one or more tools, user interfaces, wizards, etc. to design, test, implement, deploy, and manage connections with other databases, applications, cloud-based applications and services, or external APIs. A developer can create one or more connections that make it possible for mobile applications to interact with other types of services, external applications or database, third-party APIs, or the like. A developer can specify that connectors access these services using a variety of techniques, such as REST or simply object access protocol (SOAP). Once connectors are created, the connectors can be automatically presented to a developer during application creation allowing the developer to select from a set of predetermined connectors for inclusion or use in a mobile application.

Storage module 840 provides developers with one or more tools, user interfaces, wizards, etc. to design, test, implement, deploy, and manage storage used across mobile backend services. A developer can create one or more storage collections that make it possible for mobile applications to retrieve and store data with mobile backend services. User management module 850 provides developers with one or more tools, user interfaces, wizards, etc. to manage user access to mobile backend services. A developer can create one or more user collections, user roles, user groups, or the like that make it possible for mobile applications to comply with user access restrictions for mobile backend services.

Application composer module 860 provides developers with one or more tools, user interfaces, wizards, etc. to design, test, implement, deploy, and manage mobile applications. Mobile applications can be created for a variety of target platforms and devices, such as IOS, Android, Blackberry, or the like. In various embodiments, application composer module 860 provides a cloud-based rapid application development environment for building enterprise mobile applications. Application composer module 860 can package and deploy mobile applications as native apps. Application composer module 860 may be embodied as a multi-tenant application development environment hosted on Oracle Public Cloud, provided by Oracle of Redwood Shores, Calif. Application composer module 860 therefore can provide complete application lifecycle management in a cloud-based service.

In certain embodiments, application composer module 860 provides features applicable to a variety of user personas. For example, a business analyst may be a user who has good functional knowledge of a target back-end system like customer relationship management (CRM), human capital management (HCM), or the like. The business analyst can rapidly develop mobile applications using application composer module 860 through their understanding of business object relationships and their familiarity with general programming concepts. This type of user is typically comfortable using tools like CRM Application Composer, WebCenter Layout Composer, SOA Business Process Composer, SFDC Application Configuration tool etc. enabling developers to efficiently create new mobile applications using application composer module 860.

In another example, an application developer can be a user that is comfortable with writing code using IDEs like JDeveloper and uses application development frameworks like ADF, OAFwk, Spring, J2EE etc. to extend and customize enterprise applications. This type of user can apply these principles to efficiently create new mobile applications using application composer module 860. In yet another example, an application administrator can be a user responsible for configuration, deployment, provisioning, patching and general maintenance of applications and application development environment. This type of user can again apply these principles to efficiently create new mobile applications using application composer module 860.

In certain embodiments, a customer of cloud infrastructure service 102 of FIG. 1 utilizes application composer module 860 to build a custom mobile application with on-premise eBusiness Suite (EBS) services as a back-end. A business analyst can expose mobile friendly REST APIs on the EBS backend using MCS 122. The business analyst can then build the mobile application using components of mobile application development portal 800.

In some embodiments, a partner may build extensions to a CRM product and seek to create a custom mobile application with the extensions and CRM services as backend. An application developer can extend the CRM with custom objects in JCS and uses MCS 122 to expose mobile friendly API mash-up for CRM and Custom objects. A business analyst can then build a mobile application using components of mobile application development portal 800 to incorporate the mash-up MCS API.

In further embodiments, a SIEBEL customer may build a custom mobile application using MCS API wrappers for SIEBEL backend and integration with LinkedIn. An application developer can build ADF Mobile LinkedIn features in JDev and deploy the features using components of mobile application development portal 800. A business analyst can then build a mobile application using components of mobile application development portal 800 with the MCS API for SIEBEL and the Linked feature.

In certain embodiments, systems and methods are provided for building mobile application using pre-defined templates. The pre-defined templates allow use of MCS 122 as backend services. A service definition can be presented to a developer during application development allowing rapid connection between UI design and backend services.

Figure 9:
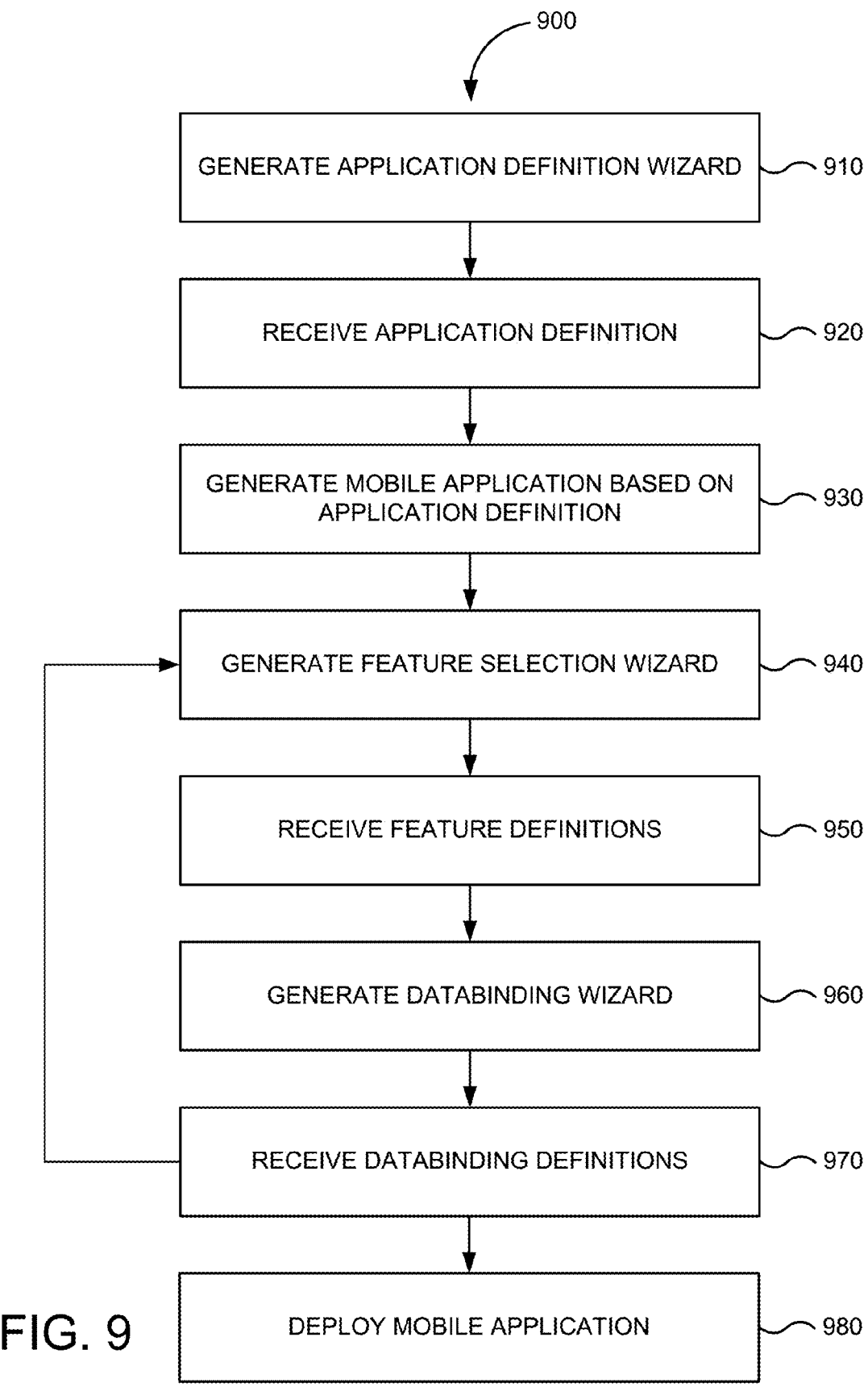
FIG. 9 is a flow diagram of a method for mobile application development in accordance with embodiments of the present invention.

FIG. 9 is a flow diagram of a method for mobile application development in accordance with embodiments of the present invention. In one embodiment, the functionality of the flow diagram of FIG. 9 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 910 an application definition wizard is generated. An application definition wizard as used herein represents a set of one or more UIs that guide a user during the definition process of a mobile application that utilizes one or more pre-defined cloud-accessible services. The application definition wizard can implement one or more workflows each associated with a part of the application definition process. In one embodiment, the application definition wizard can prompt or otherwise guide a user to specify application defaults, such as application identifier prefixes, default icons, splash screens, default application/feature templates, setup enterprise provisioning profile/keystore, or the like.

In certain embodiments, the application definition wizard can prompt or otherwise guide a user to specify an application name, a form factor (such as a phone or tablet device), a navigation type (e.g., none meaning a single feature or UI, as springboard, a navigation bar ("NavBar"), a Spring/Nav combo, or the like), and any application preferences.

At 920 an application definition is received. As discussed herein, the application definition can include any information needed in order to create at least a minimally functional mobile application. At 930 a mobile application is generated based on the application definition. In one embodiment, the mobile application is represented in a simulator of the target device and can include a set of definitions that when interpreted, function as a compiled mobile application.

At 940 a feature selection wizard is generated. A feature selection wizard as used herein represents a set of one or more UIs that guide a user during the development process of a mobile application that utilizes one or more pre-defined cloud-accessible services. The feature selection wizard can implement one or more workflows each associated with a part of the application development process. In one embodiment, the feature selection wizard can prompt or otherwise guide a user to specify features, UI modules, Business Object, or the like that can be used with the mobile application.

In certain embodiments, the feature selection wizard can prompt or otherwise guide a user to specify components of the first screen of the mobile application. A component can be selected from a catalog of components.

In certain embodiments, the feature selection wizard can prompt or otherwise guide a user to specify components of other screens of the mobile application. These other screens can form part of one or more UI modules. In certain embodiments, the feature selection wizard can prompt or otherwise guide a user to specify one or more UI modules of the mobile application. A UI module represents a processor, task, or flow that can be performed with respect to the mobile application. A UI module can be selected from a catalog of UI modules or a set of templates that provide cohesive collections of UI elements and page flows. Some examples of UI modules are approval workflows, worker tasks, data entry tasks, reports builders, or the like. A template provides a pre-set arrangement/biding of a set of UI elements so that a user only needs to configure those UI elements and bind the template instead of having to arrange and bind individual UI elements. In one embodiment, a user may contribute their own templates to the set of templates available to another user. The user can configure or otherwise specify a series of pages that represent the UI Module. For each page, the user can be presented with a set of layout templates much like before. Each layout template might have several facets such as choosing a secondary template.

In some embodiments, the feature selection wizard can prompt or otherwise guide a user to specify additional features of the mobile application, such as business objects previously defined. The user can specify what resource of the backend service, API, or connector is to be used or otherwise associated with UI elements of each component, screen, UI module, or the like.

At 950 feature definitions are received, and at 960 a data binding wizard is generated. A data binding wizard as used herein represents a set of one or more UIs or UI elements of an existing UI that guide a user during the data binding process of a mobile application that utilizes one or more pre-defined cloud-accessible services. The data binding wizard can implement one or more workflows each associated with a part of the application development process. In one embodiment, the data binding wizard can prompt or otherwise guide a user to specify how features, screens, UI modules, etc., are bound to business objects, services, APIs, or the like that can be used with the mobile application. In certain embodiments, the data binding wizard can prompt or otherwise guide a user to specify a business object of the mobile application. A business object can be selected from a catalog or set of services, APIs, etc. that are available to the mobile application.

At 970 data binding definitions are received. In various embodiments, steps 940-870 can be performed in series or in parallel. Individual steps in 940-870 can be performed on individual element of a mobile application or to a group of elements. As illustrated, a user can repeat the process of feature definition and data binding to create a mobile application. In various embodiments, a set of templates can be presented to the developer. A template includes a set of cohesive user interface components. Rather than requiring the developer to bind data to each individual user interface elements, the developer can bind data to the template and then map how the data is presented using the template.

At 980 the mobile application is deployed. The user can test the application using a testing application deployed on a target device, or as a native application deployed on a target device.

Figure 10:
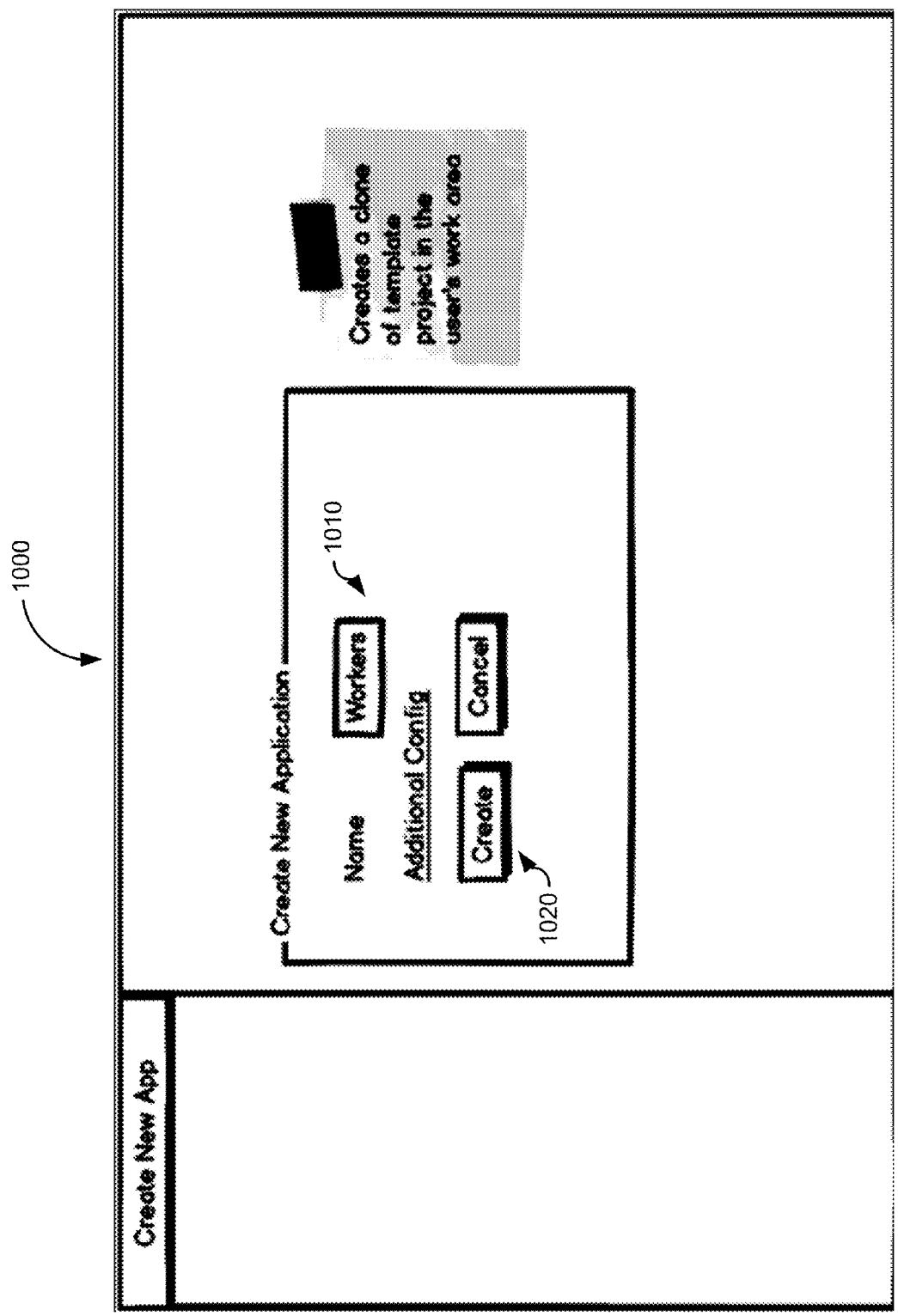
FIGS. 10, 11, 12, 13, 14A, and 14B are illustrations of one or more user interfaces that may be presented by an application definition wizard of the mobile application development portal in one embodiment.
Figure 11:
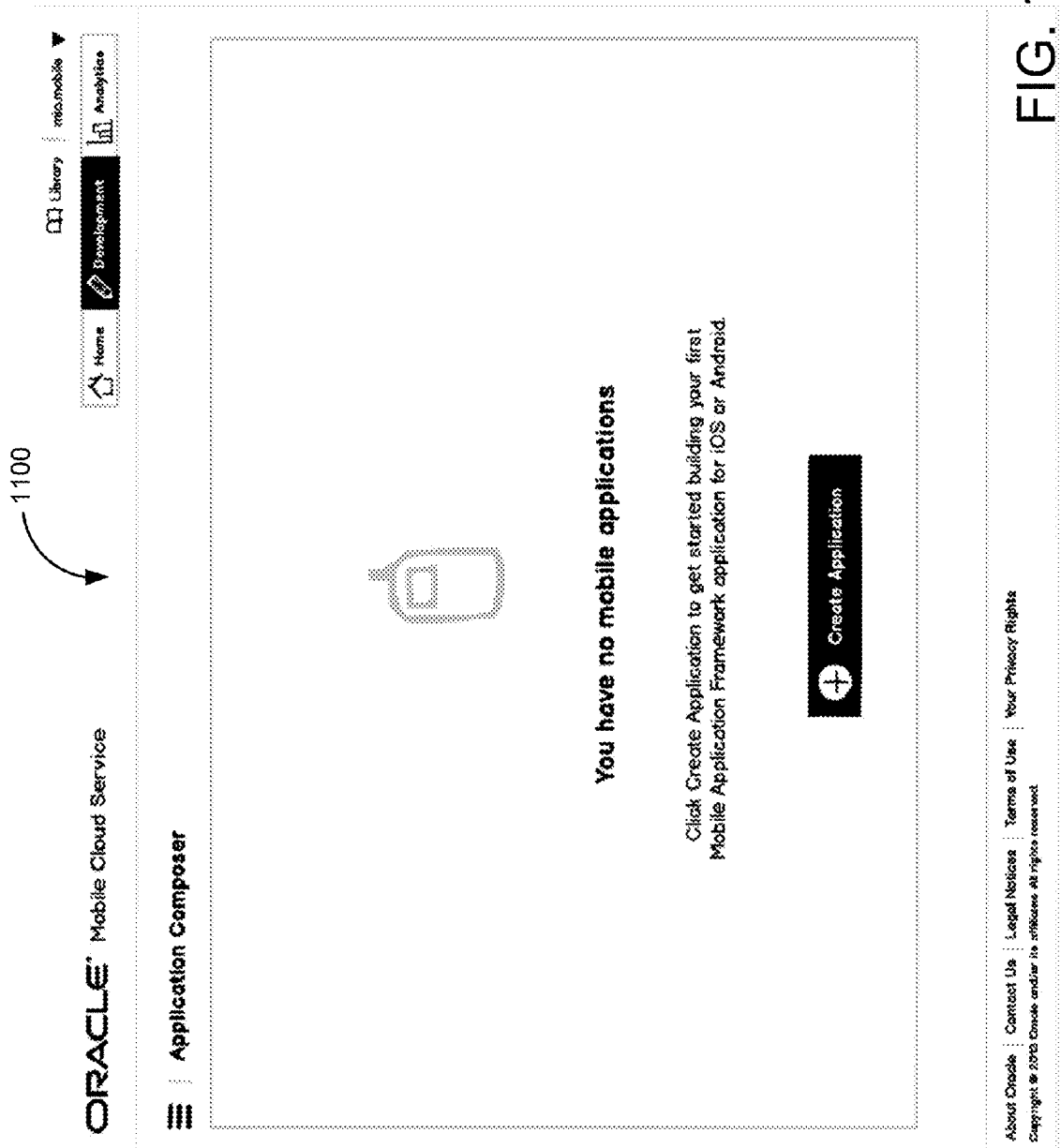
Figure 12:
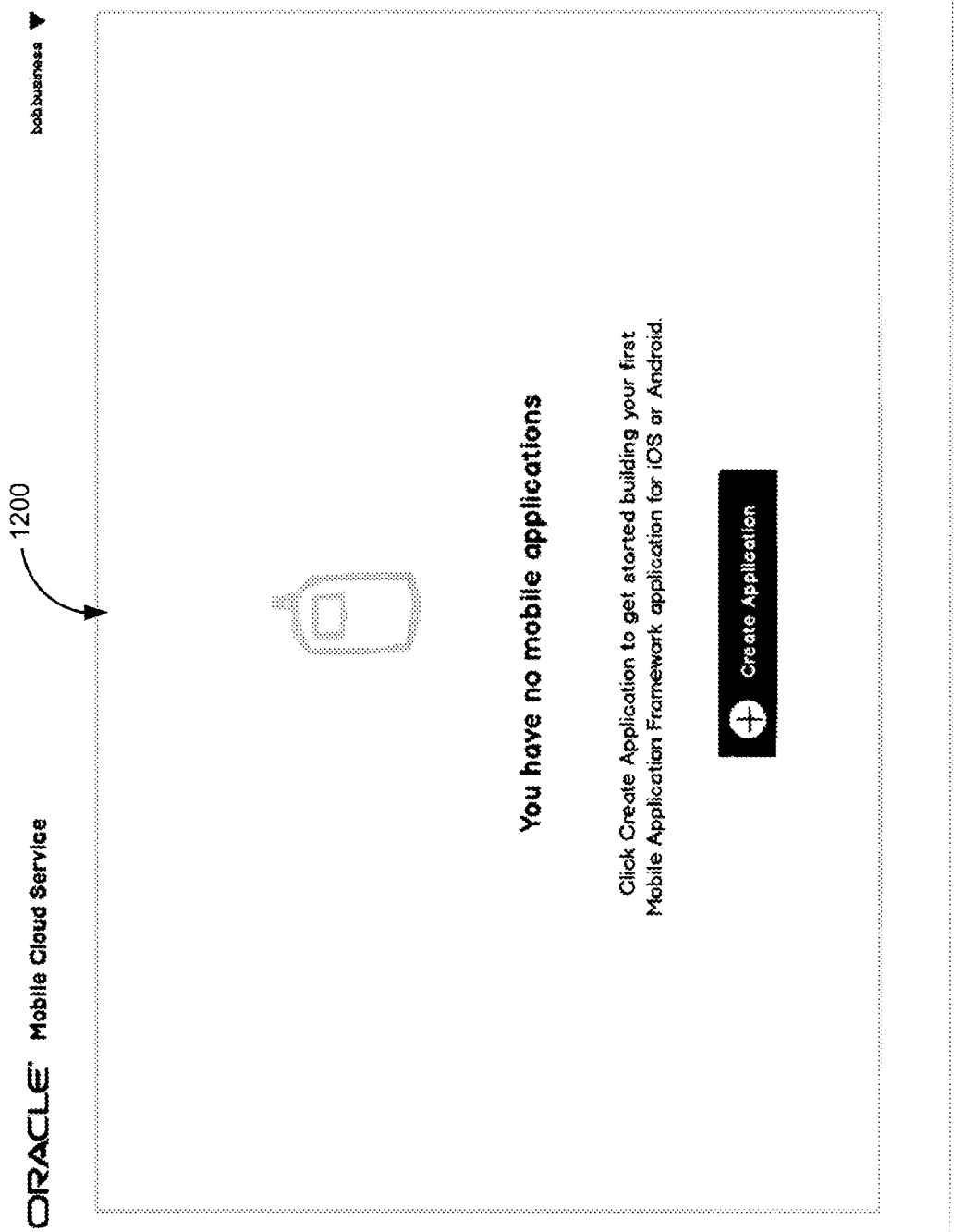
Figure 13:
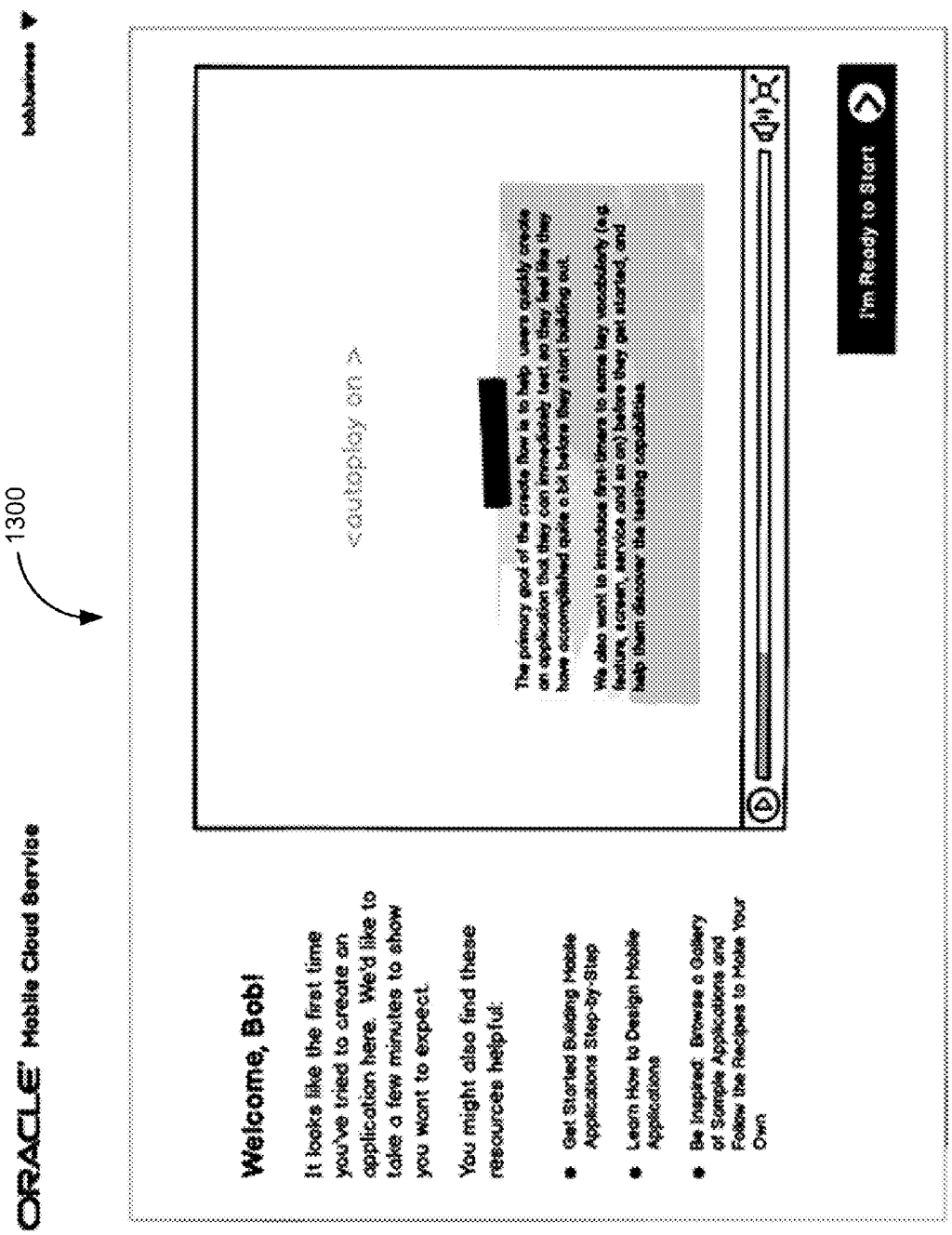

FIGS. 10-13 are illustrations of one or more user interfaces that may be presented by the application definition wizard. In FIG. 10, user interface 1000 includes user interface element 1010 where a developer specifies a name for a new mobile application. User interface element 1020 is associated with functionality that initiates the creation of the new mobile application. FIGS. 11 and 12 illustrate user interfaces 1100 and 1200 that provide a developer with a workspace that may include links to applications previously created by the developer as well as one or more options or user interface elements to create a new application. FIG. 13 illustrates user interface 1300 that can provide a developer with a video tutorial or other help information to get the developer started with creating the new application.

Figure 14A:
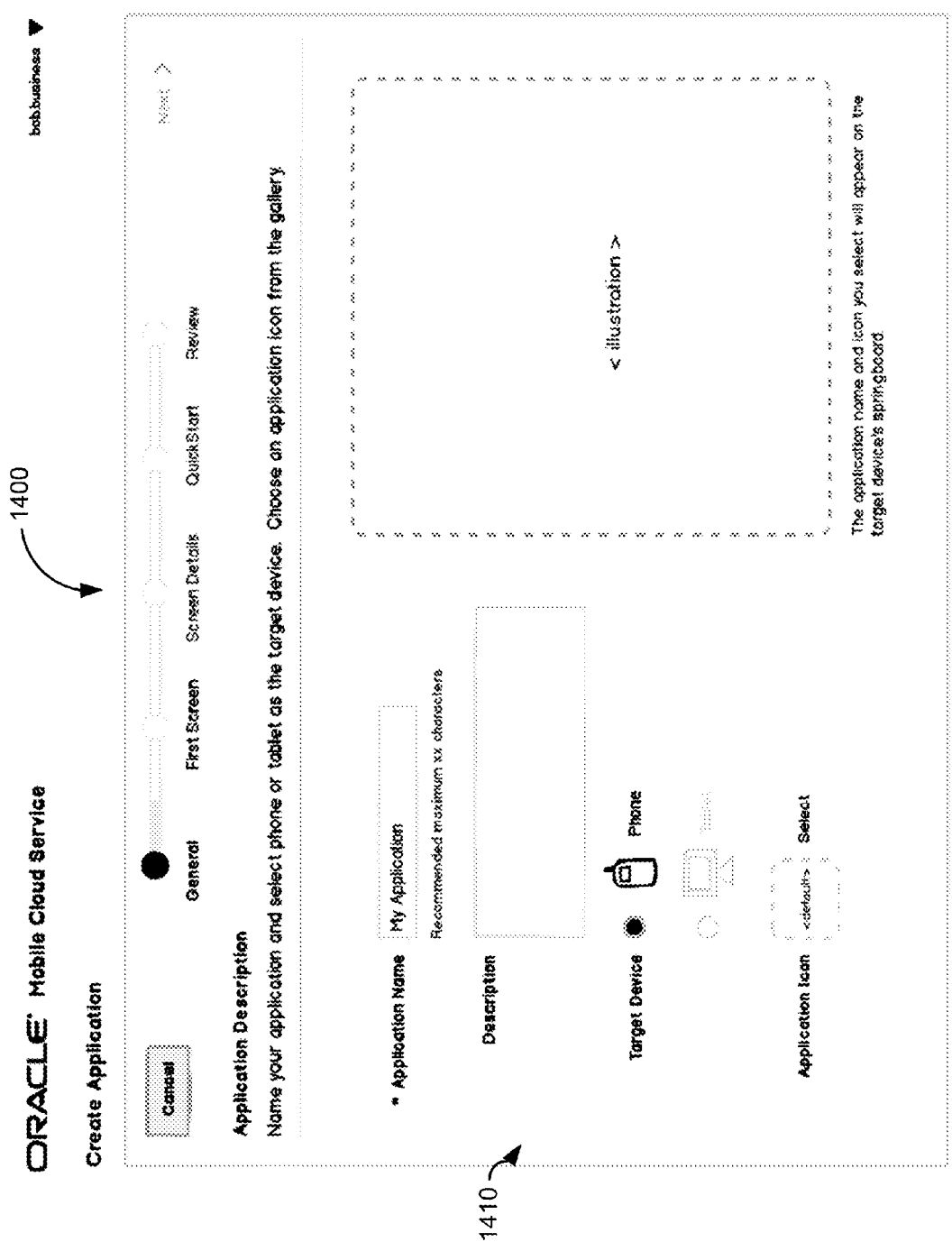
Figure 14B:
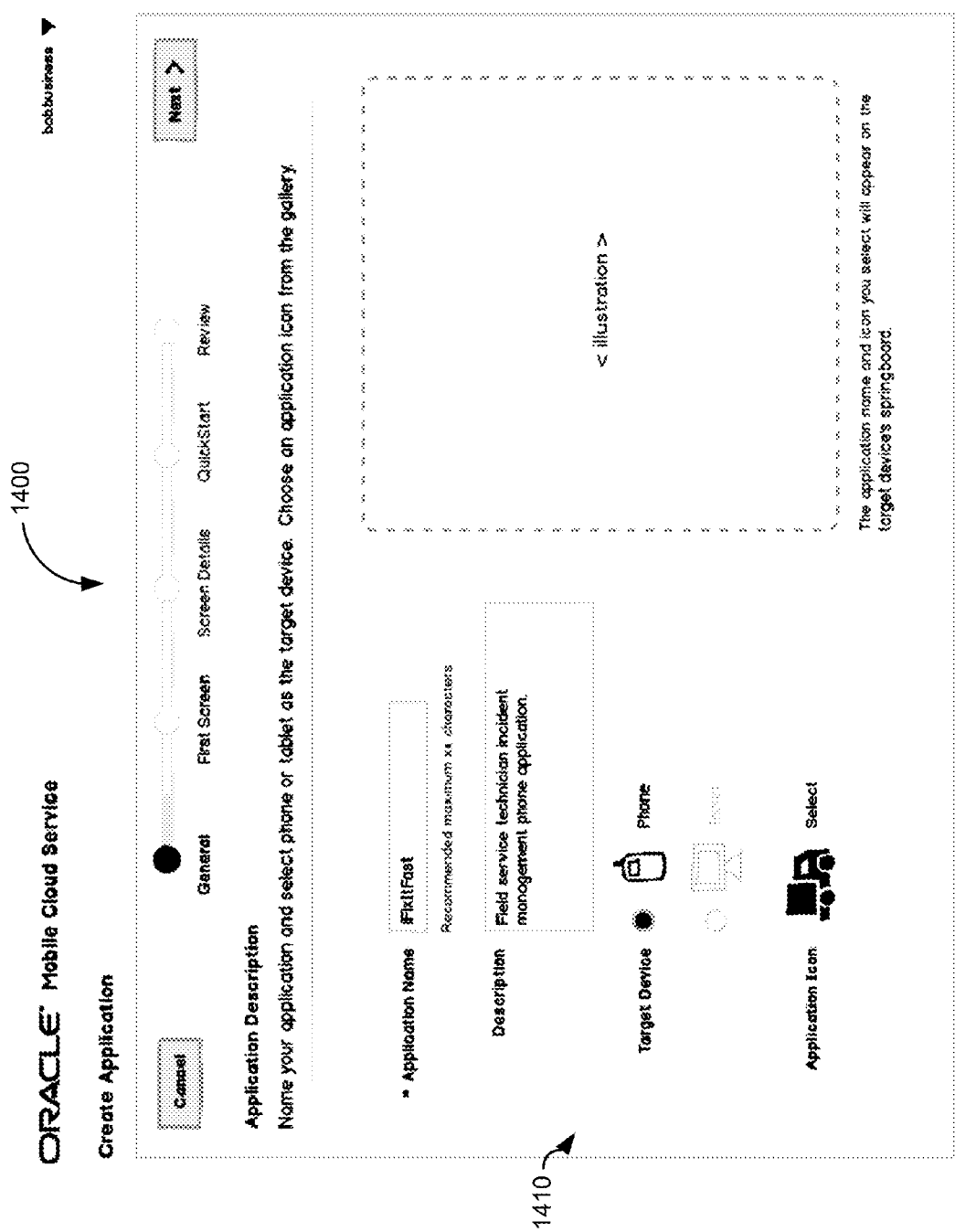

FIGS. 14A and 14B illustrates user interface 1400 that provide a developer with a set of attributes 1410 that define the new mobile application. As shown in FIG. 14A, attributes 1410 include an application name, a description, a target device type (e.g., phone, tablet, etc.), an icon. Other attributes may be presented and collected to form the application definition. FIG. 14B illustrates a set of values specified for attributes 1410 in one embodiment.

Figure 15A:
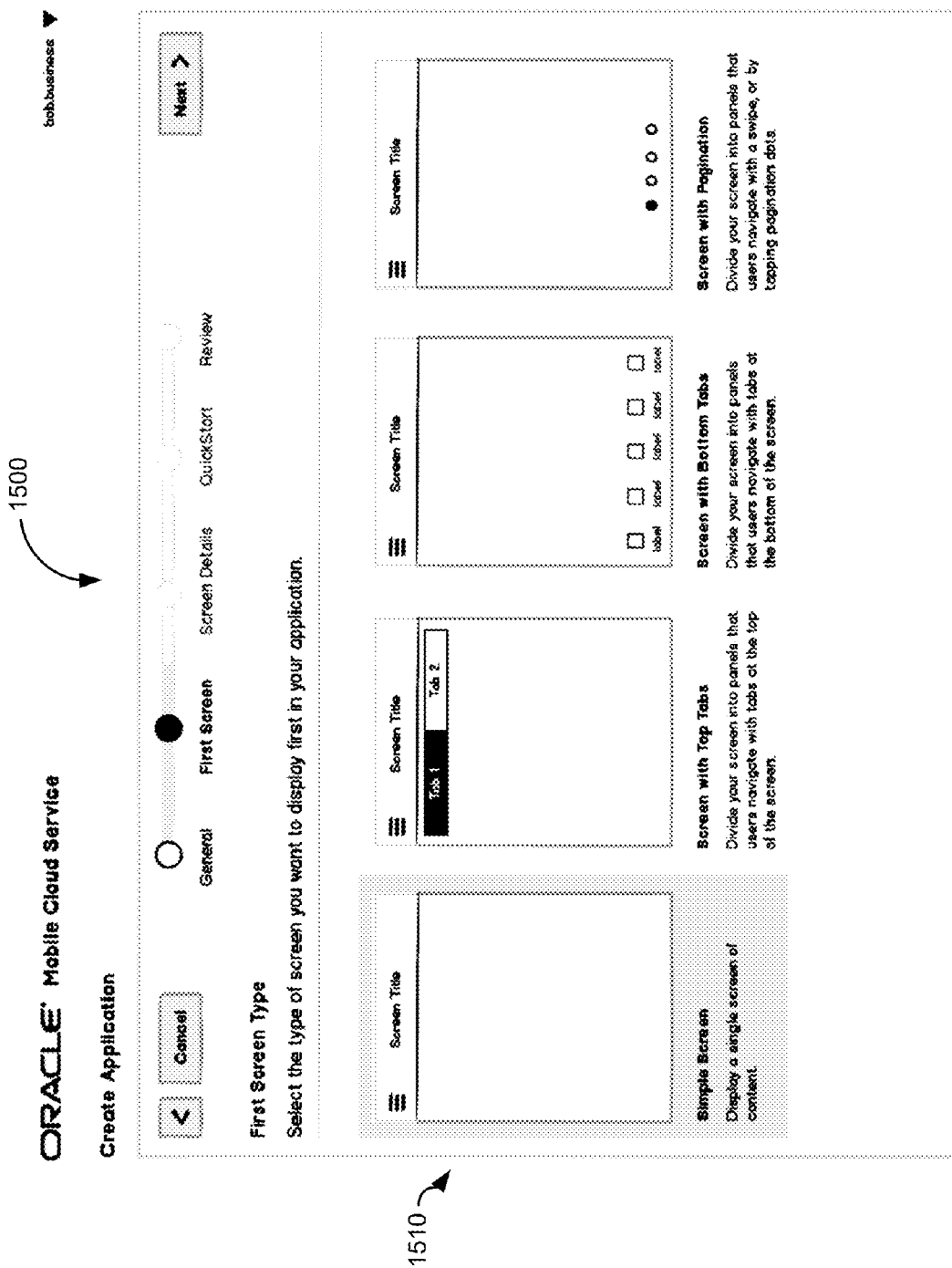
FIGS. 15A and 15B illustrate a user interface that provides a developer with a set of screen types that define the first screen of the new mobile application in one embodiment.
Figure 15B:
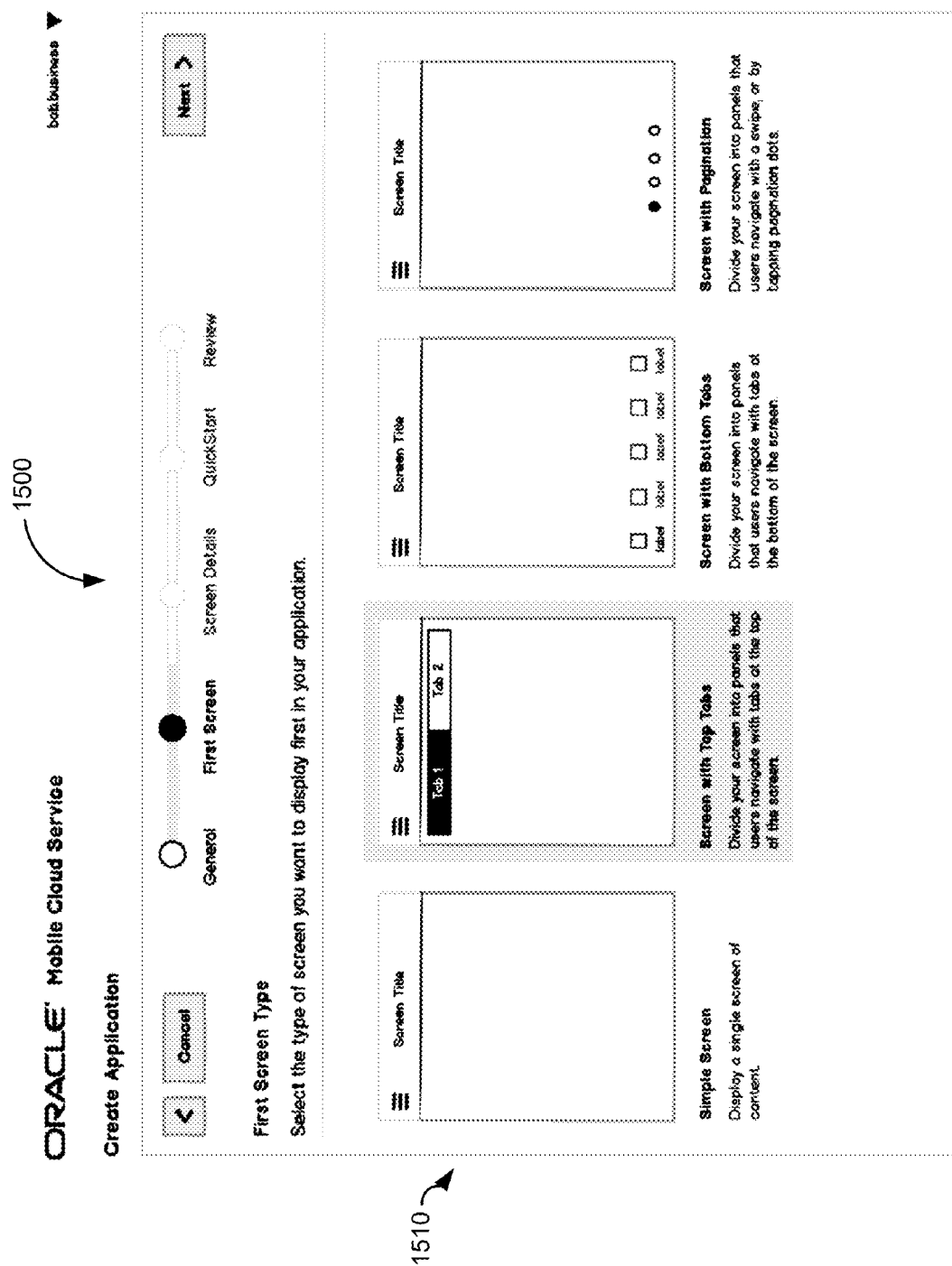

In certain embodiments, the application definition wizard can prompt or otherwise guide a developer to specify a type of first screen for the mobile application. In one aspect, a developer can be presented with a set of screen types, such as simple screen, a screen with top tabs, a screen with bottom tabs, a screen with pagination, or the like. FIGS. 15A and 15B illustrate user interface 1500 that provides a developer with a set of screen types 1510 that define the first screen of the new mobile application. FIG. 15A illustrates a default selection of a first screen as a simple screen type. FIG. 15B illustrates that a developer has selected a screen with top tabs.

Figure 16A:
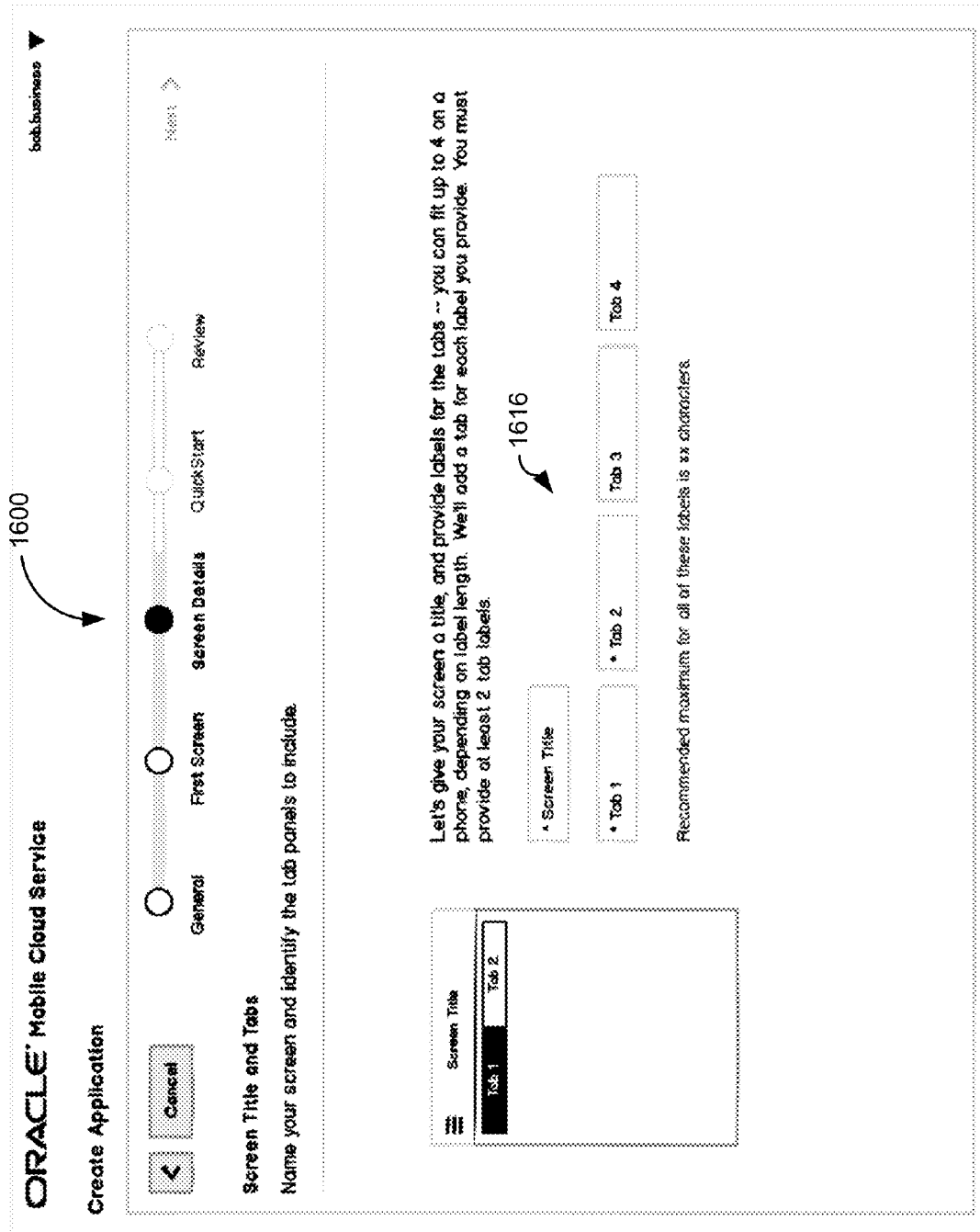
FIGS. 16A and 16B illustrate a user interface that provides a developer with a set of user interface elements specific to the type of screen selected previously in one embodiment.
Figure 16B:
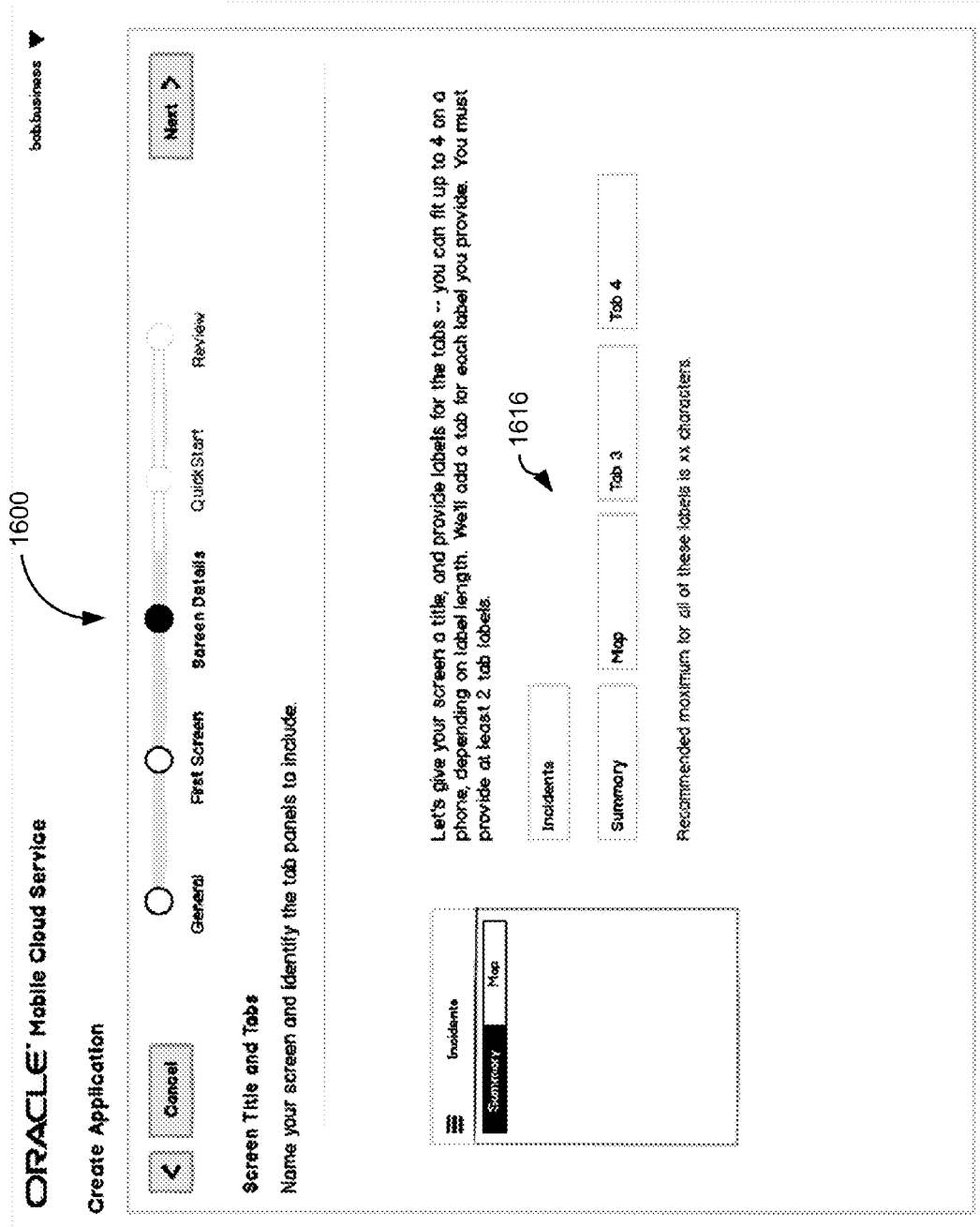

In certain embodiments, the application definition wizard can prompt or otherwise guide a developer to specify details of the first screen of the mobile application. In one aspect, a developer can be presented with a set of user interface elements specific to the type of screen selected previously. FIGS. 16A and 16B illustrate user interface 1600 that provides a developer with a set of user interface elements 1610 specific to the type of screen selected previously. FIG. 16A illustrates that based on the selection of the screen with top tabs, a developer is presented with user interface elements 1610 to define the title of the screen and the names or labels of any tabs. FIG. 16B illustrates that the developer has populated user interface elements 1610 with desired information.

Figure 17A:
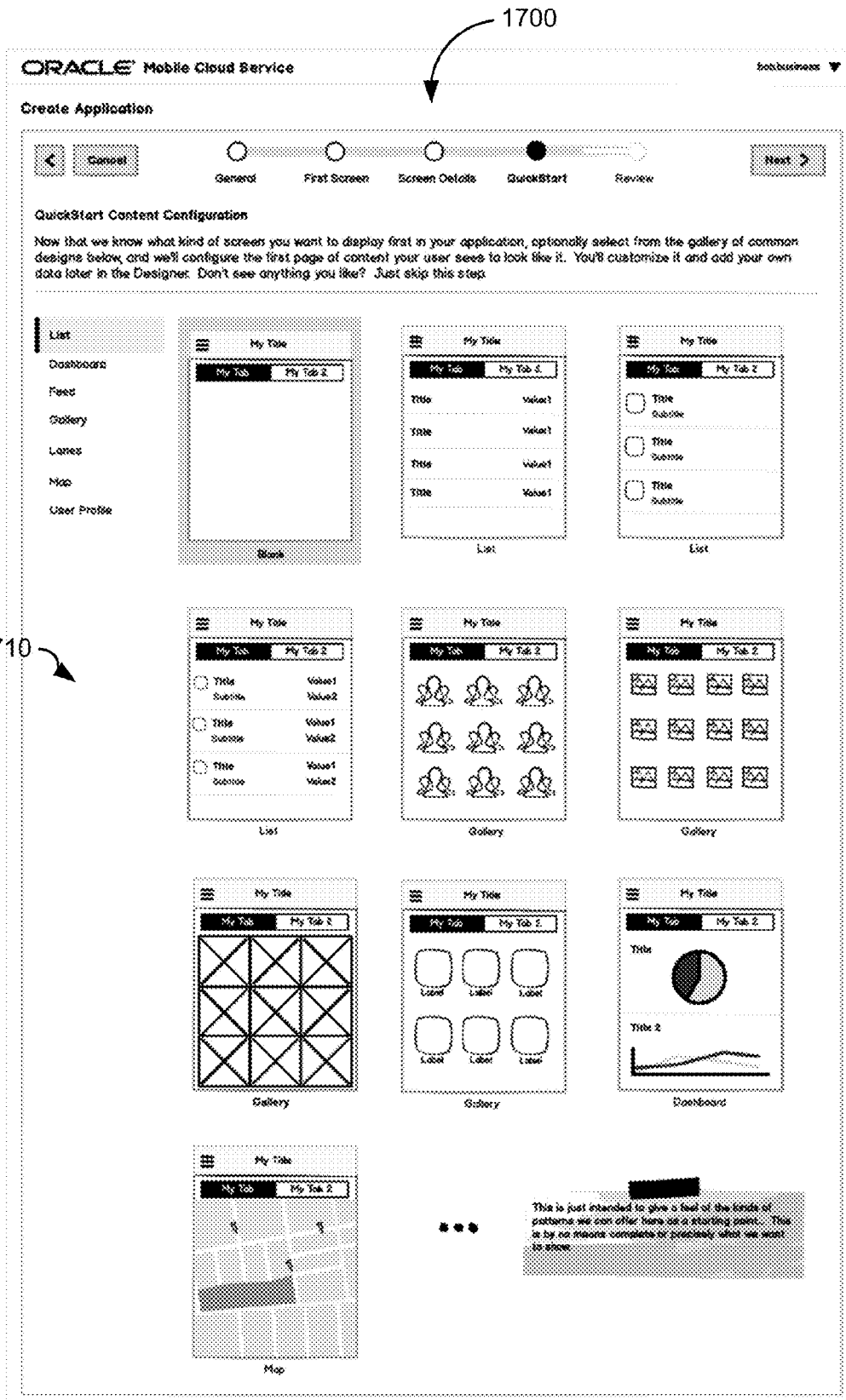
FIGS. 17A and 17B illustrate a user interface that provides a developer with a set of designs specific to the type of screen selected previously in one embodiment.
Figure 17B:
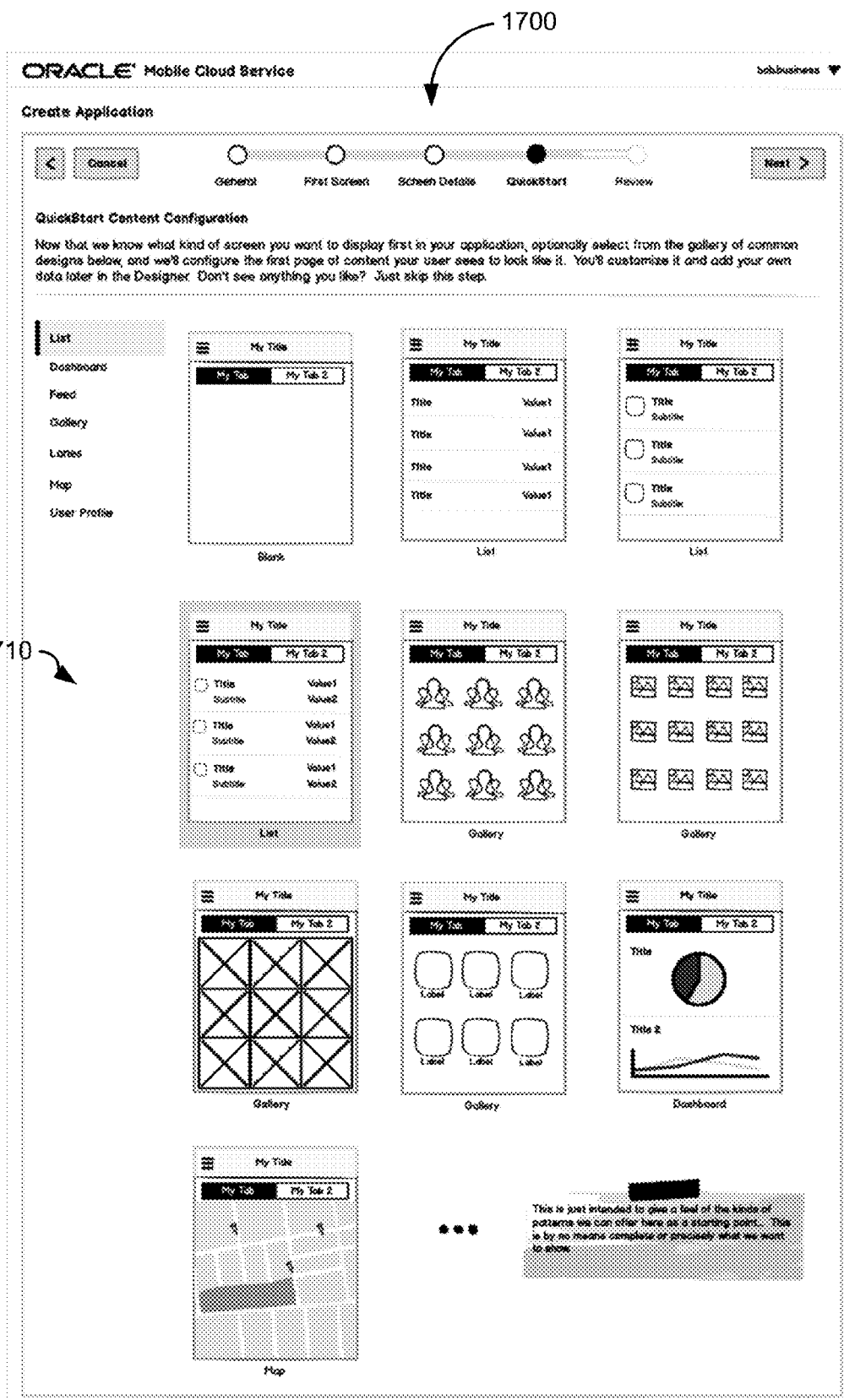

In certain embodiments, the application definition wizard can prompt or otherwise guide a developer to specify a design of the first screen of the mobile application. In one aspect, a developer can be presented with a set of screen designs specific to the type of screen selected previously. Some examples of designs can include a blank design having no screen items, a list-based design where screen items are arranged according to a predefined list layout, a gallery-based design where items are arranged according to a predefined gallery layout, a map-based design where screen items are arranged on a predefined map, or the like. FIGS. 17A and 17B illustrate user interface 1700 that provides a developer with a set of designs 1710 specific to the type of screen selected previously. FIG. 17A illustrates a default design of the top tab first screen as one having no additional elements (e.g., a blank canvas to be populated later by the developer). FIG. 17B illustrates that a developer has selected a list-based design.

Figure 18:
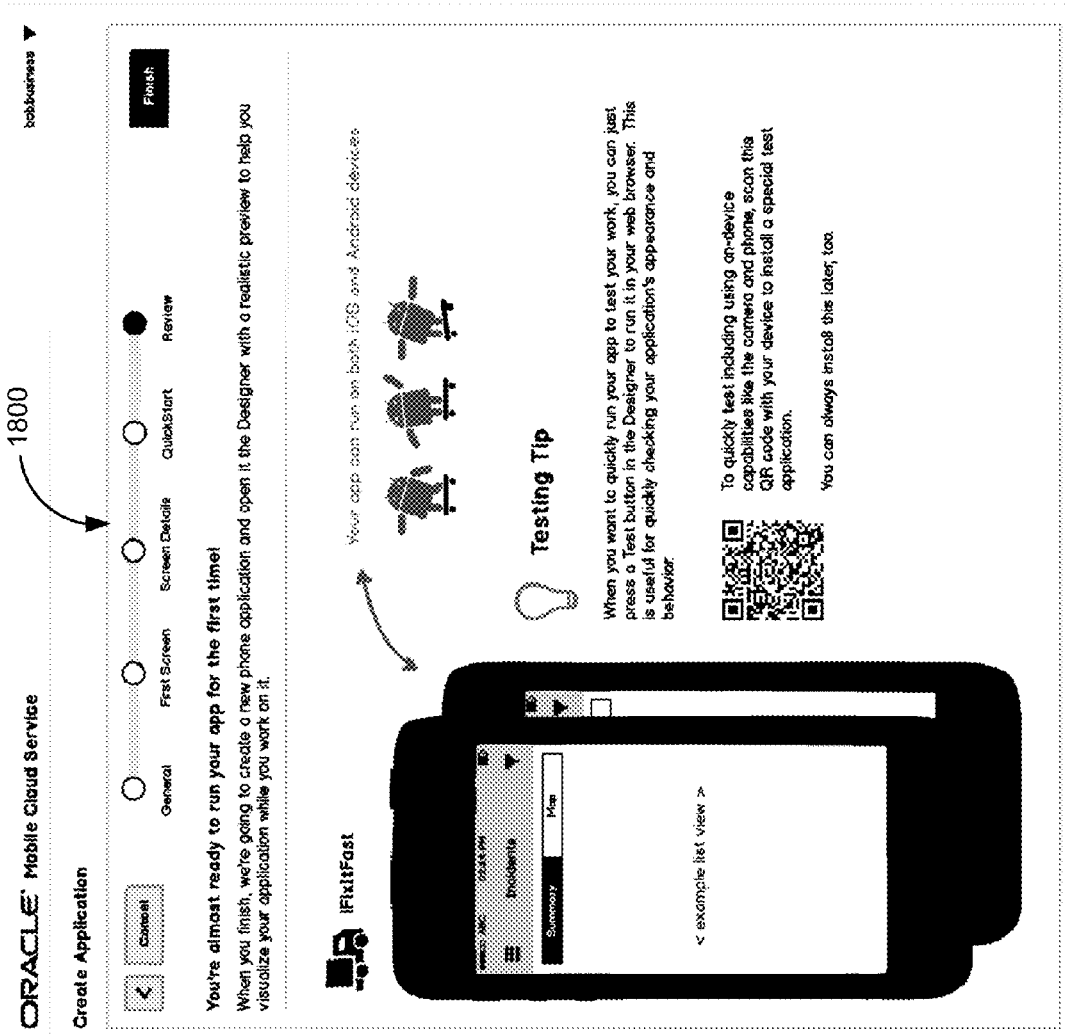
FIG. 18 illustrates a user interface that provides a developer with one or more options for finalizing details of the new application in one embodiment.

In certain embodiments, the application definition wizard can prompt or otherwise guide a developer to finalize details of the new application. FIG. 18 illustrates user interface 1800 that provides a developer with one or more options for finalizing details of the new application. In certain embodiments, the developer may be presented with a QR code that installs a test application on the developer's device. This test application is different the newly created application, but can be updated with the application information in order to test the application on the developer's device.

Figure 19:
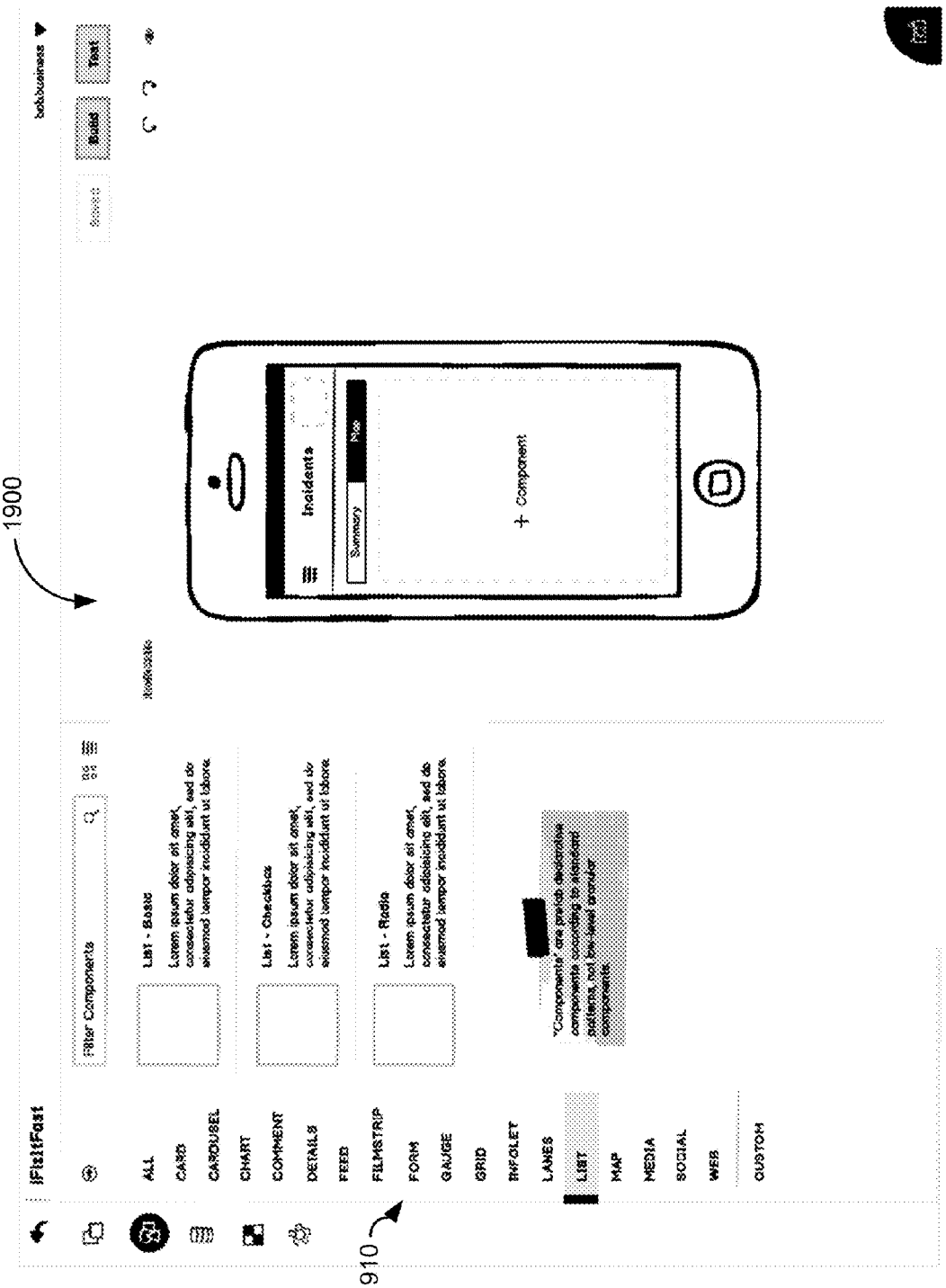
FIG. 19 is an illustration of a user interface providing a catalog of usable components in one embodiment.
Figure 20:
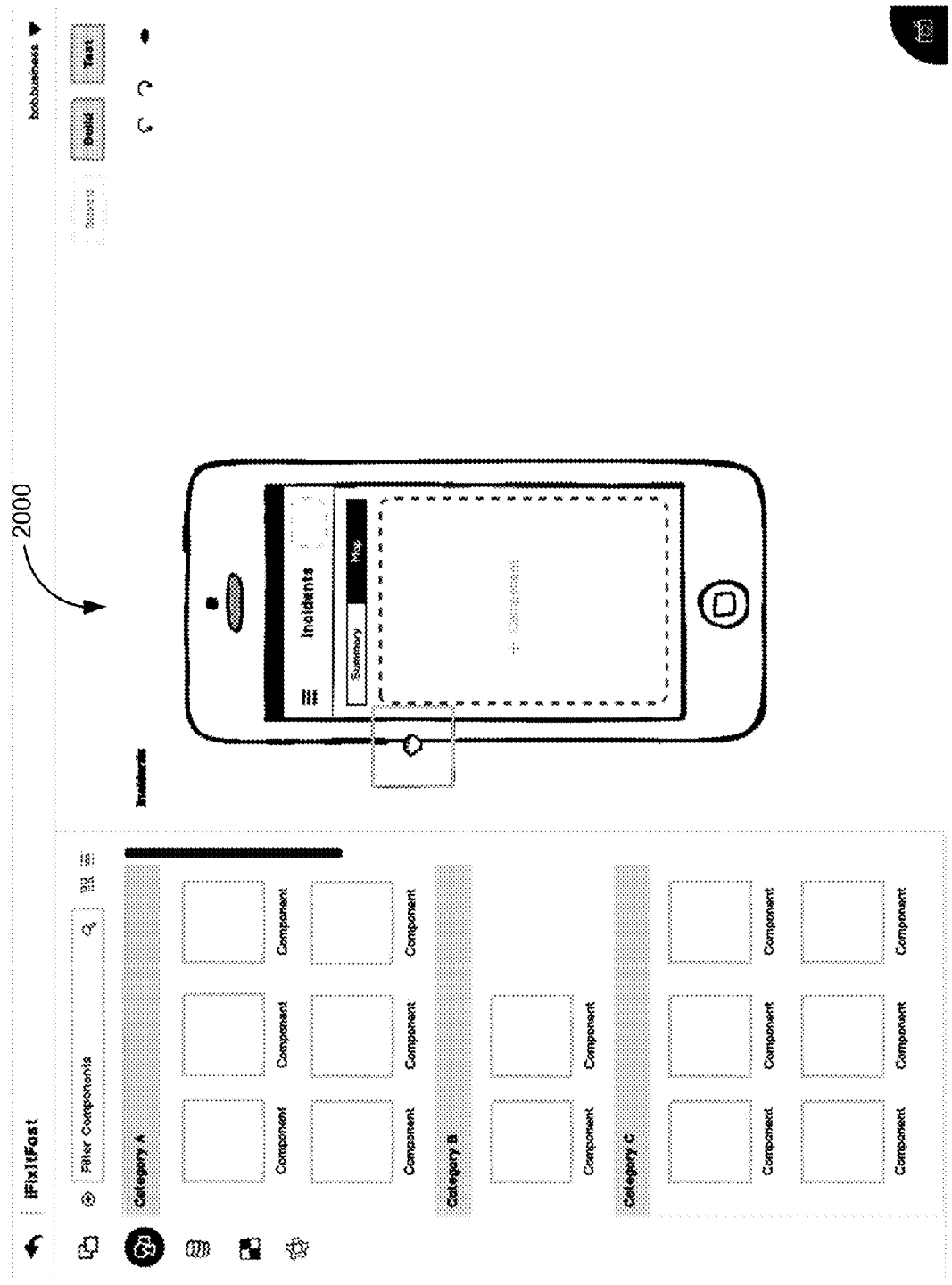
FIG. 20 is an illustration of a user interface where a developer can add components to a screen using one or more gestures in one embodiment.
Figure 21:
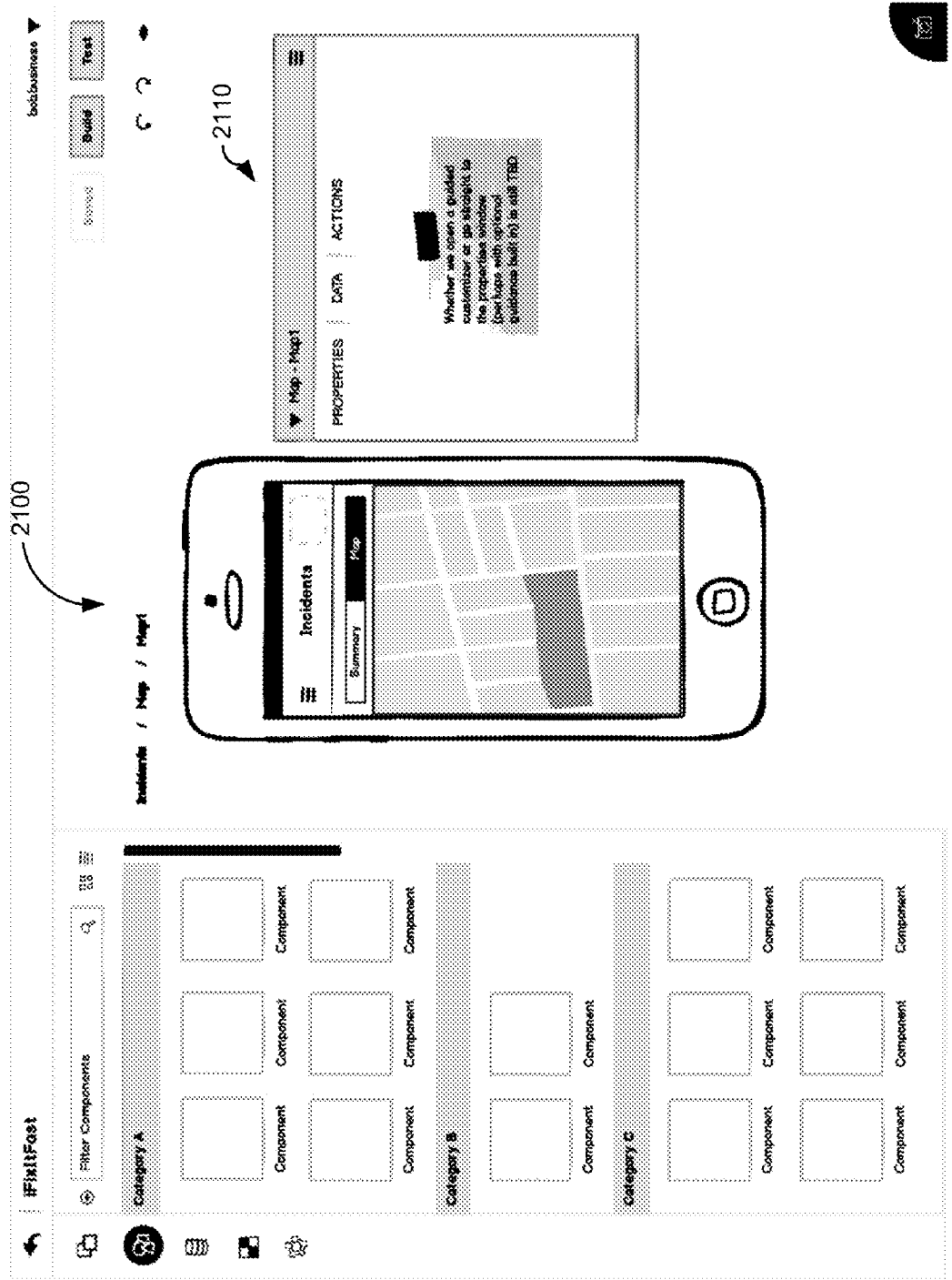
FIG. 21 is an illustration of a user interface after a developer has added a map component to a screen in one embodiment.

FIG. 19 is an illustration of user interface 1900 providing a catalog of usable components in one embodiment. A developer can add components to a screen using one or more gestures in one embodiment. For example, a developer can add a component from the catalog using a drag and drop gesture. FIG. 20 is an illustration of user interface 2000 where a developer can add components to a screen using one or more gestures in one embodiment. FIG. 21 is an illustration of user interface 2100 after a developer has added a map component to a screen in one embodiment. In this example, guided customizer 2110 can be opened that allows the developer to configure the added component.

Figure 22:
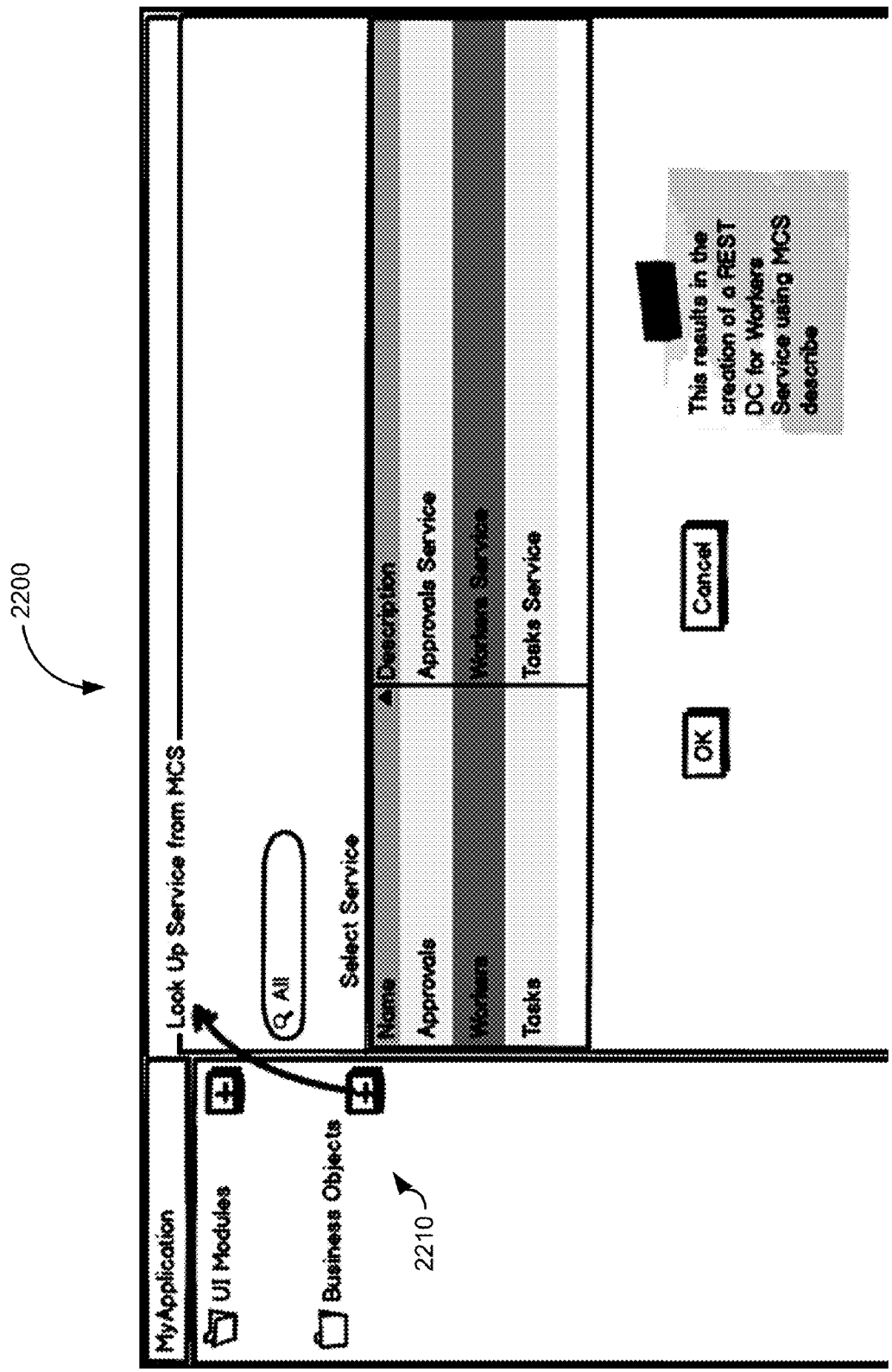
FIG. 22 is an illustration of a user interface providing a catalog of services in one embodiment.
Figure 23:
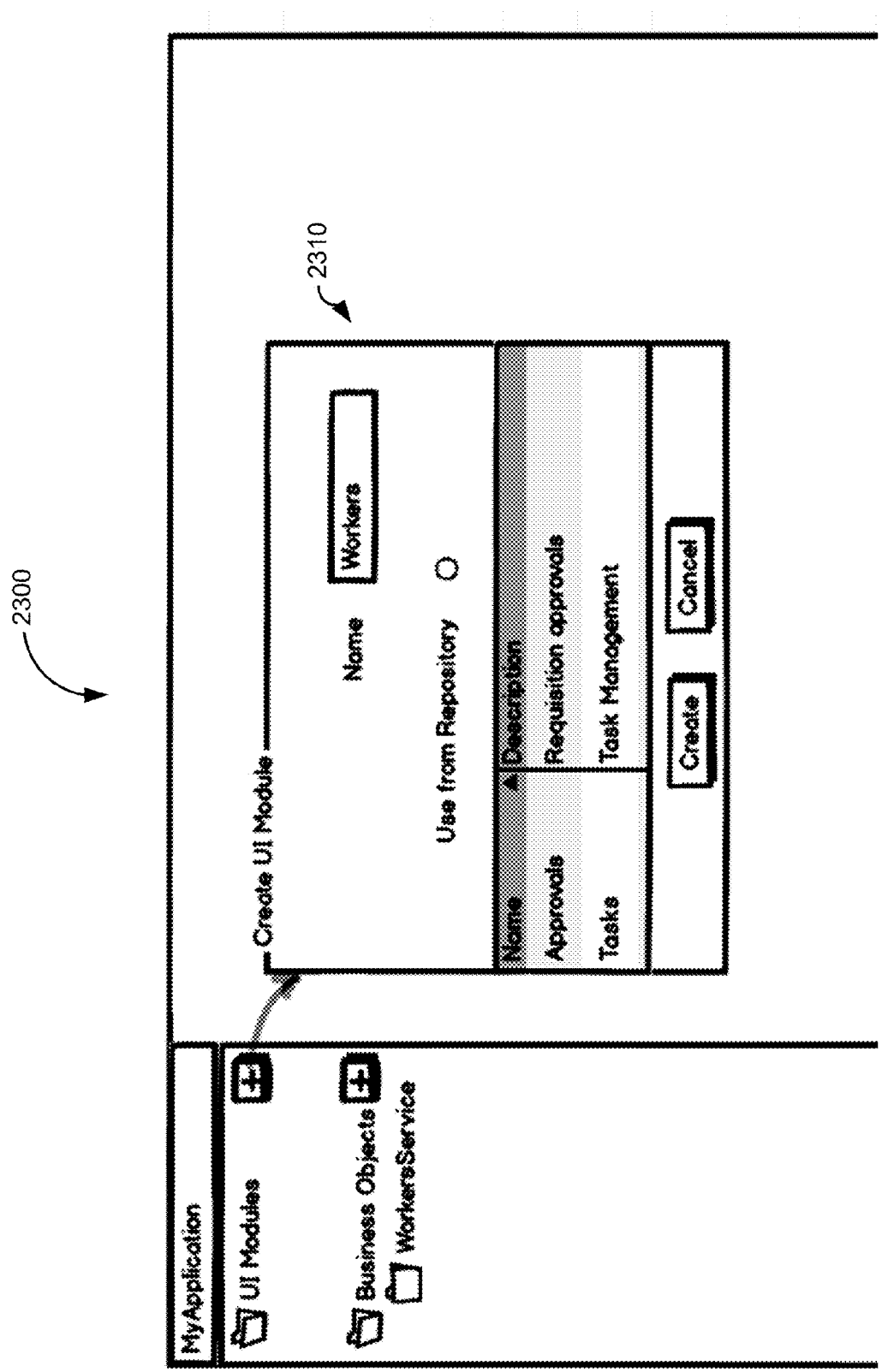
FIG. 23 is an illustration of a user interface where a developer can add create a UI module based on a selected business object in one embodiment.
Figure 24:
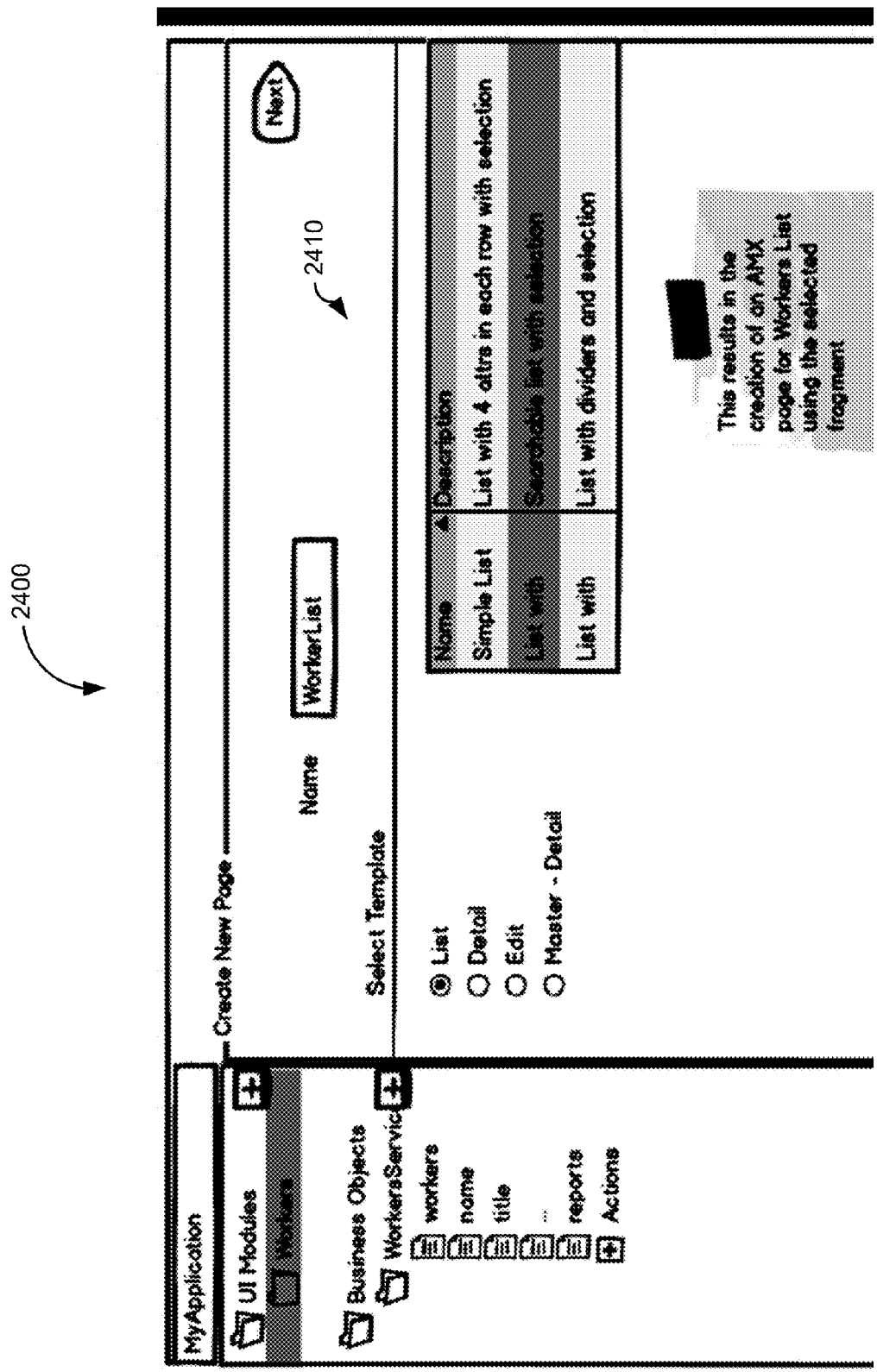
FIG. 24 is an illustration of a user interface after a developer has added a UI module in one embodiment.

FIG. 22 is an illustration of user interface 2200 providing a catalog of services in one embodiment. FIG. 23 is an illustration of user interface 2200 where a developer can add create a UI module based on a selected business object in one embodiment. For example, a developer can add a Workers Service business object and create a Worker UI module. FIG. 24 is an illustration of user interface 2200 after a developer has added a UI module in one embodiment. As discussed above, the developer can specify a template for one or more screens of pages of the UI module. Each template can drive what attributes of the selected business object are available for binding to elements of the user interface. In this example, guided customizer 2410 can be opened that allows the developer to select a template.

Updatable Native Mobile Application

In order to test out a native mobile application there are currently two very popular approaches. First, the device can be simulated via desktop software or via a web site. The second approach is to build the application and install it locally on a device. The second approach has high fidelity, but is often slow to produce and can take effort to install on a device.

In certain embodiments, application development framework 124 provides a native application that can be downloaded from the standard app stores (iOS app store, google play, etc.). This application (companion application) comes with a basic feature set. When application development framework 124 is used, distinct features of an application under development can be separated into separable parts. The companion application can then install just one of these separate features in order to test the functionality of the feature. Since the companion application is constituted by parts of various applications that are built by the user, the user can achieve a high fidelity testing environment across a wide range of applications cheaply without having to build and install those applications on their device.

Figure 25:
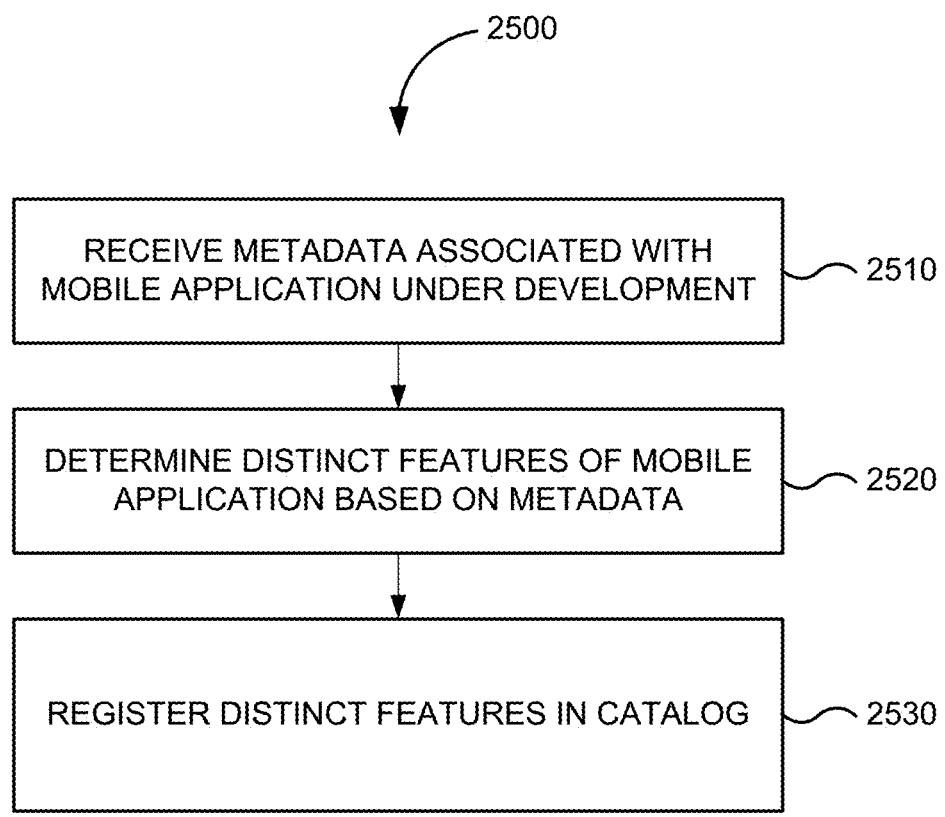
FIG. 25 is a flow diagram of a method for developing mobile applications with separate features in accordance with embodiments of the present invention.

FIG. 25 is a flow diagram of method 2500 for developing mobile applications with separate features in accordance with embodiments of the present invention. In one embodiment, the functionality of the flow diagram of FIG. 25 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

In step 2510, metadata associated with a mobile application under development is received. As discussed above, the metadata can define what components are to be included in the mobile application and how those components are configured. In step 2520, distinct features of mobile application are determined based on metadata. The determined features can include individual user interface elements, application logic, user interfaces, workflows, etc.

In step 2530, the distinct features are registered in a catalog. The catalog can identify a list of applications and each feature that can be selected for testing. The catalog can be sent to a companion application running on a mobile device. The companion application can then install features in order to test the functionality of each feature. Since the companion application is constituted by parts of various applications that are built by the user, the user can achieve a high fidelity testing environment across a wide range of applications cheaply without having to build and install those applications on their device.

Figure 26:
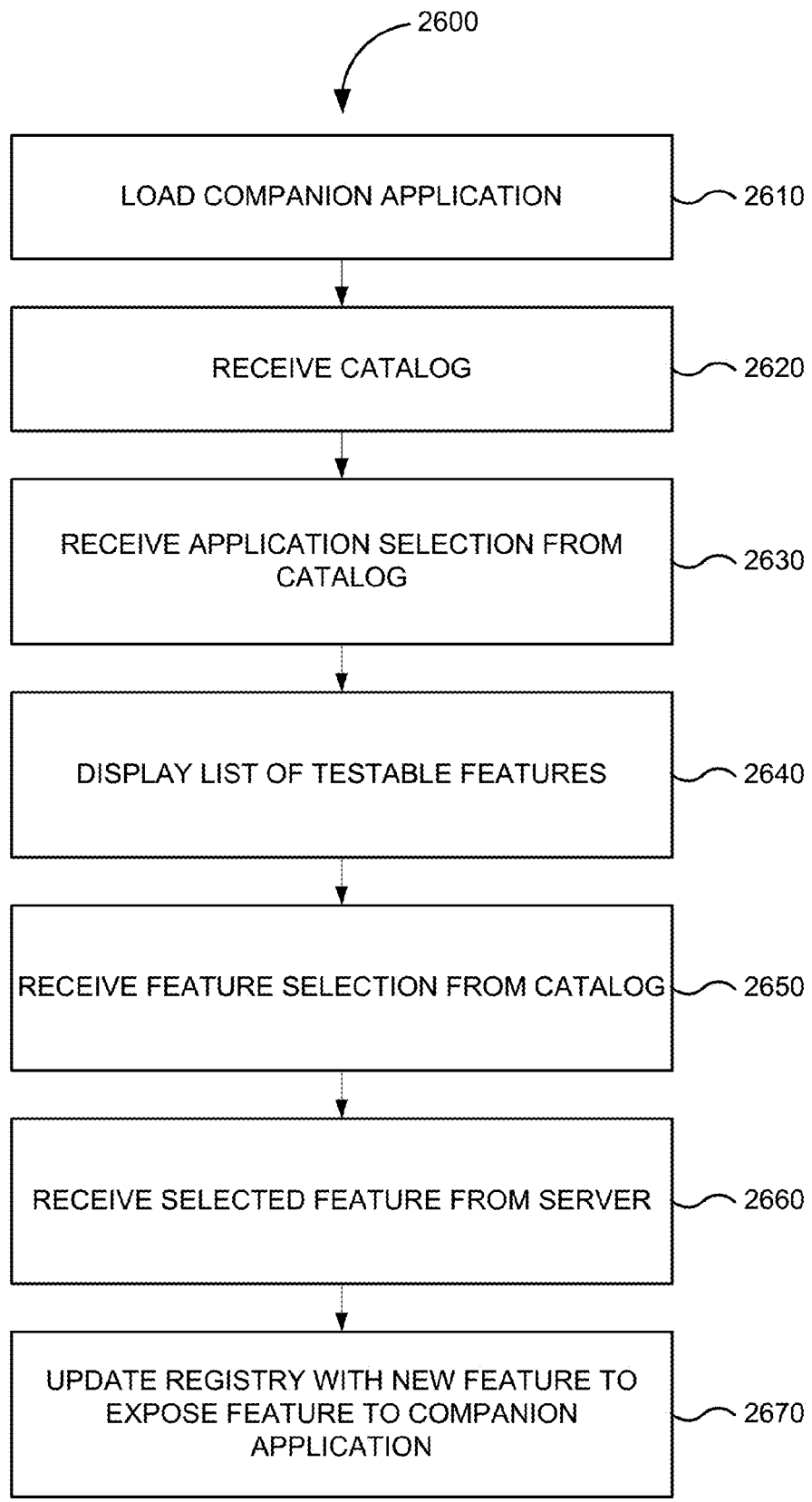
FIG. 26 is a flow diagram of a method for testing new features of mobile applications in accordance with embodiments of the present invention.

FIG. 26 is a flow diagram of method 2600 for testing new features of mobile applications in accordance with embodiments of the present invention. In one embodiment, the functionality of the flow diagram of FIG. 26 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

In step 2610, a companion application is loaded by a mobile device. The companion application can be developed according to the native device container of FIG. 4. In step 2620, an application catalog is received. The application catalog can include a list of mobile applications. The application catalog can further include a list of testable features associated with each application in the application catalog.

In step 2630, an application selection is received from the application catalog. The application selection can be made by a user of a mobile device using the companion application. In one aspect, the application selection can be made via a server in communication with the companion application.

In step 2640, a list of testable features for the selected application is displayed. The display can include a description of each feature, local and remote resources utilized by the feature, and other information that facilitates selection of the feature for test. In step 2650, a feature selection is received from the application catalog. The feature selection can be made by a user of a mobile device using the companion application.

In step 2660, the selected feature is received by the companion application from a server. The selected feature may be received in a variety of forms. In one embodiment, companion application can include generic application components that are configured according to the selected feature in response to receiving metadata defining behavior of the application components from the server. The companion application can be updated with the metadata defining the behavior of the application components. In one embodiment, companion application can receive metadata and/or binary artifacts from the server. The companion application can be updated with the metadata and/or binary artifacts from the server.

For example, in step 2670, a registry is updated with new feature to expose feature to the companion application. The metadata from a variety of applications listed in the catalog can be used to configure a generic application component according to each instance of how the component is used in the mobile application being developed. In one aspect, the registry exposes any metadata and/or binary artifacts received from the server to the companion application. Thus, the user can freely switch features on the companion application to test out different functionality across or within an application. Since the companion application is constituted by parts of various applications that are built by the user, the user can achieve a high fidelity testing environment across a wide range of applications cheaply without having to build and install those applications on their device.

Figure 27:
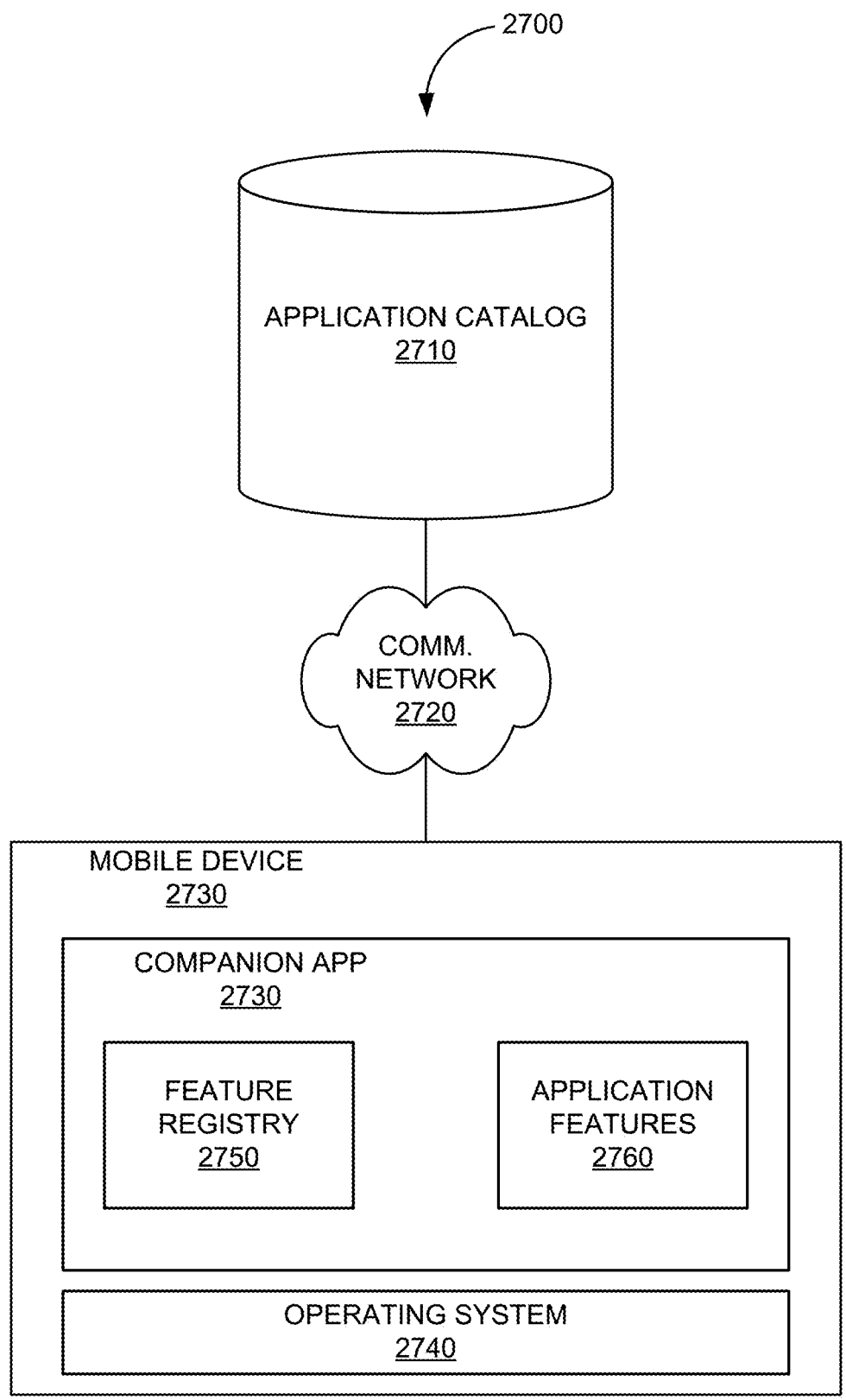
FIG. 27 is a block diagram of a system for testing new features of mobile device developed using a cloud-based service in accordance with embodiments of the present invention.

FIG. 27 is a block diagram of system 2700 for testing new features of mobile device developed using a cloud-based service in accordance with embodiments of the present invention. In this example, system 2700 includes an application catalog 2710, a communication network 2720, and mobile device 2730. Application catalog 2710 includes hardware and/or software components that provided a list of applications under test together with the features of the applications that are available for testing. Application catalog 2710 can be accessible via communication network 2720 to mobile device 2730.

Mobile device 2730 can include hardware and/or software elements including companion application 2730 and operating system 2740. Companion application 2730 can include a features registry 2750 and application features 2760.

In one embodiment, companion application 2730 can receive a list of applications along with their features from application catalog 2710. In order to test part of an application, a user can select their application and then select the desired feature. Companion application 2730 can download the selected features which now become part of companion application 2730. In various embodiments, companion application 2730 can include a main menu that allows a user to select from these features. The main menu is selectable from the home screen of the application. The user can freely switch features on companion application 2730 to test out different functionality across or within an application.

When the user wants to test a particular feature out (regardless of application), that feature can be downloaded to mobile device 2730 and stored using application features 2760. Companion application 2730 can add the feature to feature registry 2750, which exposes that feature to the main menu of companion application 2730. The user can then select that new feature from the menu to test that particular functionality.

In certain embodiments, the user then can update a particular feature to obtain the latest copy from the server. Once downloaded, the feature can run offline without additional connections to the server that vended that feature for testing.

CONCLUSION

Figure 28:
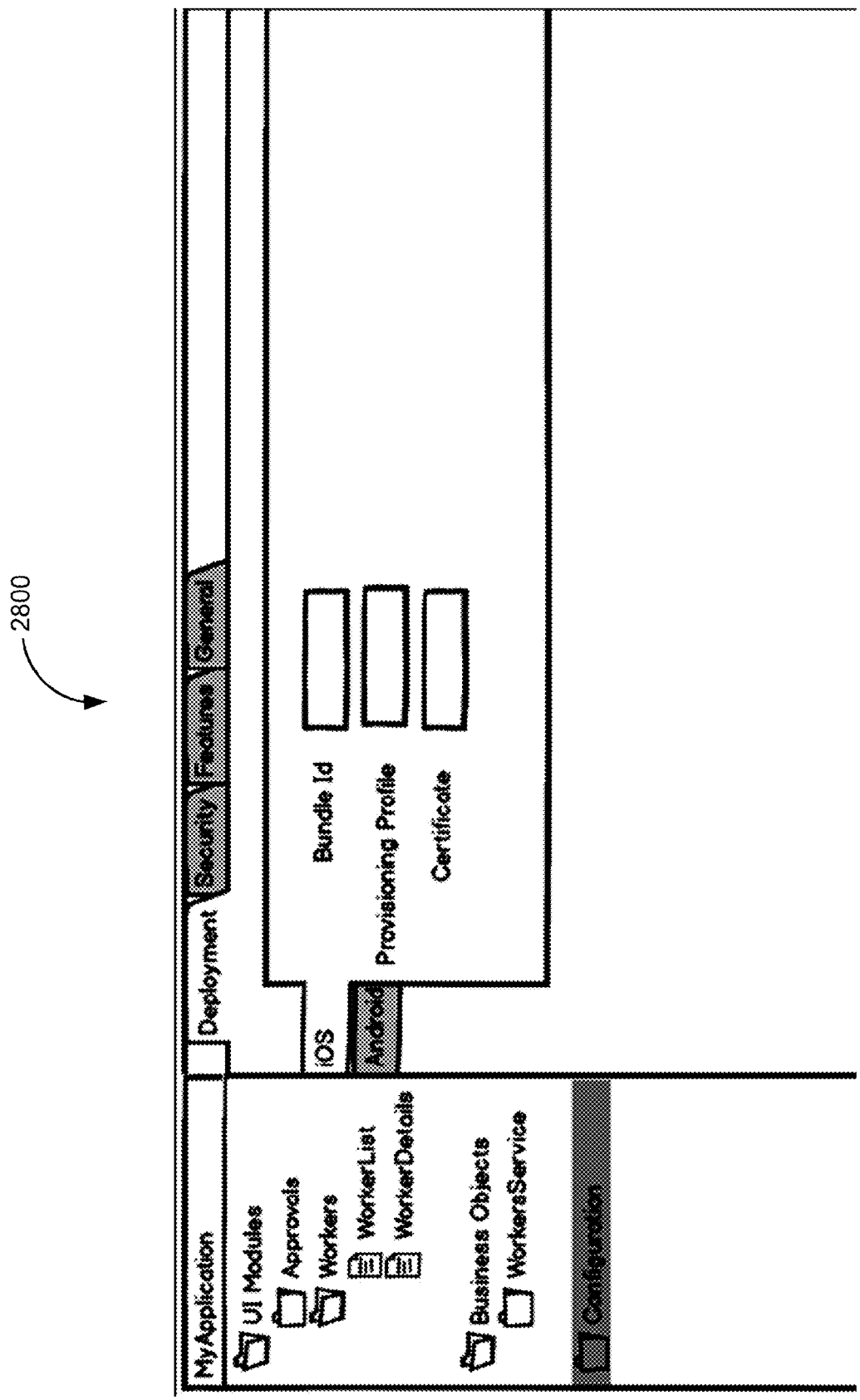
FIG. 28 is an illustration of a user interface for configuring a mobile application for deployment in one embodiment.
Figure 29:
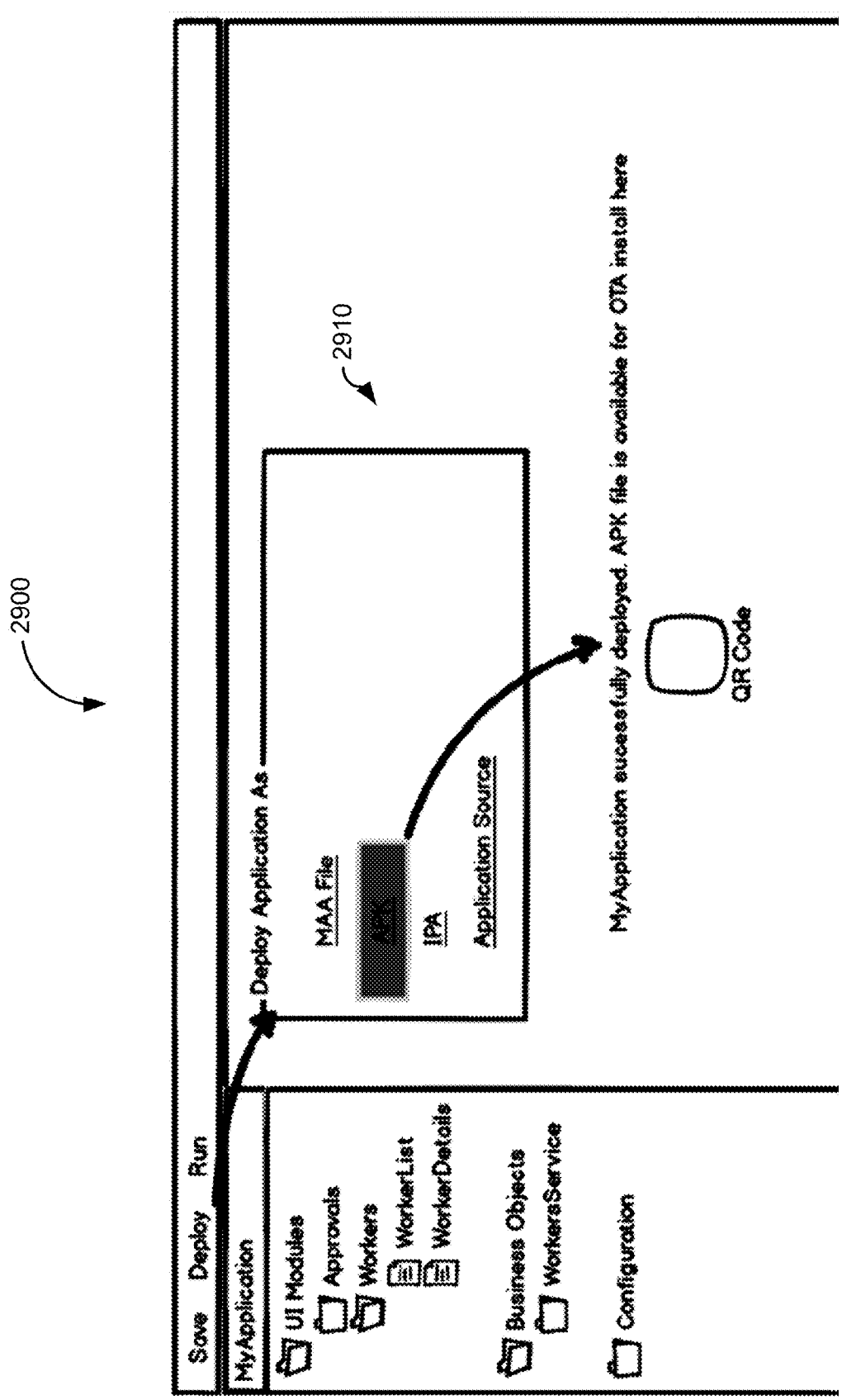
FIG. 29 is an illustration of a user interface after a mobile application is available for deployment in one embodiment.

FIG. 28 is an illustration of user interface 2800 for configuring a mobile application for deployment in one embodiment. In this example, a developer can select one or more mobile operating systems to which the mobile application may be deployed. FIG. 29 is an illustration of user interface 2900 after a mobile application is available for deployment in one embodiment. In this example, deployment dialog 2910 provides a set of deployment options. In various embodiments, selection of a deployment option cause a QR code to be generated allowing a target device to receive and install the mobile application in its native format.

Figure 30:
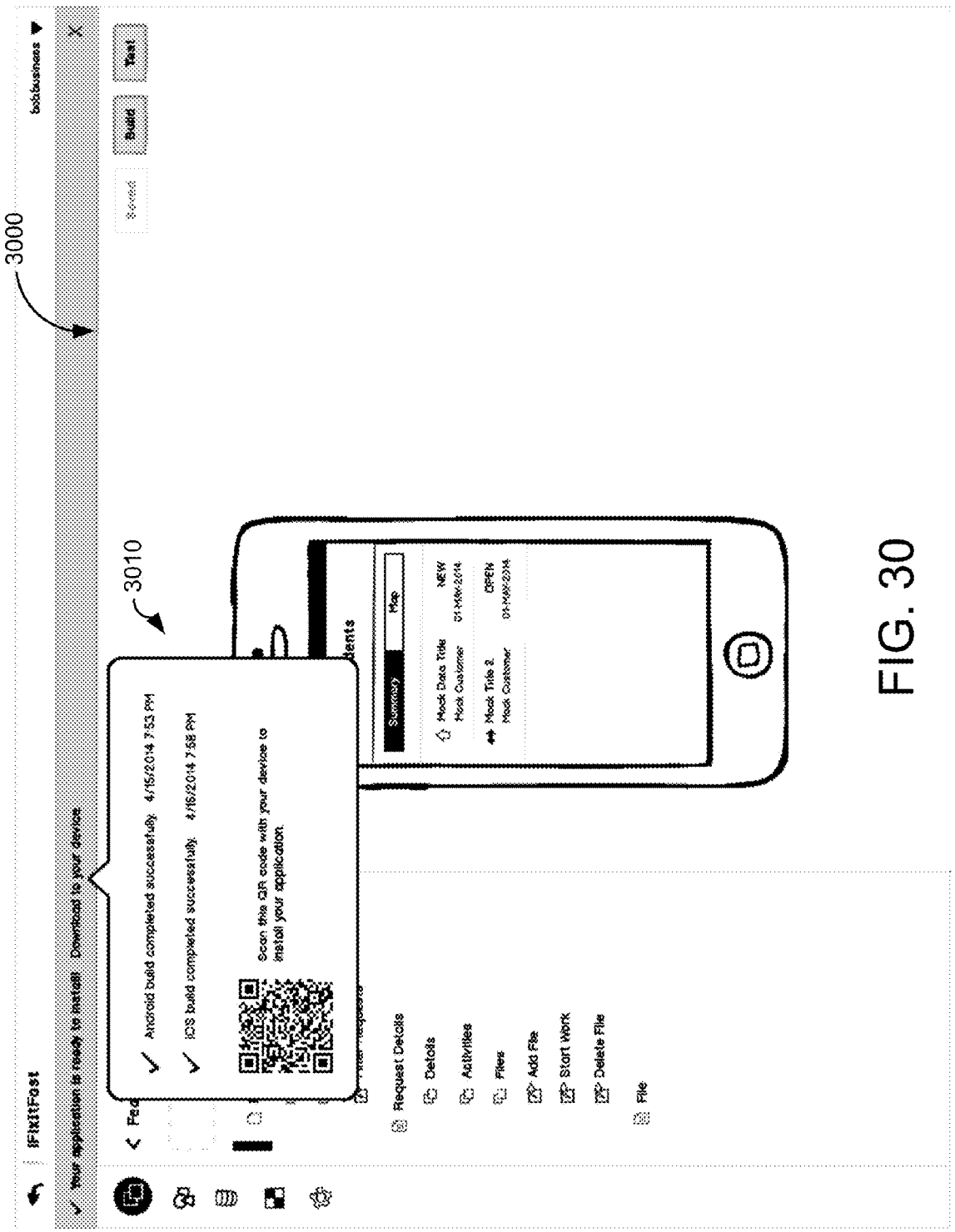
FIG. 30 is an illustration of a user interface after a mobile application is available for deployment in one embodiment.
Figure 31:
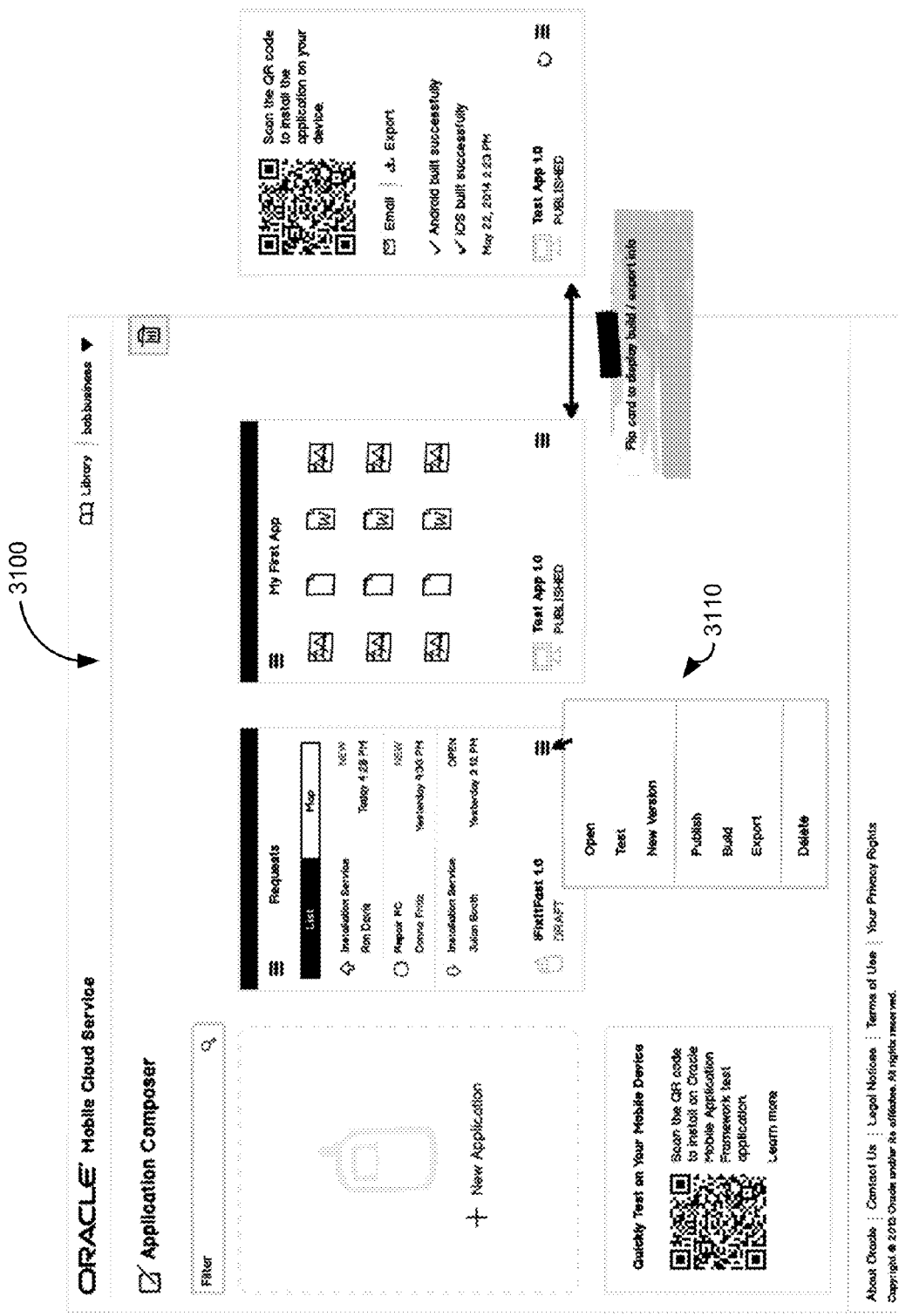
FIG. 31 is an illustration of a user interface after a mobile application is available for deployment in one embodiment.

FIG. 30 is an illustration of user interface 3000 after a mobile application is available for deployment in one embodiment. In this example, dialog 3010 includes a QR code generated to trigger installation of the mobile application in its native format on various devices. FIG. 31 is an illustration of user interface 3100 depicting the newly deployed mobile application in a developers workspace in one embodiment. In this example, dialog 3110 allows the developer to perform one or more actions with respect to the application project.

Figure 32:
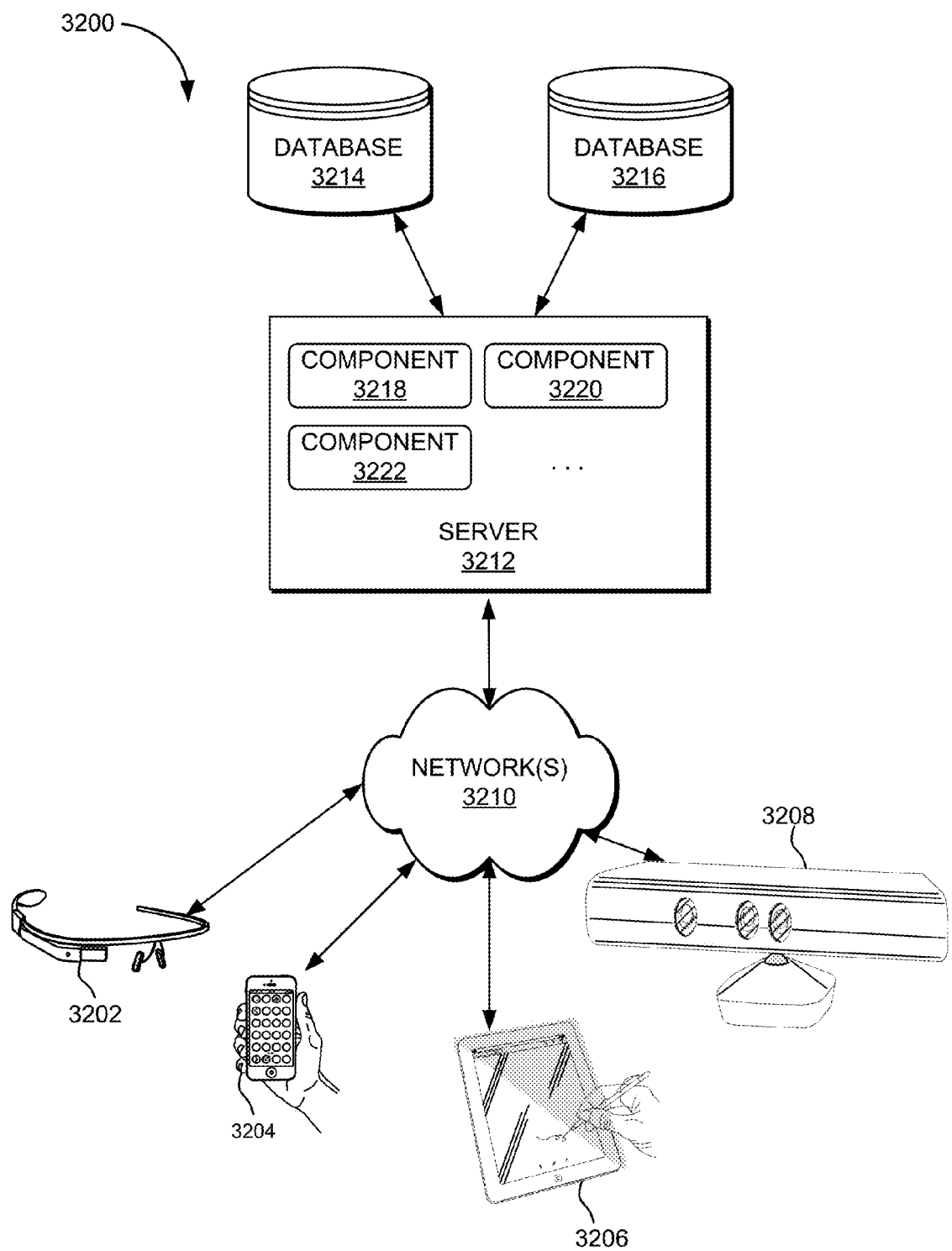
FIG. 32 depicts a simplified diagram of a distributed system for implementing one of the embodiments.

FIG. 32 depicts a simplified diagram of distributed system 3200 for implementing one of the embodiments. In the illustrated embodiment, distributed system 3200 includes one or more client computing devices 3202, 3204, 3206, and 3208, which are configured to execute and operate a client application such as a web browser, proprietary client (e.g., Oracle Forms), or the like over one or more network(s) 3210. Server 3212 may be communicatively coupled with remote client computing devices 3202, 3204, 3206, and 3208 via network 3210.

In various embodiments, server 3212 may be adapted to run one or more services or software applications provided by one or more of the components of the system. In some embodiments, these services may be offered as web-based or cloud services or under a Software as a Service (SaaS) model or a Platform as a Serves (PaaS) model to the users of client computing devices 3202, 3204, 3206, and/or 3208. Users operating client computing devices 3202, 3204, 3206, and/or 3208 may in turn utilize one or more client applications to interact with server 3212 to utilize the services provided by these components.

In the configuration depicted in FIG. 32, software components 3218, 3220, and 3222 of system 3200 are shown as being implemented on server 3212. In other embodiments, one or more of the components of system 3200 and/or the services provided by these components may also be implemented by one or more of the client computing devices 3202, 3204, 3206, and/or 3208. Users operating the client computing devices may then utilize one or more client applications to use the services provided by these components. These components may be implemented in hardware, firmware, software, or combinations thereof. It should be appreciated that various different system configurations are possible, which may be different from distributed system 3200. The embodiment shown in the figure is thus one example of a distributed system for implementing an embodiment system and is not intended to be limiting.

Client computing devices 3202, 3204, 3206, and/or 3208 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 32, Palm OS, and the like, and being Internet, e-mail, short message service (SMS), Blackberry®, or other communication protocol enabled. Client computing devices 3202, 3204, 3206, and/or 3208 can be general purpose personal computers including, by way of example, personal computers and/or laptop computers running various versions of Microsoft Windows®, Apple Macintosh®, and/or Linux operating systems. Client computing devices 3202, 3204, 3206, and/or 3208 can be workstation computers running any of a variety of commercially-available UNIX® or UNIX-like operating systems, including without limitation the variety of GNU/Linux operating systems, such as for example, Google Chrome OS. Alternatively, or in addition, client computing devices 3202, 3204, 3206, and 3208 may be any other electronic device, such as a thin-client computer, an Internet-enabled gaming system (e.g., a Microsoft Xbox gaming console with or without a Kinect® gesture input device), and/or a personal messaging device, capable of communicating over network(s) 3210.

Although exemplary distributed system 3200 is shown with four client computing devices, any number of client computing devices may be supported. Other devices, such as devices with sensors, etc., may interact with server 3212.

Network(s) 3210 in distributed system 3200 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 3210 can be a local area network (LAN), such as one based on Ethernet, Token-Ring and/or the like. Network(s) 3210 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 3212 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 3212 may be adapted to run one or more services or software applications described in the foregoing disclosure. For example, server 3212 may correspond to a server for performing processing described above according to an embodiment of the present disclosure.

Server 3212 may run an operating system including any of those discussed above, as well as any commercially available server operating system. Server 3212 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 3212 may include one or more applications to analyze and consolidate data feeds and/or event updates received from users of client computing devices 3202, 3204, 3206, and 3208. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 3212 may also include one or more applications to display the data feeds and/or real-time events via one or more display devices of client computing devices 3202, 3204, 3206, and 3208.

Distributed system 3200 may also include one or more databases 3214 and 3216. Databases 3214 and 3216 may reside in a variety of locations. By way of example, one or more of databases 3214 and 3216 may reside on a non-transitory storage medium local to (and/or resident in) server 3212. Alternatively, databases 3214 and 3216 may be remote from server 3212 and in communication with server 3212 via a network-based or dedicated connection. In one set of embodiments, databases 3214 and 3216 may reside in a storage-area network (SAN). Similarly, any necessary files for performing the functions attributed to server 3212 may be stored locally on server 3212 and/or remotely, as appropriate. In one set of embodiments, databases 3214 and 3216 may include relational databases, such as databases provided by Oracle, that are adapted to store, update, and retrieve data in response to SQL-formatted commands.

Figure 33:
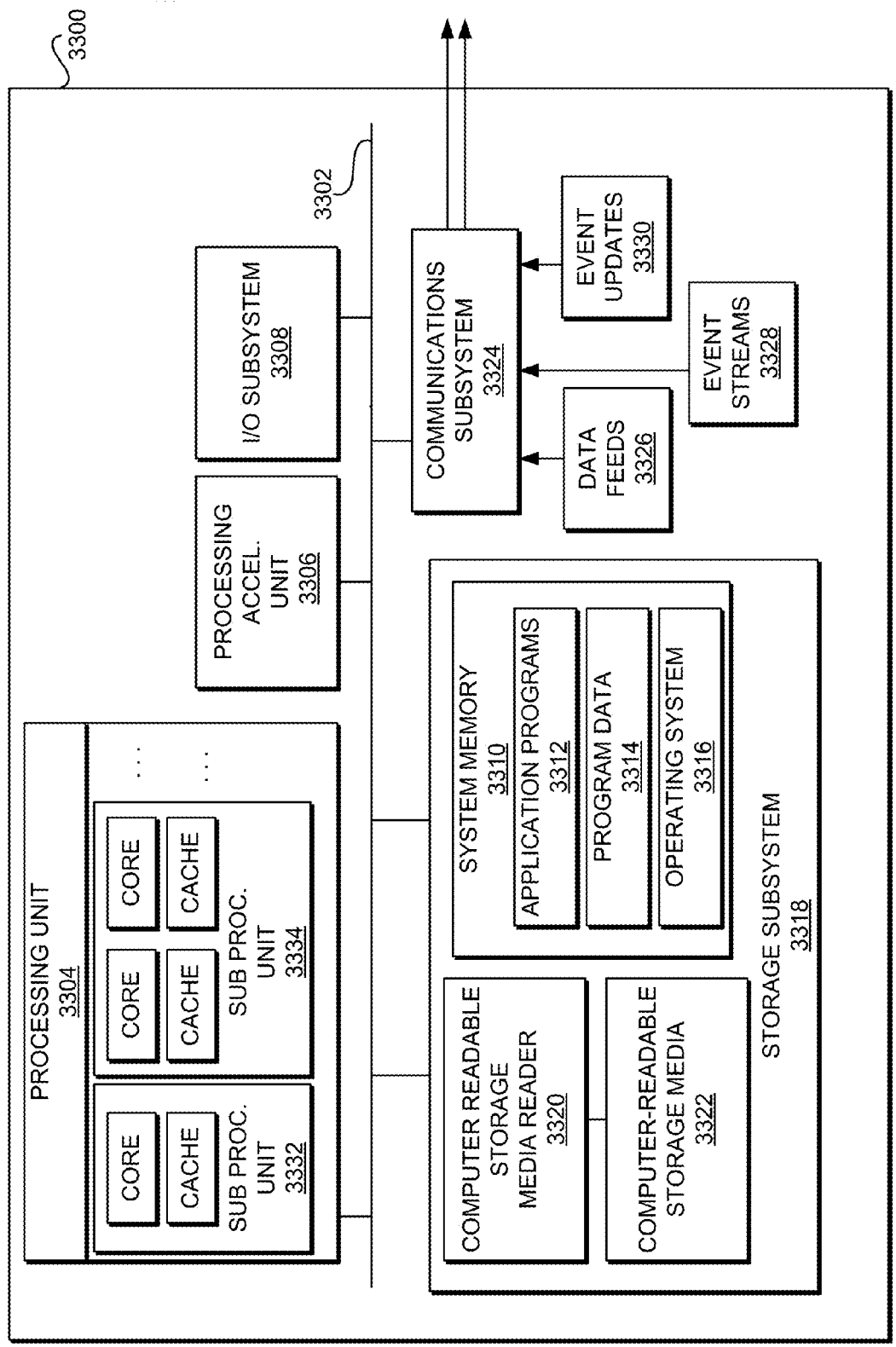
FIG. 33 illustrates an exemplary computer system, in which various embodiments of the present invention may be implemented.

FIG. 33 illustrates an exemplary computer system 3300, in which various embodiments of the present invention may be implemented. The system 3300 may be used to implement any of the computer systems described above. As shown in FIG. 33, computer system 3300 includes bus subsystem 3302 and processing unit 3304 that communicates with a number of peripheral subsystems via bus subsystem 3302. These peripheral subsystems may include processing acceleration unit 3306, I/O subsystem 3308, storage subsystem 3318, and communications subsystem 3324. Storage subsystem 3318 includes tangible computer-readable storage media 3322 and a system memory 3310.

Bus subsystem 3302 provides a mechanism for letting the various components and subsystems of computer system 3300 communicate with each other as intended. Although bus subsystem 3302 is shown schematically as a single bus, alternative embodiments of the bus subsystem may utilize multiple buses. Bus subsystem 3302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 3304, which can be implemented as one or more integrated circuits (e.g., a conventional microprocessor or microcontroller), controls the operation of computer system 3300. One or more processors may be included in processing unit 3304. These processors may include single core or multicore processors. In certain embodiments, processing unit 3304 may be implemented as one or more independent processing units 3332 and/or 3334 with single or multicore processors included in each processing unit. In other embodiments, processing unit 3304 may also be implemented as a quad-core processing unit formed by integrating two dual-core processors into a single chip.

In various embodiments, processing unit 3304 can execute a variety of programs in response to program code and can maintain multiple concurrently executing programs or processes. At any given time, some or all of the program code to be executed can be resident in processor(s) 3304 and/or in storage subsystem 3318. Through suitable programming, processor(s) 3304 can provide various functionalities described above. Computer system 3300 may additionally include a processing acceleration unit 3306, which can include a digital signal processor (DSP), a special-purpose processor, and/or the like.

I/O subsystem 3308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 3300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 3300 may comprise a storage subsystem 3318 that comprises software elements, shown as being currently located within a system memory 3310. System memory 3310 may store program instructions that are loadable and executable on processing unit 3304, as well as data generated during the execution of these programs.

Depending on the configuration and type of computer system 3300, system memory 3310 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 3304. In some implementations, system memory 3310 may include multiple different types of memory, such as static random access memory (SRAM) or dynamic random access memory (DRAM). In some implementations, a basic input/output system (BIOS), containing the basic routines that help to transfer information between elements within computer system 3300, such as during start-up, may typically be stored in the ROM. By way of example, and not limitation, system memory 3310 also illustrates application programs 3312, which may include client applications, Web browsers, mid-tier applications, relational database management systems (RDBMS), etc., program data 3314, and an operating system 3316. By way of example, operating system 3316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 33 OS, and Palm® OS operating systems.

Storage subsystem 3318 may also provide a tangible computer-readable storage medium for storing the basic programming and data constructs that provide the functionality of some embodiments. Software (programs, code modules, instructions) that when executed by a processor provide the functionality described above may be stored in storage subsystem 3318. These software modules or instructions may be executed by processing unit 3304. Storage subsystem 3318 may also provide a repository for storing data used in accordance with the present invention.

Storage subsystem 3300 may also include a computer-readable storage media reader 3320 that can further be connected to computer-readable storage media 3322. Together and, optionally, in combination with system memory 3310, computer-readable storage media 3322 may comprehensively represent remote, local, fixed, and/or removable storage devices plus storage media for temporarily and/or more permanently containing, storing, transmitting, and retrieving computer-readable information.

Computer-readable storage media 3322 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 3300.

By way of example, computer-readable storage media 3322 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 3322 may include, but is not limited to, Zip® drives, flash memory cards, universal serial bus (USB) flash drives, secure digital (SD) cards, DVD disks, digital video tape, and the like. Computer-readable storage media 3322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 3300.

Communications subsystem 3324 provides an interface to other computer systems and networks. Communications subsystem 3324 serves as an interface for receiving data from and transmitting data to other systems from computer system 3300. For example, communications subsystem 3324 may enable computer system 3300 to connect to one or more devices via the Internet. In some embodiments communications subsystem 3324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 3324 can provide wired network connectivity (e.g., Ethernet) in addition to or instead of a wireless interface.

In some embodiments, communications subsystem 3324 may also receive input communication in the form of structured and/or unstructured data feeds 3326, event streams 3328, event updates 3330, and the like on behalf of one or more users who may use computer system 3300.

By way of example, communications subsystem 3324 may be configured to receive data feeds 3326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 3324 may also be configured to receive data in the form of continuous data streams, which may include event streams 3328 of real-time events and/or event updates 3330, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 3324 may also be configured to output the structured and/or unstructured data feeds 3326, event streams 3328, event updates 3330, and the like to one or more databases that may be in communication with one or more streaming data source computers coupled to computer system 3300.

Computer system 3300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 3300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Various embodiments of any of one or more inventions whose teachings may be presented within this disclosure can be implemented in the form of logic in software, firmware, hardware, or a combination thereof. The logic may be stored in or on a machine-accessible memory, a machine-readable article, a tangible computer-readable medium, a computer-readable storage medium, or other computer/machine-readable media as a set of instructions adapted to direct a central processing unit (CPU or processor) of a logic machine to perform a set of steps that may be disclosed in various embodiments of an invention presented within this disclosure. The logic may form part of a software program or computer program product as code modules become operational with a processor of a computer system or an information-processing device when executed to perform a method or process in various embodiments of an invention presented within this disclosure. Based on this disclosure and the teachings provided herein, a person of ordinary skill in the art will appreciate other ways, variations, modifications, alternatives, and/or methods for implementing in software, firmware, hardware, or combinations thereof any of the disclosed operations or functionalities of various embodiments of one or more of the presented inventions.

The disclosed examples, implementations, and various embodiments of any one of those inventions whose teachings may be presented within this disclosure are merely illustrative to convey with reasonable clarity to those skilled in the art the teachings of this disclosure. As these implementations and embodiments may be described with reference to exemplary illustrations or specific figures, various modifications or adaptations of the methods and/or specific structures described can become apparent to those skilled in the art. All such modifications, adaptations, or variations that rely upon this disclosure and these teachings found herein, and through which the teachings have advanced the art, are to be considered within the scope of the one or more inventions whose teachings may be presented within this disclosure. Hence, the present descriptions and drawings should not be considered in a limiting sense, as it is understood that an invention presented within a disclosure is in no way limited to those embodiments specifically illustrated.

Accordingly, the above description and any accompanying drawings, illustrations, and figures are intended to be illustrative but not restrictive. The scope of any invention presented within this disclosure should, therefore, be determined not with simple reference to the above description and those embodiments shown in the figures, but instead should be determined with reference to the pending claims along with their full scope or equivalents.

What is claimed is:

1. A method comprising:
   at a mobile device having one or more processors:
   executing, at the mobile device, a companion application having a native container and a feature registry, wherein the native container comprises one or more generic components configured to allow the companion application to function as a mobile application on different platforms to test a feature being developed for the mobile application;
   receiving, at the mobile device, a request to install the feature being developed for the mobile application using the companion application, the mobile application being developed using an application development framework of a cloud-based service;
   retrieving the feature from a server, wherein the retrieving the feature includes receiving metadata that defines behavior of the feature on one or more components of the mobile application;
   updating the feature registry in the companion application to include the feature;
   causing the feature to be exposed via the feature registry to the companion application, wherein the exposing the feature to the companion application includes using the metadata to configure the one or more generic components to have the same behavior of the feature on the one or more components of the mobile application; and causing the feature to be tested on the mobile device using the companion application and the one or more generic components.

2. The method of claim 1, wherein executing the companion application comprises executing the companion application to test the feature of the mobile application under development.

3. The method of claim 1, wherein receiving the request to install the feature comprises receiving a request to install the feature for a first time.

4. The method of claim 1, wherein receiving the request to install the feature comprises receiving a request to install the feature for a second time after having been modified using the application development framework.

5. The method of claim 1, wherein retrieving the feature from the server comprises retrieving one of a plurality of features into which the mobile application has been partitioned.

6. The method of claim 1, wherein updating the feature registry to include the feature comprises adding the feature to one or more user interfaces of the companion application.

7. The method of claim 1, further comprising:
receiving a list of available features from the server; and
rendering the list within a user interface of the mobile application.

8. A method comprising:
separating, by a computer, a mobile application under development using an application development framework of a cloud-based service into a plurality of features;
registering, by the computer, the plurality of features in an application catalog stored in the computer, wherein the application catalog comprises a plurality of applications being developed using the application development framework of the cloud-based service and a list describing the plurality of features;
sending, by the computer, the list describing the plurality of features to a mobile device;
receiving, at the computer, a request from the mobile device to test a feature in the plurality of features of the mobile application using a companion application on the mobile device, the companion application having a native container and a feature registry, wherein the native container comprises one or more generic components configured to allow the companion application to function as the mobile application on different platforms to test the feature on the mobile device; and
sending, by the computer, the requested feature to the mobile device instructing the companion application to register the requested feature in a feature registry of the companion application causing the feature to be exposed via the feature registry to the companion application,
wherein the sending includes sending metadata that defines behavior of the feature on one or more components of the mobile application, and
wherein the exposing the feature to the companion application causes the metadata to be used to configure the one or more generic components to have the same behavior of the feature on the one or more components of the mobile application.

9. The method of claim 8, wherein sending, by the computer, the requested feature to the mobile device further comprises sending, by the computer, a request to the companion application to install the requested feature for a first time.

10. The method of claim 8, wherein sending, by the computer, the requested feature to the mobile device further comprises sending, by the computer, a request to the companion application to install the requested feature for a second time after having been modified using the application development framework.

11. The method of claim 8, wherein sending, by the computer, the requested feature to the mobile device further comprises retrieving the requested feature from a server.

12. The method of claim 11, wherein the requested feature comprises at least one of one or more user interface elements, application logic, user interfaces, or workflows associated with the mobile application.

13. One or more non-transitory computer-readable media storing computer-executable instructions executable by one or more processors, the computer-executable instructions comprising:
instructions that cause the one or more processors to execute a companion application having a native container and a feature registry, wherein the native container comprises one or more generic components configured to allow the companion application to function as a mobile application on different platforms to test a feature being developed for the mobile application;
instructions that cause the one or more processors to receive a request to install the feature being developed for the mobile application using the companion application, the mobile application being developed using an application development framework of a cloud-based service;
instructions that cause the one or more processors to retrieve the feature from a server, wherein the retrieving the feature includes receiving metadata that defines behavior of the feature on one or more components of the mobile application;
instructions that cause the one or more processors to update the feature registry in the companion application to include the retrieved feature;
instructions that cause the one or more processors to cause the feature to be exposed via the feature registry to the companion application, wherein the exposing the feature to the companion application includes using the metadata to configure the one or more generic components to have the same behavior of the feature on the one or more components of the mobile application; and
instructions that cause the one or more processors to cause the feature to be tested on a mobile device using the companion application and the one or more generic components.

14. The computer-readable media of claim 13, further comprising instructions that cause the one or more processors to execute the companion application to test the feature of the mobile application under development.

15. The computer-readable media of claim 13, wherein the plurality of instructions further comprise instructions that cause the one or more processors to receive the request to install the feature for a first time.

16. The computer-readable media of claim 13, wherein the plurality of instructions to update the feature registry further comprise instructions that cause the one or more processors to add the feature to one or more user interfaces of the companion application.

17. The computer-readable media of claim 13, wherein the plurality of instructions further comprise instructions that cause the one or more processors to:
   receive a list of available features from the server; and
   render the list within a user interface of the first application.

* * * * *

UNITED STATES PATENT AND TRADEMARK OFFICE
CERTIFICATE OF CORRECTION

PATENT NO. : 9,858,174 B2
APPLICATION NO. : 14/865927
DATED : January 2, 2018
INVENTOR(S) : Straub et al.

Page 1 of 2

It is certified that error appears in the above-identified patent and that said Letters Patent is hereby corrected as shown below:

On the Title Page

Column 2, under item (74) Attorney Agent, or Firm, Line 1, delete "Kllpatrick" and insert -- Kilpatrick --, therefor.

In the Specification

In Column 20, Line 66, delete "(XML," and insert -- (XML --, therefor.

In Column 36, Line 3, delete "recieves" and insert -- receives --, therefor.

In Column 36-37, Lines 52-67 (Column 36) 1-5 (Column 37), delete "Corp. is installed on the mobile device. The security container is configured to hold "containerized" applications, e.g., applications that have been securely linked to their specific container. The security container includes a secure browser, file manager, document editor, and an optional secure mobile mail manager. The secure mobile mail manager includes personal information management ("PIM") applications such as a mail client, calendar, contacts, tasks, and notes synchronizing with corporate mail servers via the "Microsoft Exchange ActiveSync" ("EAS") protocol. Many applications such as "Oracle Business Intelligence" ("BI"), "Oracle Fusion Tap," "Oracle Social Network," "Oracle Enterprise Manager Cloud Control," "Oracle WebCenter Spaces," etc., and a broad range of third-party enterprise applications can be containerized with the security container. All data at rest inside containerized applications on a mobile device is encrypted. Encrypted data storage includes database, file store, cache, and user preferences. In one embodiment, data in transit through the AppTunnel is encrypted using TLS/SSL with Federal Information Processing Standard ("FIPS") approved algorithms." and insert the same on Column 36, Line 51, as a continuation of the same paragraph.

In Column 38, Line 67, delete "CIF S" and insert -- CIFS --, therefor.

In Column 51, Lines 53-59, delete "Macintosh®, and/or Linux operating systems, a variety of commercially-available UNIX® or UNIX-like operating systems (including without limitation the Signed and Sealed this
Seventeenth Day of July, 2018

Andrei Iancu
*Director of the United States Patent and Trademark Office*

CERTIFICATE OF CORRECTION (continued)
U.S. Pat. No. 9,858,174 B2 variety of GNU/Linux operating systems, the Google Chrome® OS, and the like) and/or mobile operating systems such as iOS, Windows® Phone, Android® OS, BlackBerry® 33 OS, and Palm® OS operating systems." and insert the same on Column 51, Line 52, as the continuation of the same paragraph.